United States Patent [19]
Macri et al.

[11] Patent Number: 6,164,973
[45] Date of Patent: Dec. 26, 2000

[54] PROCESSING SYSTEM METHOD TO PROVIDE USERS WITH USER CONTROLLABLE IMAGE FOR USE IN INTERACTIVE SIMULATED PHYSICAL MOVEMENTS

[75] Inventors: Vincent J. Macri, 5 Timber Brook La., Durham, N.H. 03824; Paul Zilber, Plainview, N.Y.

[73] Assignee: Vincent J. Macri, Durham, N.H.

[21] Appl. No.: 09/270,794

[22] Filed: Mar. 17, 1999

Related U.S. Application Data

[63] Continuation-in-part of application No. 08/684,435, Jul. 19, 1996, Pat. No. 5,890,906, which is a continuation-in-part of application No. 08/375,616, Jan. 20, 1995, abandoned, and a continuation-in-part of application No. PCT/US96/00919, Jan. 22, 1996.

[51] Int. Cl.$^7$ .............................. A63B 69/00; G09B 9/00; G09B 19/00
[52] U.S. Cl. ................ 434/247; 434/307 R; 434/365; 482/902; 463/3; 345/156
[58] Field of Search ................... 434/247, 248, 434/251, 252, 112, 307 R, 308, 365; 482/1, 900–902; 345/302, 473, 156, 161, 163, 167, 173; 463/3, 4, 31, 35, 36; 473/43, 152, 438, 446, 447, 453, 461; 273/317.1; 340/825.19, 323 R; 703/22

[56] References Cited

U.S. PATENT DOCUMENTS

| | | | |
|---|---|---|---|
| 4,925,189 | 5/1990 | Braeunig | 273/148 B |
| 5,261,820 | 11/1993 | Slye et al. . | |
| 5,350,303 | 9/1994 | Fox et al. . | |
| 5,372,507 | 12/1994 | Goleh . | |
| 5,507,485 | 4/1996 | Fisher . | |
| 5,524,188 | 6/1996 | Halpern . | |
| 5,546,572 | 8/1996 | Seto et al. . | |
| 5,547,382 | 8/1996 | Yamasaki et al. . | |
| 5,558,339 | 9/1996 | Perlman . | |
| 5,564,000 | 10/1996 | Halpern . | |
| 5,577,185 | 11/1996 | Tunnell et al. . | |
| 5,587,312 | 12/1996 | Van Holst et al. . | |
| 5,682,196 | 10/1997 | Freeman | 348/13 |
| 5,701,139 | 12/1997 | Weinbaum et al. . | |
| 5,729,741 | 3/1998 | Liaguno et al. . | |
| 5,736,986 | 4/1998 | Sever, Jr. . | |
| 5,740,802 | 4/1998 | Nafis et al. . | |
| 5,771,380 | 6/1998 | Tanaka et al. . | |
| 5,788,504 | 8/1998 | Rice et al. . | |
| 5,788,508 | 8/1998 | Lee et al. . | |
| 5,797,753 | 8/1998 | Griswold et al. . | |
| 5,797,754 | 8/1998 | Griswold et al. . | |
| 5,797,805 | 8/1998 | Lubell et al. . | |
| 5,803,745 | 9/1998 | Kozak et al. . | |
| 5,809,167 | 9/1998 | Al-Hussein . | |
| 5,816,917 | 10/1998 | Kelmer et al. . | |
| 5,846,134 | 12/1998 | Latypov | 463/46 |
| 5,848,404 | 12/1998 | Hafner et al. . | |
| 5,851,117 | 12/1998 | Alsheimer et al. . | |
| 5,861,881 | 1/1999 | Freeman et al. . | |

*Primary Examiner*—Joe H. Cheng

[57] ABSTRACT

A method of developing processing system software media to provide at least one user with a display of at least one user controllable image such that the user causes the user controllable image to perform interactive, idiosyncratic, simulated, physical, movements on a display means. The invention includes the display of demonstrative image movements to which users cause interactive, idiosyncratic, simulated, physical, responsive movements to be made by user controllable images. Demonstrative image movements may be made by images of any previously or presently living things, objects and systems. The user controllable images are customized by the user with respect to its on-screen proportional dimensions and characteristics and its movements may be idiosyncratically controlled by the user and/or by pre-programmed, pre-stored, maintained means. The user controllable image acquires a form of personalized artificial intelligence in that users' transmissions of idiosyncratic input controls are stored and maintained by the processing system as the effective memory and autonomous and/or semi-autonomous movement capabilities of users' controllable images.

21 Claims, 45 Drawing Sheets

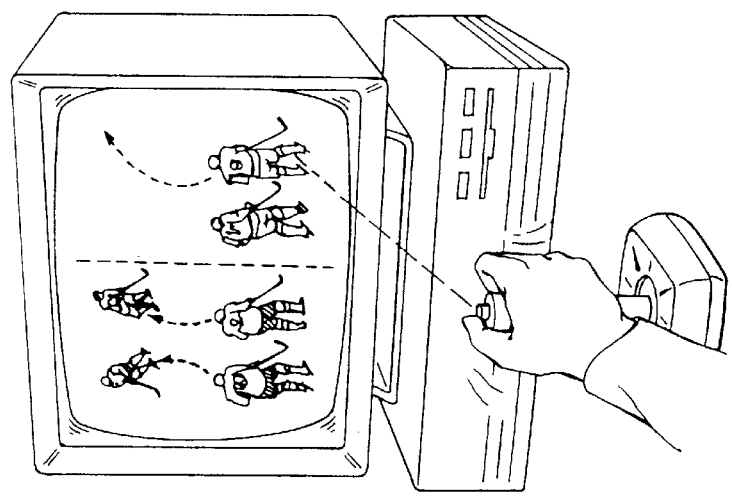
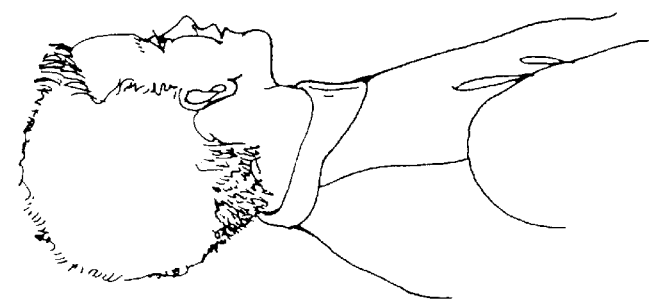
FIG. 5B
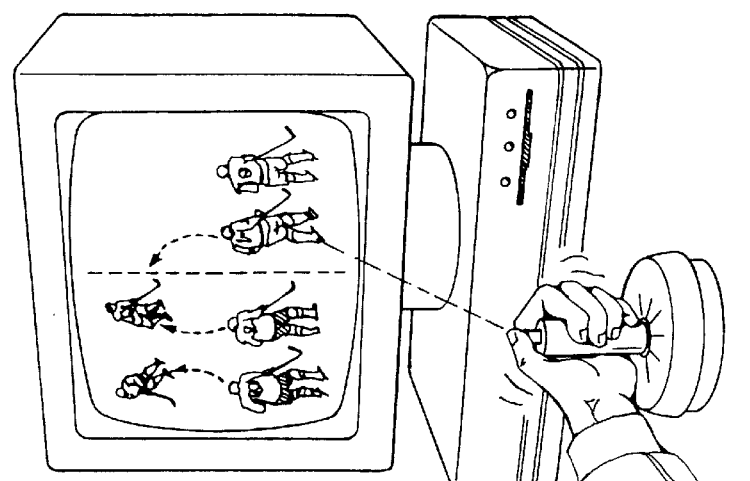
FIG. 5A

PROCESSING SYSTEM METHOD TO PROVIDE USERS WITH USER CONTROLLABLE IMAGE FOR USE IN INTERACTIVE SIMULATED PHYSICAL MOVEMENTS

RELATED APPLICATION

This application is a Continuation-In-Part application of U.S. application Ser. No. 08/684,435, filed on Jul. 19, 1996, now U.S. Pat. No. 5,890,906, which is a Continuation-In-Part application of U.S. application Ser. No. 08/375,616, filed on Jan. 20, 1995, now abandoned, and a Continuation-In-Part application of PCT International Application No. PCT/US96/00919, filed on Jan. 22, 1996, all of which are incorporated herein in their entirety by reference.

BACKGROUND OF THE INVENTION

Physical movement has been the subject of technology directed to how to improve motor skills and computer video game technology directed to symbolized movements by on-screen (displayed) images. Neither technology has combined the use of real and simulated demonstrative images, performing real and/or simulated movements in a simulated environment, interacting with idiosyncratically controlled user controllable images interactively controlled by users.

The present invention is directed to the development of user controllable images which perform simulated, interactive, physical, responsive, movements, displayed on a display screen, to demonstrative image movements, without the user necessarily making the same or related movement. Accordingly, the present invention teaches ways to produce technical effects that ensure users to control user controllable images as persona, on-screen agents.

Moreover, the present invention teaches the development of technical capabilities for user controllable images that enable users to interactively control user controllable image simulated physical movements. The present invention further teaches techniques whereby a processing system can be used to pre-store, maintain and pre-program such movements. Simulated movement capabilities and limits (parameters) within the processing system are constructed so as to affect user controllable images by: 1) maintaining processing system memory of user transmitted idiosyncratic input controls causing movement of the user controllable image, 2) providing updating capability of such maintained (user controllable image) memory, 3) providing for synchronous additions to such updated memory, 4) retaining such memory as a base upon which subsequent additional movement recordation, may be added, 5) allowing user review, i.e. causing the processing system to repeat prior, idiosyncratic user input controls resulting in user controllable image movements, 6) selecting the characteristic parameters of a user controllable image, 7) selecting the speed of movement and controlling sequential locationing of the user controllable image, 8) establishing pre-programmed user controllable image movement limitations (i.e. physical movement parameters), 9) using a pre-programmed model of movements within a processing system, to measure user control of user controllable images, 10) providing a means to decrease user controllable image movement error rate, 11) providing the user with control over the position and orientation of the user controllable image with respect to any axis, 12) allowing at least two user controllable images to respond to each other, and in a variety of other ways and by other means.

The present invention is technically applicable to any user choosing to control any kind of user controllable image to simulate any physical movement in any simulated environment. Therefore, the present invention may be used for learning, pre-training, amusement and the like. The user controllable images as a dinosaur may be caused to respond to the preferred physical movements of a demonstrative image of a dinosaur. The user controllable image as a bulldozer operator may be caused to simulate the movements of a demonstrative image operating a bulldozer in a preferred manner. A small child user may cause a user controllable image (in the form of one hand) to simulate the movement of alphabetized wooden blocks into a series so as to spell a word as is demonstrated by demonstrative image movements. In terms of the scope of the present invention, industrial, commercial, learning, amusement and sports are some of the areas of its application. We proceed to teach sports embodiments.

Technology that has been designed for sports and other activities involving motor skills is generally dedicated to improving strength, swing, motion, balance, speed and agility. Accordingly, for golf and other sports, swinging motion trajectory is emphasized. For the most part the focus has been on developing aids for the individual athlete to improve a particular physical skill. Relatedly, technology for hazardous or potentially jeopardizing work, such as airplane piloting, is generally directed to practice in a simulated environment. In both areas mentioned above (motor skills and dangerous or jeopardizing work) the emphasis is on the individual taking action, i.e., making improvements that imitate real circumstances. The prior art related to sports and physical actions is generally aided by technology directed to biomechanics and locomotion, i.e. to executing motor skills.

There is little technology that is used for instruction or simulation in playing sports such as ice hockey. Commonplace instructional aids include stopwatches, plastic orange cones (used for skating drills), parachutes (pulled to increase leg strength), 2"×4" boards (used for jumping in agility, speed, and balance drills), and surgical tubing harnesses (to increase strength and force the skater to skate while bent forward at the waist). None of the devices noted above provide the student wit instructive and cognitive information concerning principles, tactics, maneuvers, skills and strategies used in physical activities such as playing ice hockey. In addition, these devices do not enable the player to receive quantitative feed-back concerning his/her progress in learning and mastering the cognitive aspects of the sport.

SUMMARY OF THE INVENTION

The present invention provides a method of developing processing system software media to provide at least one user with a display of at least one user controllable image such that the user causes the user controllable image to perform interactive, idiosyncratic, simulated, physical movements on a display means. The invention includes the display of demonstrative image movements made by images of any previously or presently living things, objects and systems.

The present invention provides a user with the opportunity to engage in simulated training or game playing comprises of instructive or ideal images and/or adoptable, controllable images. Such images provide the means by which the user can come to understand what to do using his/her cognitive and visualization skills. The use of such skills typically precedes the user of motor or motion skills.

In one embodiment, as the program executes, an instructive or ideal image displays the preferred style, technique, posture, procedure, skills, drills, positions, maneuvers, tactics, strategies or plays of any activity that calls for using cognitive and motor functions. The user's cognitive functions are developed and/or improved by viewing the procedural methods used by an instructive or ideal image, shown on a portion of the screen. As the program further executes, the user's level of comprehension improves by: (1) receiving information and cues from visual, audio, textual and tactile transmissions, (2) visualizing the actions of the instructive or ideal image, (3) making cognitive choices and decisions as to what manipulations should be made, and then (4) manipulating a user controllable adopted (by the user) image on another portion of the screen so as to cause the adopted image to simulate or approximate the preferred style, technique, posture, procedures, skills, drills, positions, maneuvers, tactics, strategies or play of any activity represented by the instructive or ideal image.

Alternatively, using the method and apparatus of the present invention, the user learns or is entertained by manipulating the controllable, adopted image(s) on a full or partial screen in competition against one or more instructive or ideal images or against other controllable images.

The present invention can use, for either the instructive or ideal image, or for the adopted, controllable image, or for both, images from live video taping, or animated or computer generated images or live, or robots real time images. It will be apparent to those skilled in the art that the instructive image(s) can teach at any level of expertise from first time beginners to professional experts. Feedback can be provided to all uses.

One embodiment pertains to a method of instruction in ice and roller hockey. More particularly, the embodiment pertains to a tutorial and interactive method for self and directed instruction and simulated training and play in a sport (or other activity) such as ice or roller hockey including, but not limited to, the principles of skating, stickhandling, shooting, checking, offensive and defensive play, positional and situational play, tactical and strategic plays and maneuvers.

The present invention includes observing an instructive (or ideal) way of doing something, receiving information and visual, audio, textual and tactile cues, visualizing what needs to be done and manipulating the adopted image to make sequential, positional changes pursuant to reviewing objectives and options and making choices in a dynamic decision process. This is a cognitive and to some extent a motor process that prepares the individual to engage in an activity coupling cognitive with motor skills. The present invention provides a simulated environment within which to prepare. The present invention combines perceptual experience and cognition with physical sensation and uses cues to facilitate user trial, error and improvement. The present invention facilitates the acquisition of accelerated albeit simulated experience.

By virtue of the facility available to users of the present invention, simulated training can be accomplished as well as simulated drill and maneuvers in taking up proper positions, reacting to situational play and executing tactics and strategies. Further, without a requirement for actual imitative movement of an instructive figure or its movement and without the requirement to use actual tools, implements or equipment, users of the present invention can engage in simulated repetition and/or competition geared to either learning or entertainment and can do so within the economy of space used for a computer monitor and keyboard or other economical, including virtual reality, input devices (as shown in FIGS. 25 and 26).

The present invention provides facilities for users to engage in simulated training, repetition and entertainment in activities that couple cognitive and motor skills. Such facilities, using skating as an example, include a range of functions such as simply understanding proper positioning for "pushing off" (for example, starting from a stationary standing position while on ice) to sophisticated, preferred, proactive play and preferred reactive play in response to numerous and varied competitive situations. The present invention, by virtue of its capacity to simultaneously present pre-programmed images following a predetermined system of activities and/or images that are controllable adopted by the user also provides for engaging entertainment and amusement.

Using any form of communication of information, including but not limited to floppy disks, CD-ROM disks, a local network, the Internet or wireless communication, users can compete against single opponents, against prior stored images of any individuals (or animations), including themselves or robots and against a full or partial opposing team, group or force. The elements of use of the present invention, including but not limited to viewing preferred or opposing activity, visualizing what the user should do in response to the activity viewed, including identifying options and making choices and decisions and interacting with the present invention through adoptable, controllable images open up a host of imaginative applications and uses for teachers, coaches, trainers, game players and the general public.

An alternative embodiment of the present invention is to have dynamic interactions among all images on the screen so that users may adopt and control all images in a learning, competitive or entertainment oriented environment.

The present invention is particularly well-suited to providing to the user accelerated experience through simulation. The processes of observation, orientation, and judgment are facilitated by the present method and apparatus.

The present invention is not limited to visual sensors but can incorporate others including audio etc. as needed. The use of auditory, visual and other cues decreases distractions and improves comprehension. Using the present invention as a relatively economical training simulator, implementation of visualization in a simulated environment is facilitated. Utilizing pre-programmed, automated and/or user controllable images, the users' awareness of spatial relationships among and between images, objects and locations is enhanced. Dynamic interaction between the images adopted by users, acting in concert as teammates against opposing images as well as dynamic communication and coordination by and between users, whether athletes or not, and other users is also enhanced.

There are multiple opportunities to change the position of an individual or one's entire team, i.e. a group of adopted, controllable images in response to opposing positioning or formations. This can be accomplished using touch sensitive screens or other input devices and will lead to sharpened pre-training in individual and/or team technique. The present invention is applicable to activities other than sports and pastimes.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 5A and 5B contain pictorial diagrams of two users interacting with another alternative embodiment of the invention.

DETAILED DESCRIPTION OF THE INVENTION

One embodiment of the present invention provides a computer-based system for tutorial and interactive instruction in the sport of ice (or roller) hockey including, but not limited to, the principal activities of skating, stickhandling, shooting, checking and offensive and defensive play, positional and situational play, tactical and strategic plays and maneuvers. The system of the present invention is particularly well suited for use as a tutorial, self-study or assisted study aide and as a cognitive primer for performing the principal activities noted above. The system is also particularly well suited as an aid to instructors, trainers, coaches and officials or trainees at all levels of expertise.

Physical activities such as playing ice hockey (or roller hockey) can be hazardous. As with other hazardous or demanding endeavors, the practice of simulated action or the approximation of preferred action before actual execution is advisable. The use of computer assisted technology to enhance the amount of time to engage in simulated practice can be distinctly advantageous to the user's (the "player/student's") knowledge base. Unlike video and arcade games, etc., which do not enable the game player to initiate or react to the actual dynamics of the real game, the present invention requires the player/student to review options, make choices and decisions and to cause the movement of an adopted, controllable image (in the form of, for example, a hockey player) as though he/she were in an actual game.

In the present invention the player/student is involved with hands-on, head-in activity, making actual choices and decisions and causing actual change of on-screen images in a virtually real environment under virtually real conditions. This type of control and initiative and the relevancy and accuracy of the simulation and the feedback, lead to a richer (robust) learning experience. Accordingly, the present invention also relates to a variety of sub-components of the principle activities noted above, such as, agility, balance, impact/contact, timing, and "read and react" skills.

Figure 11:
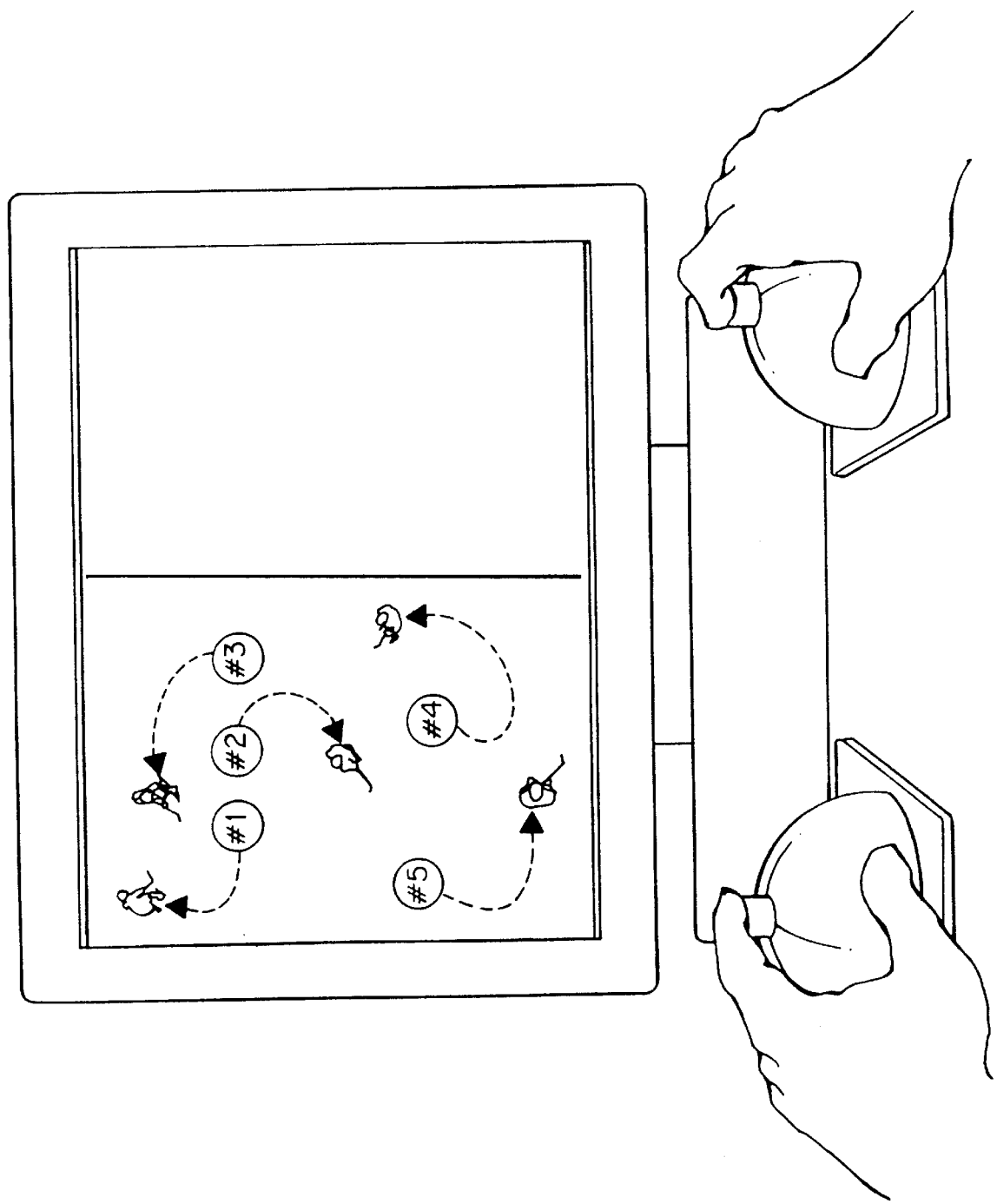
Figure 16:
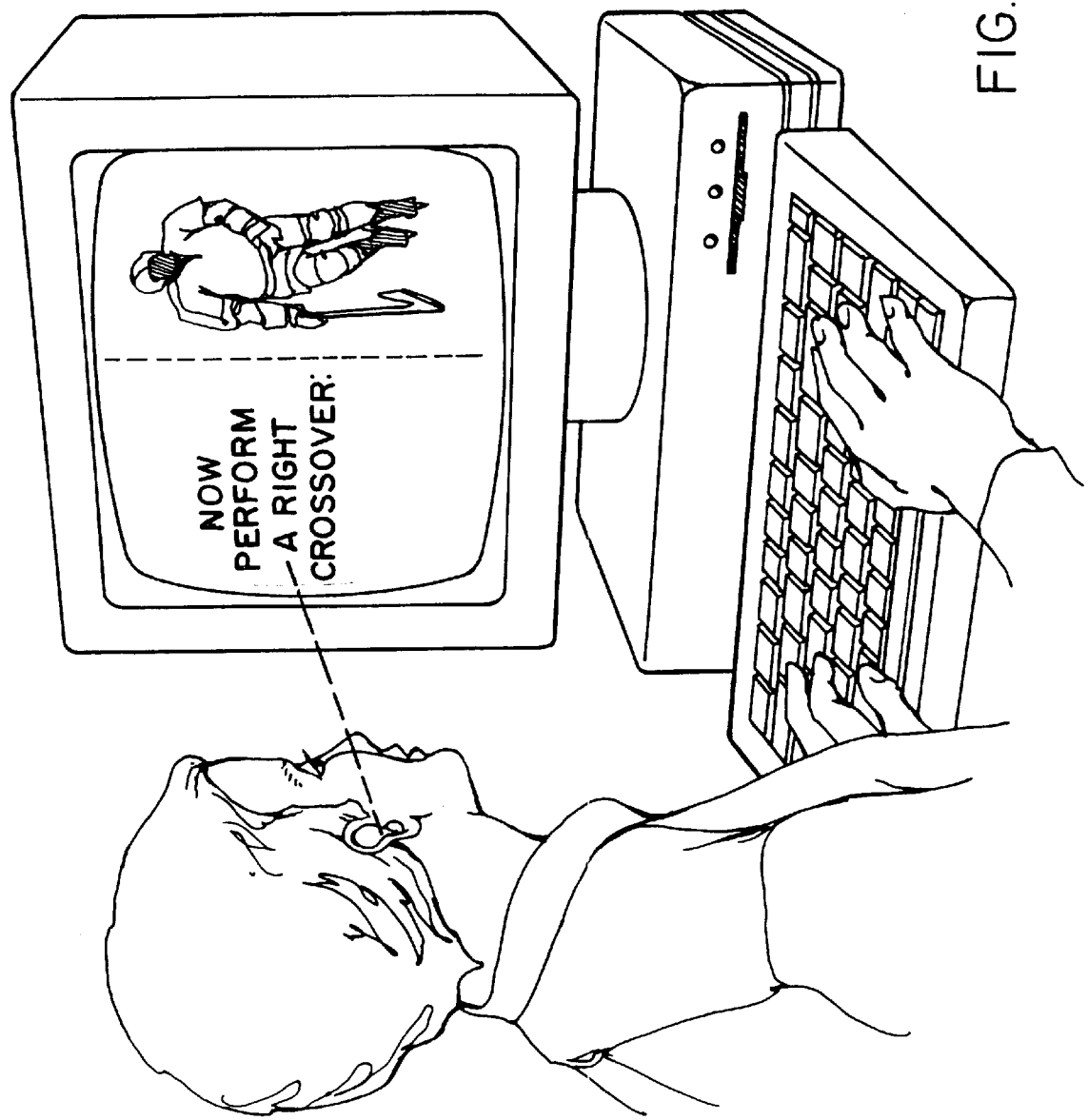
Figure 17:
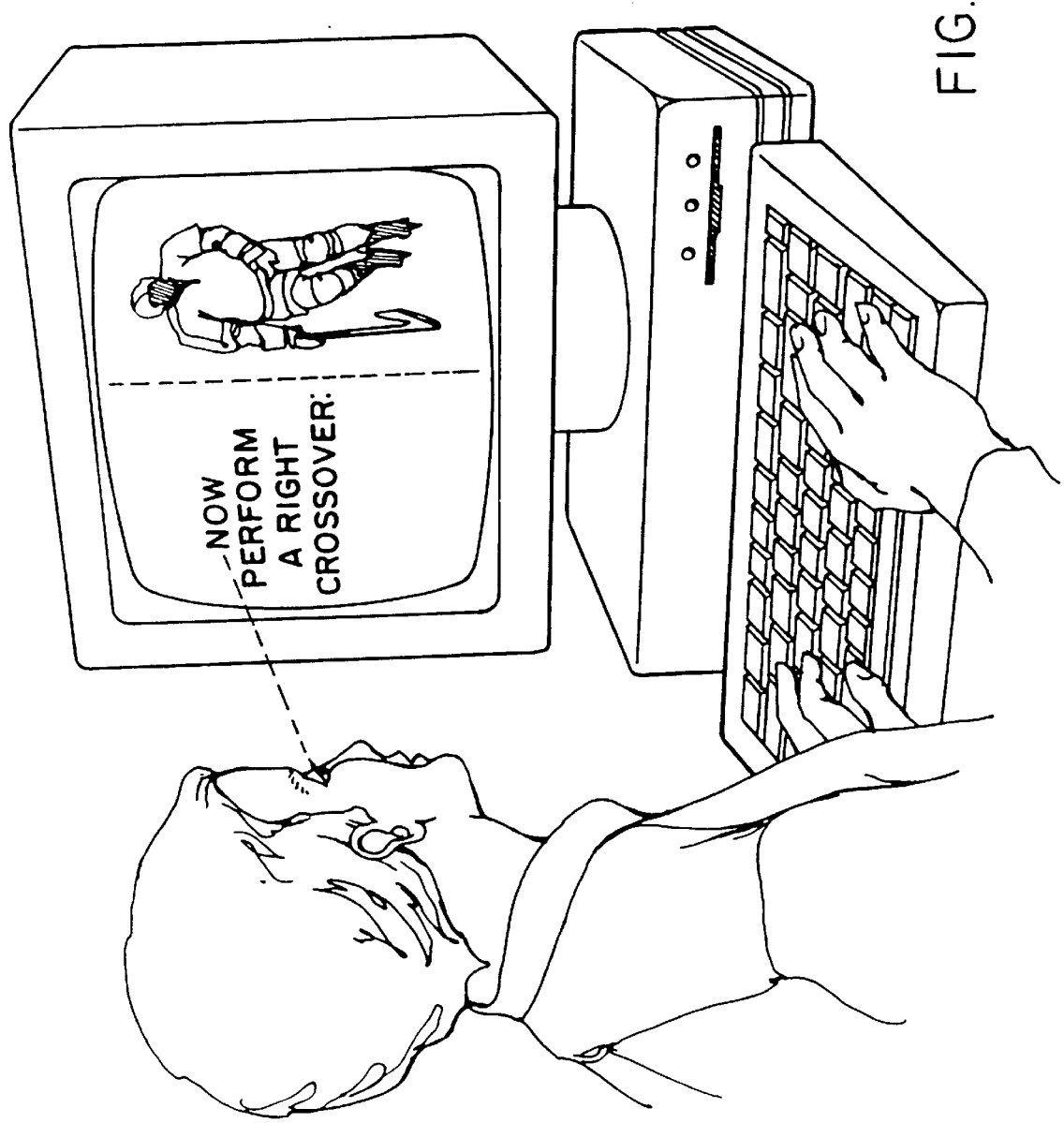
Figure 31:
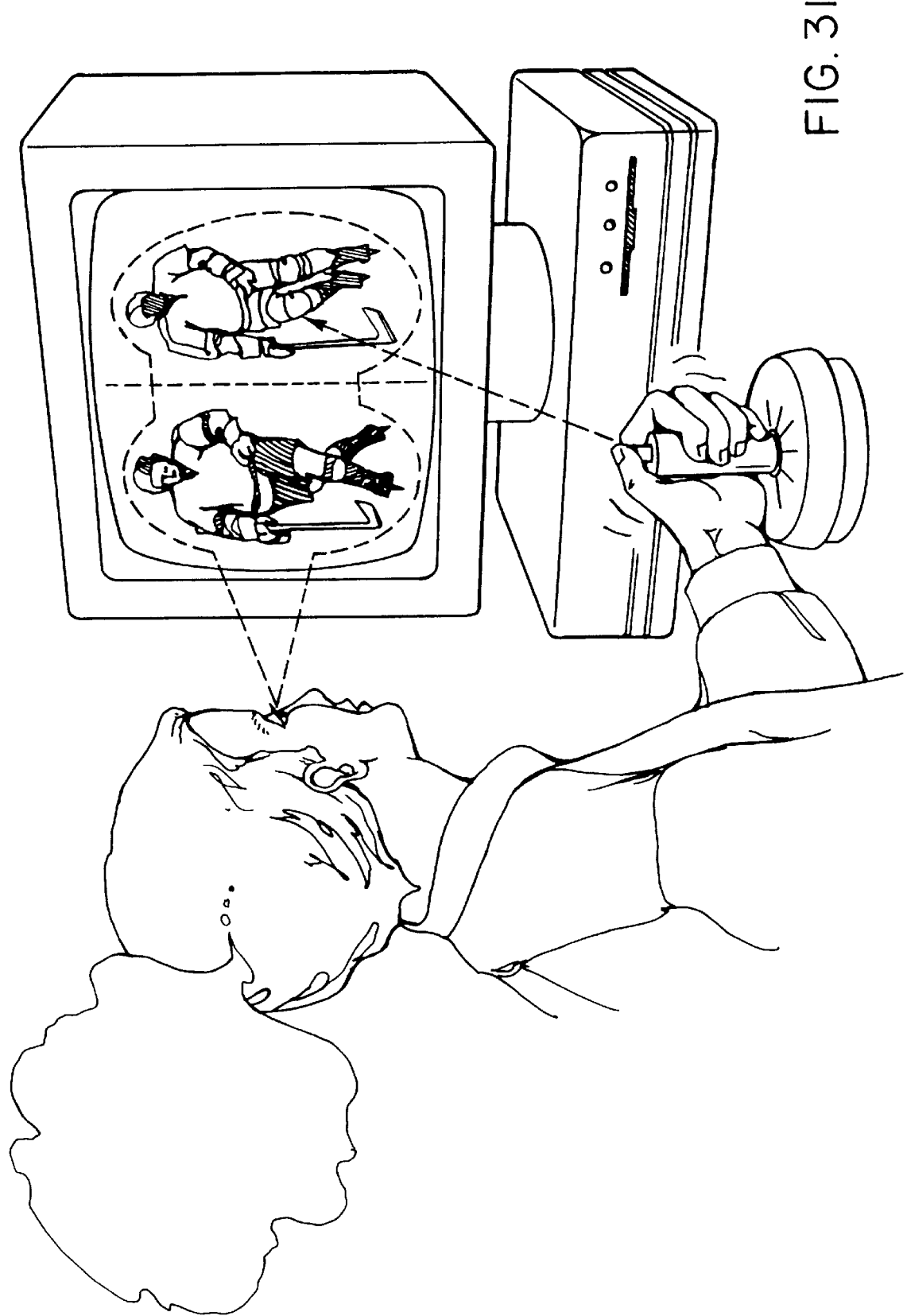
Figure 32:
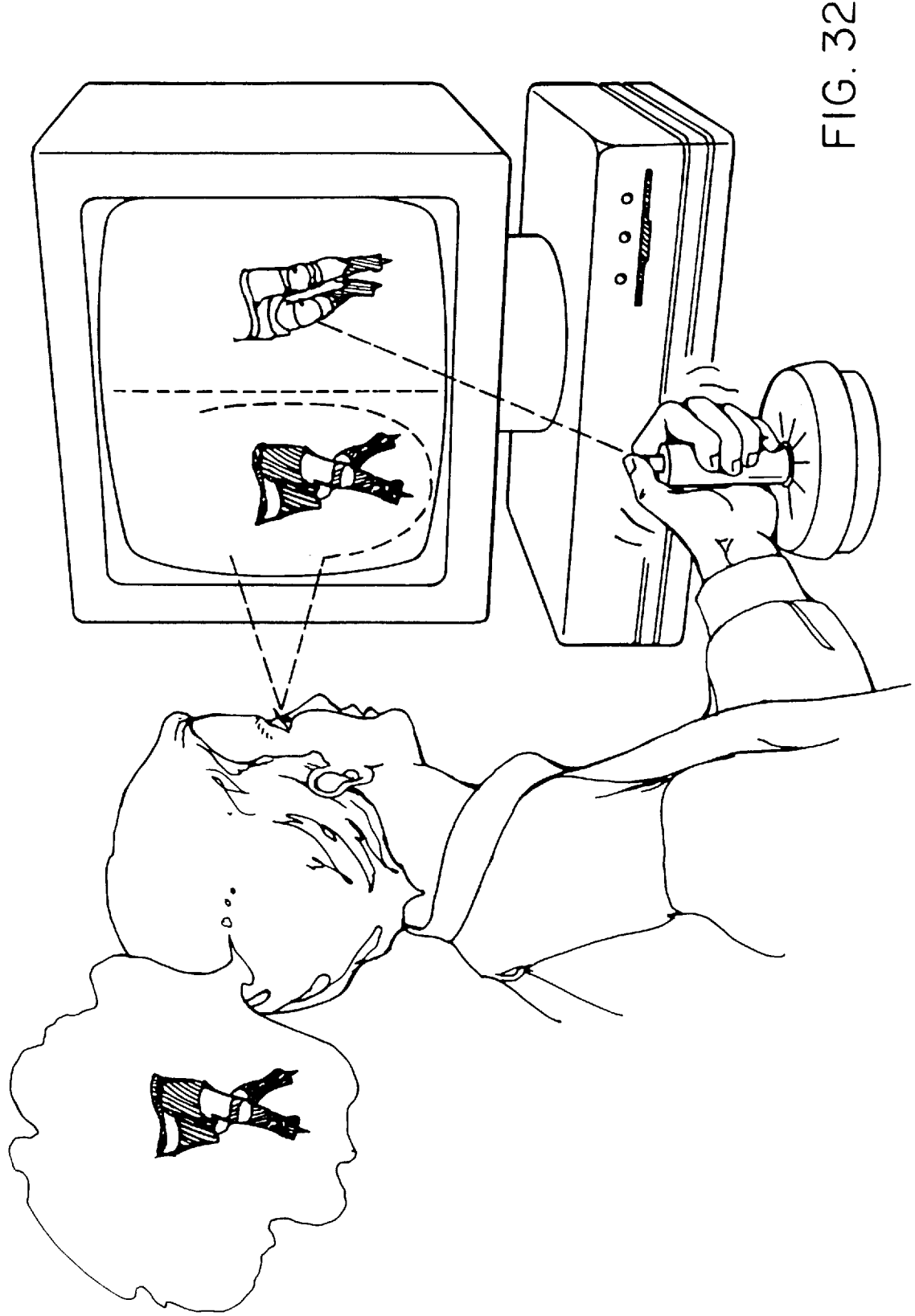

The computer system of the present invention enables the player/student to see and hear (on a computer screen or other device) how a particular skating, stickhandling, checking or other skill or drill can be performed (as shown in FIGS. 16 and 17). The player/student, by observing an instructive or ideal image of the skill being performed, is presented with a clear example (as shown in FIGS. 11, 31 and 32). The player/student can then interact with the system by visualizing the example shown and actually cause an on-screen adopted image to perform the skill or drill by approximation. Feedback on the user's individual performance in comparison to the instructive or ideal attern is visible in real time. Since feedback occurs in real time in the invention and since proficiency scores are posited on screen at the end of each drill, the invention may be used by anyone. Feedback can also be delayed and/or printed out in hard copy or distributed by other means.

For each preferred style, technique, posture, maneuver, position, tactic, skill, drill or play of any activity, the computer system of the present invention can provide an animated or digitized image of a player (or players) who performs the instructive or ideal performance (example). The instructive or ideal performance can be accompanied by textual and/or auditory tutorials. For some purposes the lesson may end at that point. For other purposes of interactive instruction can follow and for still other purposes a competitive or amusement scenario will ensue.

Figure 9:
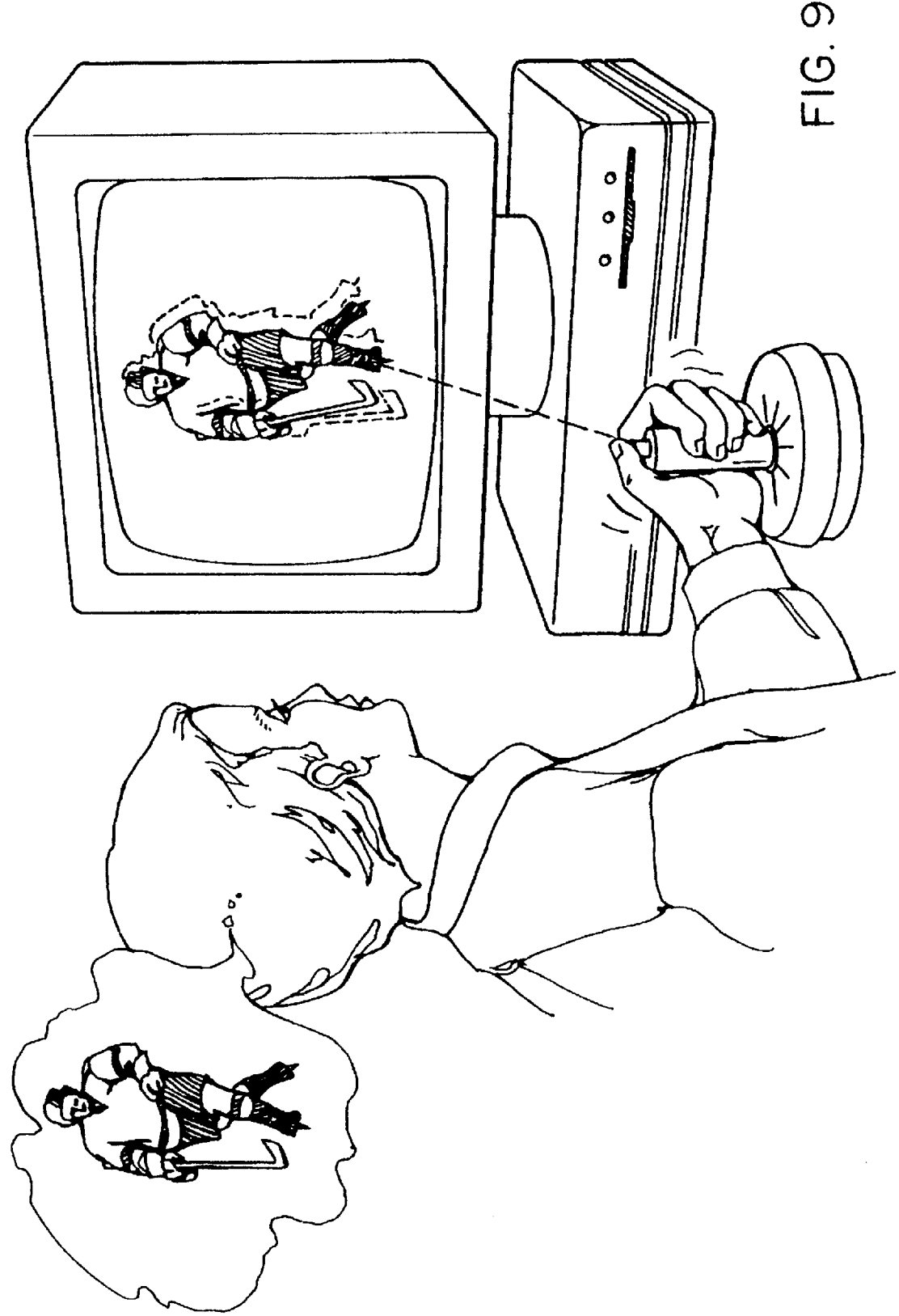
FIGS. 9–32 and 33A–37 are the pictorial diagrams of a user interacting with different embodiments of the invention.
Figure 20:
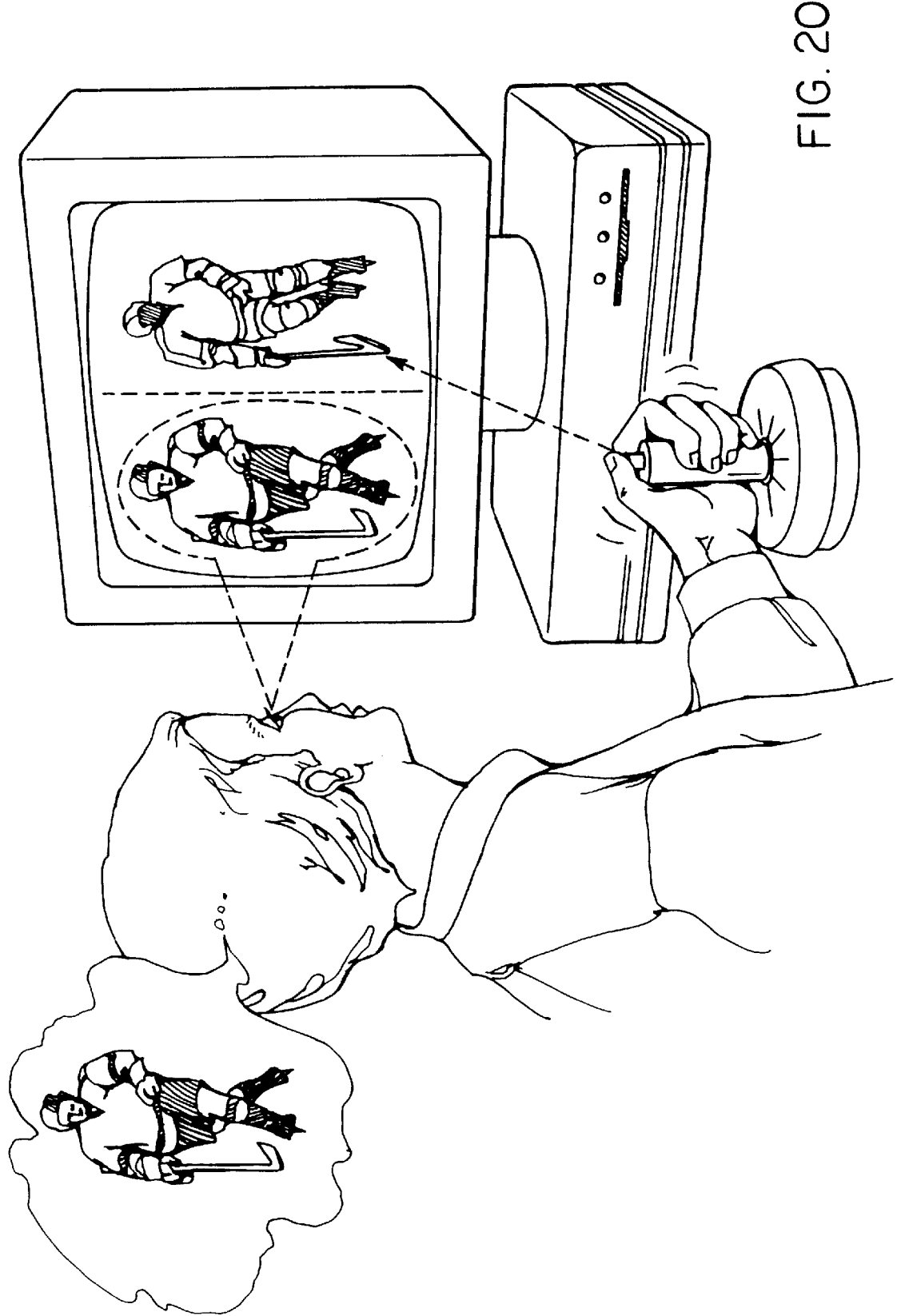
Figure 29:
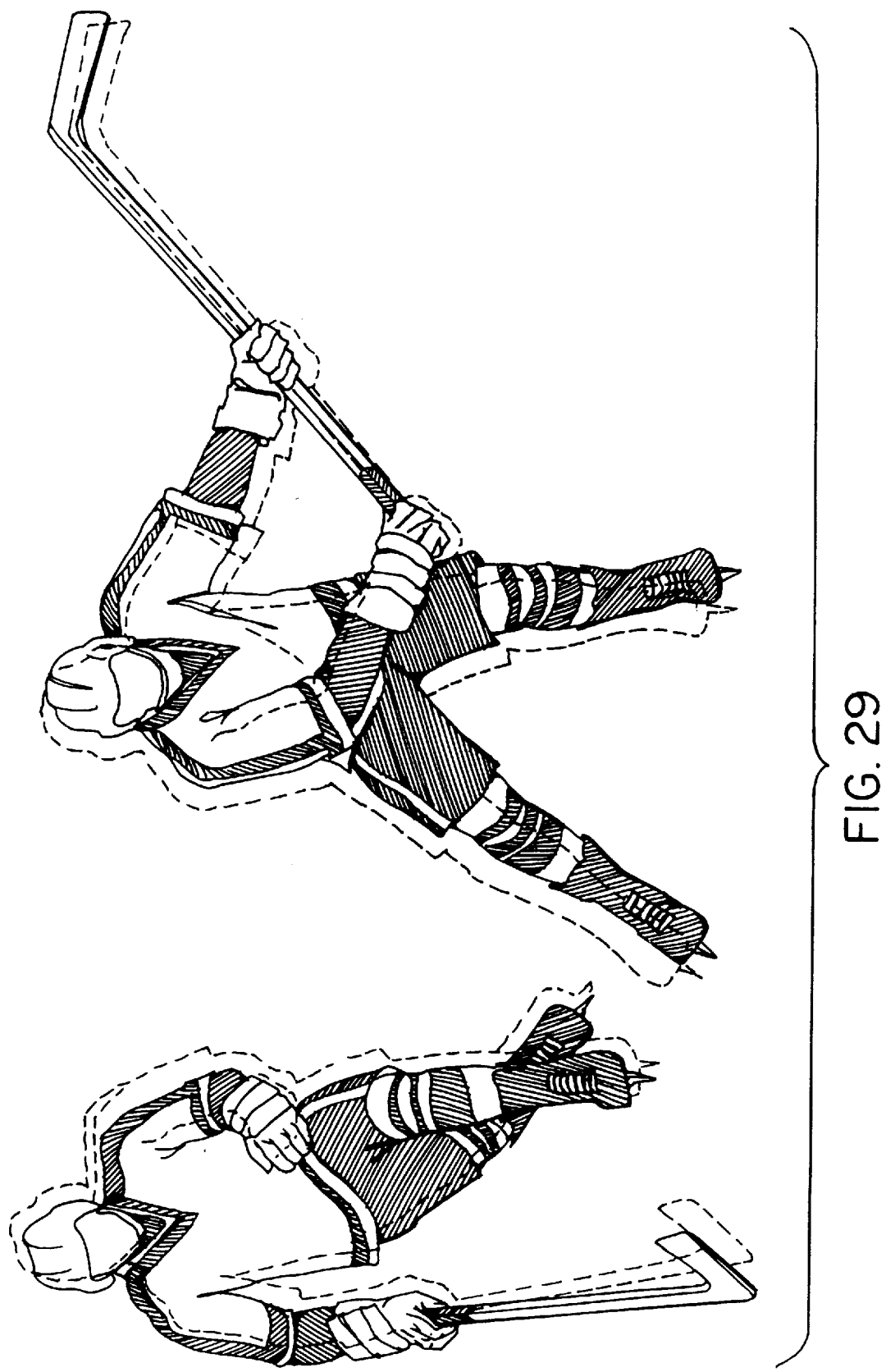
Figure 30:
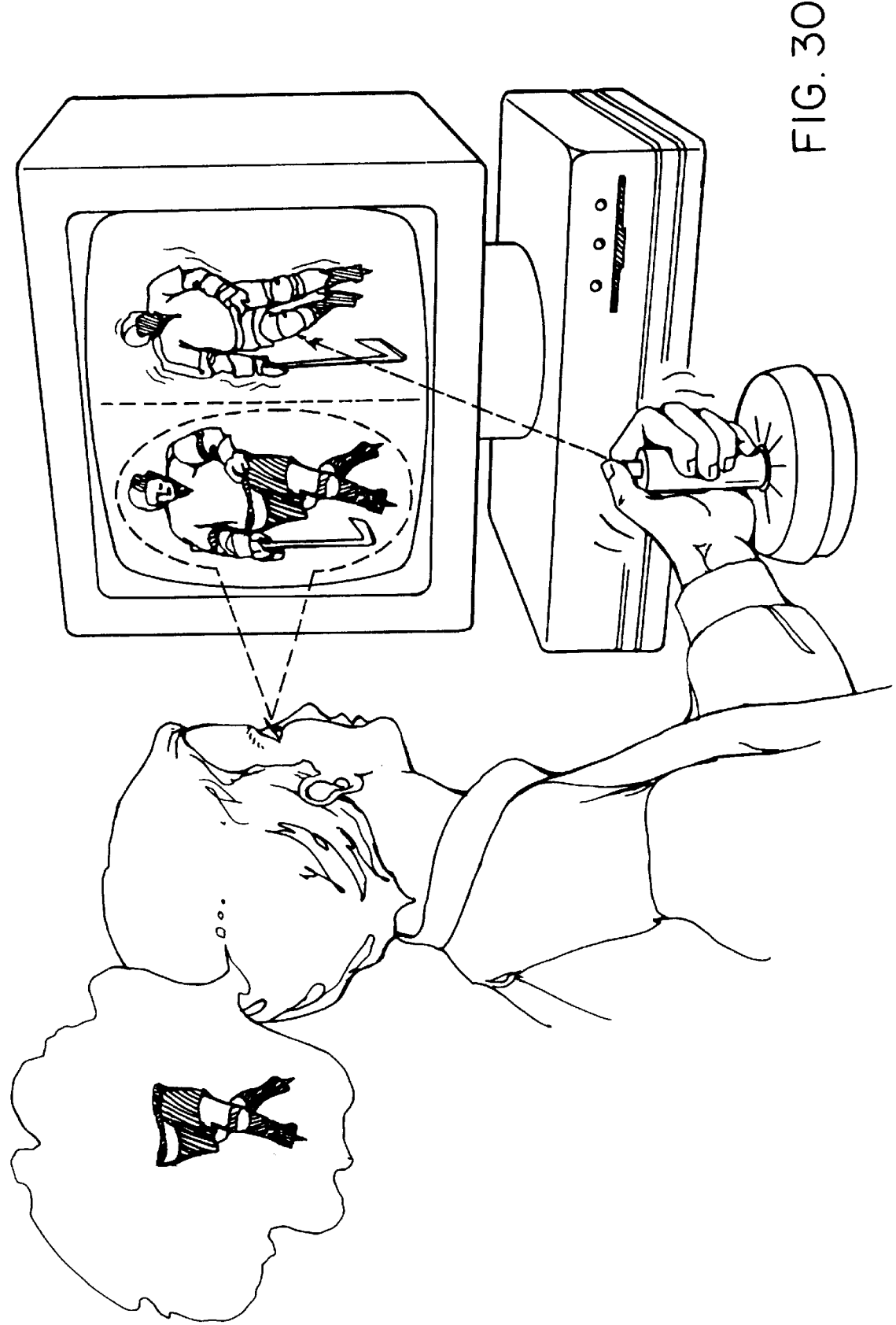

The interactive session can call upon the player/student to cause his/her adopted animated or digitized image(s) to execute maneuvers under the direction of the player/student. The present invention may use the ideal skater as is or may transform an animated or digitized ideal skater into an anatomical outline and provide that the outline have superimposed upon it or set beside it an "adopted" silhouetted figure which will make sequential positional changes at the direction of the player/student (as shown in FIGS. 9 and 29). This calls upon the player/student to understand the positional changes including the physical movements that are required by the maneuver and to strive to have his/her adopted image make those movements and sequential positional changes (as shown in FIGS. 20 and 30).

Since this interactive game can be played by pitting the adopted controllable image against the instructive or ideal image example, the difference between the execution by the player/student controlled image and ideal execution can be measured. Auditory and/or textual prompts can be given in real time as well as a score registered at the end of the exercise. For any given (predetermined) skating step, stride or maneuver, the player/student will have positive or negative feedback in both audio and visual form based on his/her ability to cause the controllable adopted image to approximate the drill being displayed. Advancements to the next higher level or repetition for correction are integral parts of the invention.

The applications of such instruction are numerous. Player/students will learn what they will be called upon to do on the ice. The opportunity for self-drill and repetition is excellent. Mental preparedness can be enhanced. Uniformity and economy in coaching and instruction can be enhanced. A lesson can be designed in advance, as can game plans. Computer usage (if not literacy) can be a learned by-product. Certain principles of geometry and physics can be learned in conjunction with understanding how efficient and effective execution of skills leads to enhanced results. For example, how tighter turns shorten the distance between present location and desired position son the ice or how good balance, timing and form lead to increased skating speed and strength.

Figure 19:
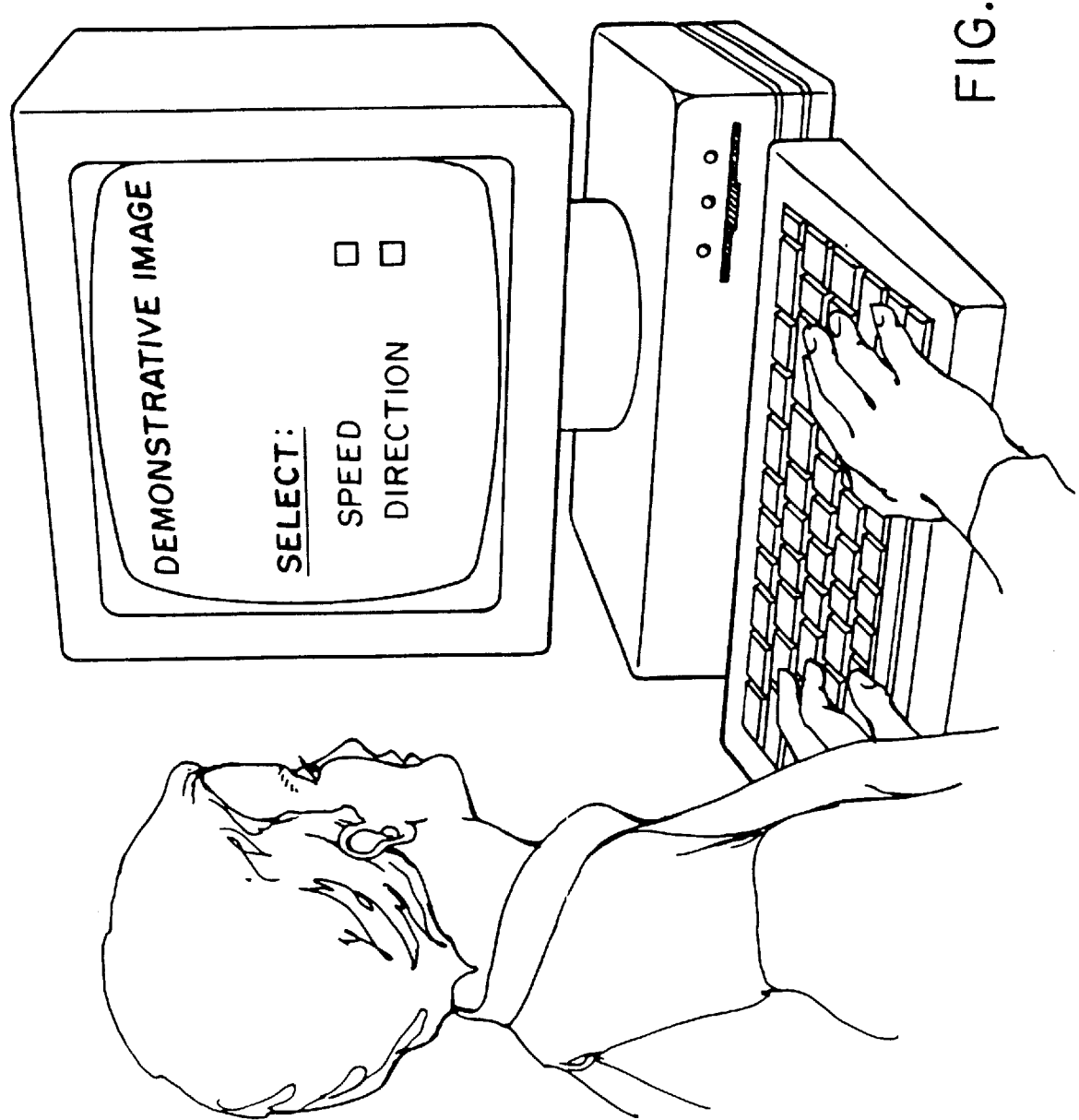

Benefits of the present invention include the opportunity to visualize an instructive or ideal image of specific skills and maneuvers used in ice hockey. The player/student can see how the skill or play can be executed as a dynamic whole (either in slow motion or actual speed) or can pick apart the skill or play by viewing images frame by frame (as show in FIG. 19). The latter method enables the student to see details of the ideal maneuver which might not be apparent in a moving image.

The player/student is able to learn each skill at his/her own pace. Since images can be moved frame by frame and repeated as many times as desired, the player/student will be able to perfect his/her understanding and performance of each skill. Repeating each maneuver will improve recollection of what has been learned.

Figure 12:
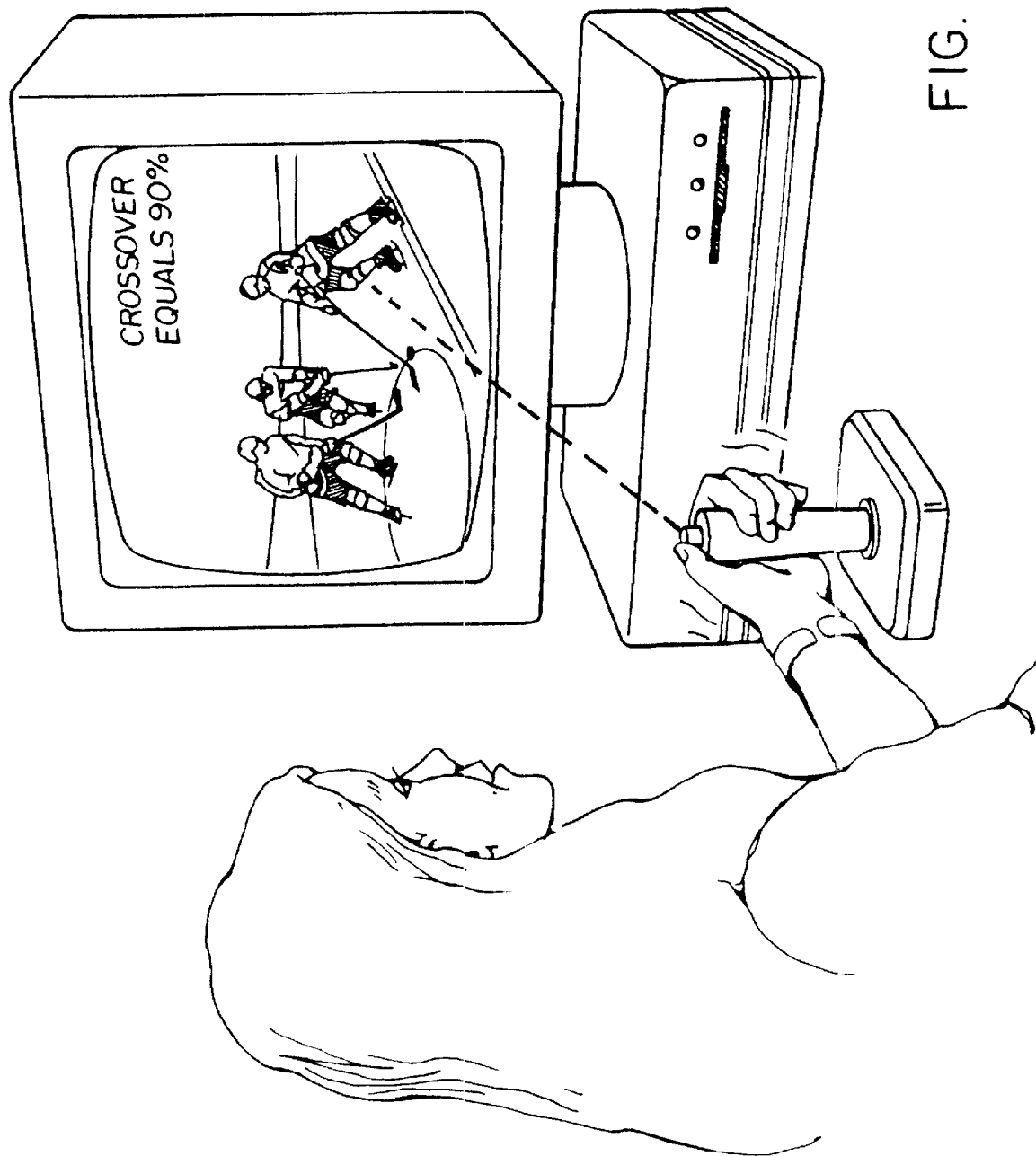

Feedback can be received in real time by the player/student as he/she is able to see on the computer screen how closely the adopted controllable image approximates the ideal image (as shown in FIG. 12). In addition, the invention can provide means to numerically evaluate the player/student's ability to match the sequential positional changes and maneuvers of the ideal image. The quantitative evaluation will make it possible for the student to monitor his/her progress in performing the skill, play or tactic each time it is practiced.

Benefits to instructors include consistency and objectivity in the information given to each player/student. Each player/student will receive the same information and will be able to repeat the lesson or "game" until sufficient comprehension is acquired. Since player/students will be able to use the present invention independently, staff time can be quantitatively and qualitatively enhanced. Instructors and students will be able to select areas for more or less concentration and repetition, including what should be done in actual practice. Use of the present invention will also be of benefit if access to ice hockey rinks is limited or, conversely, more can be made of available ice time. Accident or injury reduction can result from increased awareness of dangerous situations or conditions.

Figure 10:
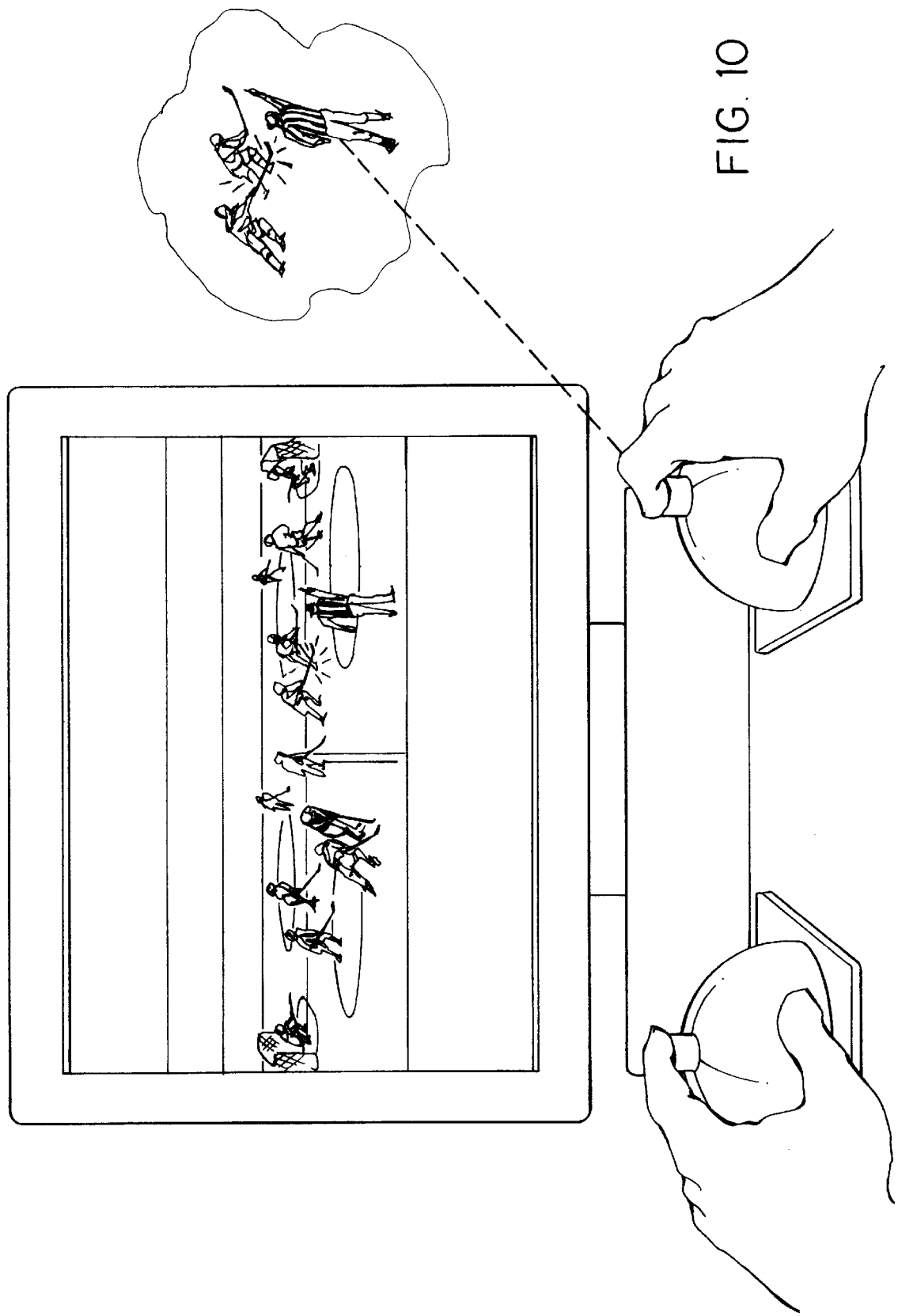

An additional embodiment of the invention enables officials (referees, linesmen, and other officials) in the sport of ice hockey or in other sports or activities to practice positioning and making decisions regarding infractions of the rules while watching and controlling digitized images on a computer screen (as shown in FIG. 10). The digitized images include preselected plays or maneuvers executed by a single player against one or more opponents or by a player in combination with one or more of his/her teammates playing against an opposing team including one or more players or actions taken by team coaches, managers and others.

The officials view the execution of the play, while moving an "adopted" official, in digital form, to the best vantage point from which to see the plays, and decide whether the actions of the player or players or coaches are within the rules of the game or constitute an infraction of the rules for which a penalty is levied. The invention enables officials to record their decisions in the computer system.

The digitized images can be obtained from video tapes of live athletes playing ice hockey or from animated or computer generated or robotic sources. Appropriate sections of the video tape or other images can be selected and converted to or maintained in digitized format. The selected images can be viewed on a computer screen. Officials are able to speed up or slow down the images as they appear on the screen. Alternatively, the speed of on-screen action can be controlled by persons responsible for assessing the officials' performance. Officials can be required to move their adopted on-screen official image so as to be in the best position to see the play and make a call when warranted. Reverse angle views of the digitized images can be available on demand to provide real time feedback on whether a play included a foul or was cleanly executed.

After viewing each specific image sequence, the official can enter into the computer his/her decisions regarding the legality of the plays previously observed. The results are compiled by the computer and fed back to the officials via the computer screen or by hardcopy printouts.

The benefits of this embodiment include the opportunity for officials to practice decision making at their own pace in a relaxed environment. As with the previous embodiments of this invention, the images on the computer screen can be viewed frame by frame, or at any speed from slow motion to real time to super real time, and repeated as many times as desired. This will enable officials to study details which an be missed in the fast, high pressure setting of a hockey game or to test their skills in making calls at real time rates of speed or even faster (super) than actual playing speed. As the officials progress in their decision-making abilities, the images which are viewed at increasingly faster speeds, either real-time or faster, provide practice in quick orientation, observation and judgment and thereby sharpen officiating skills.

After each image sequence has been viewed, the official can use means such as a computer keyboard, mouse, joystick or other input device to input his/her decision regarding the legality of the observed plays into the computer system. The official is presented with a list of possible infractions and asked to select those infractions observed during the image sequence. The official gains points for correct judgments and lose points for incorrect judgments. At the end of the exercise, the computer can display a numeric score as well as a list of incorrect decisions. The score and list can also be printed in hardcopy format if desired.

If the user does not achieve a certain level of proficiency, he/she can be required to loop back and repeat testing on the image sequences previously viewed before advancing to a higher level. As with other embodiments of the invention, the computer can keep a record of the proficiency scores for each official. Current scores may be compared to those attained previously. This will enable each user to monitor his/her progress in perfecting his/her decision-making skills.

The purpose of this embodiment is to accelerate the experience and improve the positional and judgment skills of officials in ice hockey by increasing the number of decisions made while observing actual hockey plays and maneuvers. Officials obtain practice in orientation, positioning, observation and judgment. Officials can rehearse preferred positioning so as to decrease interfering with play. Consistency and objectivity will be increased. The rules of the game will be reinforced in the minds of the officials. In addition, use of this embodiment of the invention may also help students and players of ice hockey to learn the rules and regulations of the game.

Figure 1:
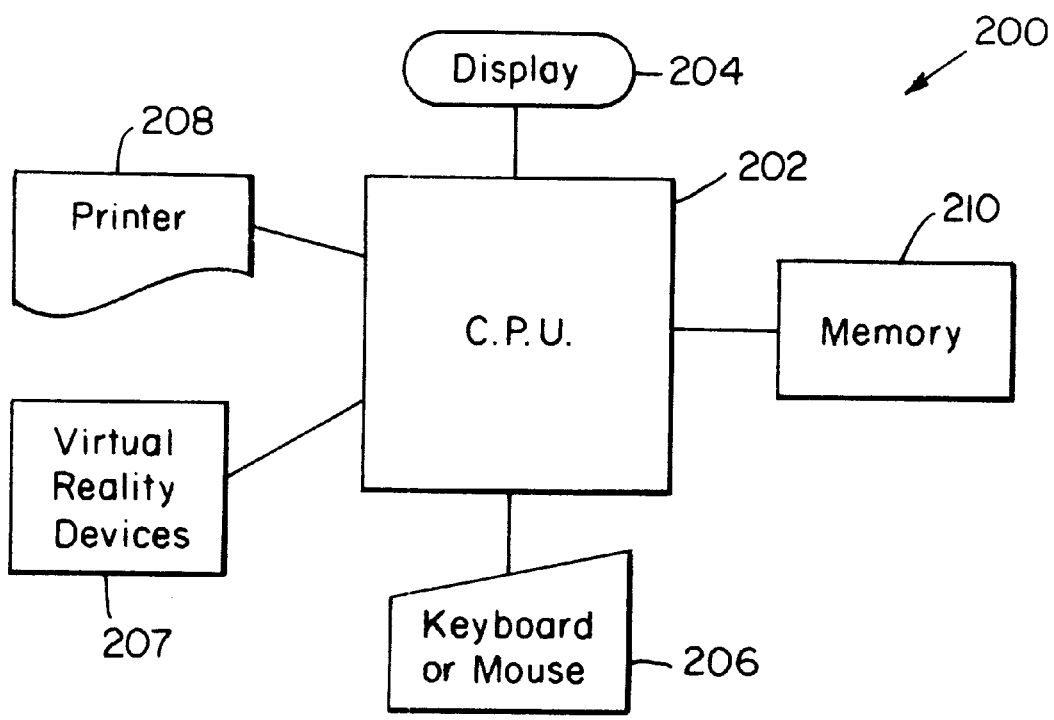
FIG. 1 is a block diagram of a computer software system constructed according to the present invention.

FIG. 1 contains a block diagram of one embodiment of the computer system 200 of the invention for simulating physical activities such as skating and hockey maneuvers and for entertainment use according to the present invention. The system comprises a central processing unit (CPU) 202 which can be, but is not limited to, a microcomputer such as a personal computer operating with in Intel 80X86 microprocessor, a Motorola 680X0 processor, or a Power PC processor. The CPU 202 is coupled to a display 204, such as a CRT screen, for displaying images and prompting the user for the input of information. The CPU 202 is also coupled to an input device or devices 206 such as a keyboard, joystick, etc., for the input of information from the user and a printer 208 for printing information such as player/student accomplishment information in hard-copy media. Input and output with the user can also be accomplished with virtual reality devices 207 such as a virtual reality glove and helmet worn by the user. A memory 210 is provided, coupled to the CPU 202, for the storage of program instructions and data, recorded images and other information.

Several versions of computer programs are encompassed by the present invention. Each version varies in complexity as each is directed toward a player/student at a different level of expertise. Versions developed for home, rink, and arcade use are instructional as well as entertaining. More complex versions for use in structured training facilities are developed. For each version, the computer system stores a series of lessons and corresponding "ideal" images in a database.

Figure 2A:
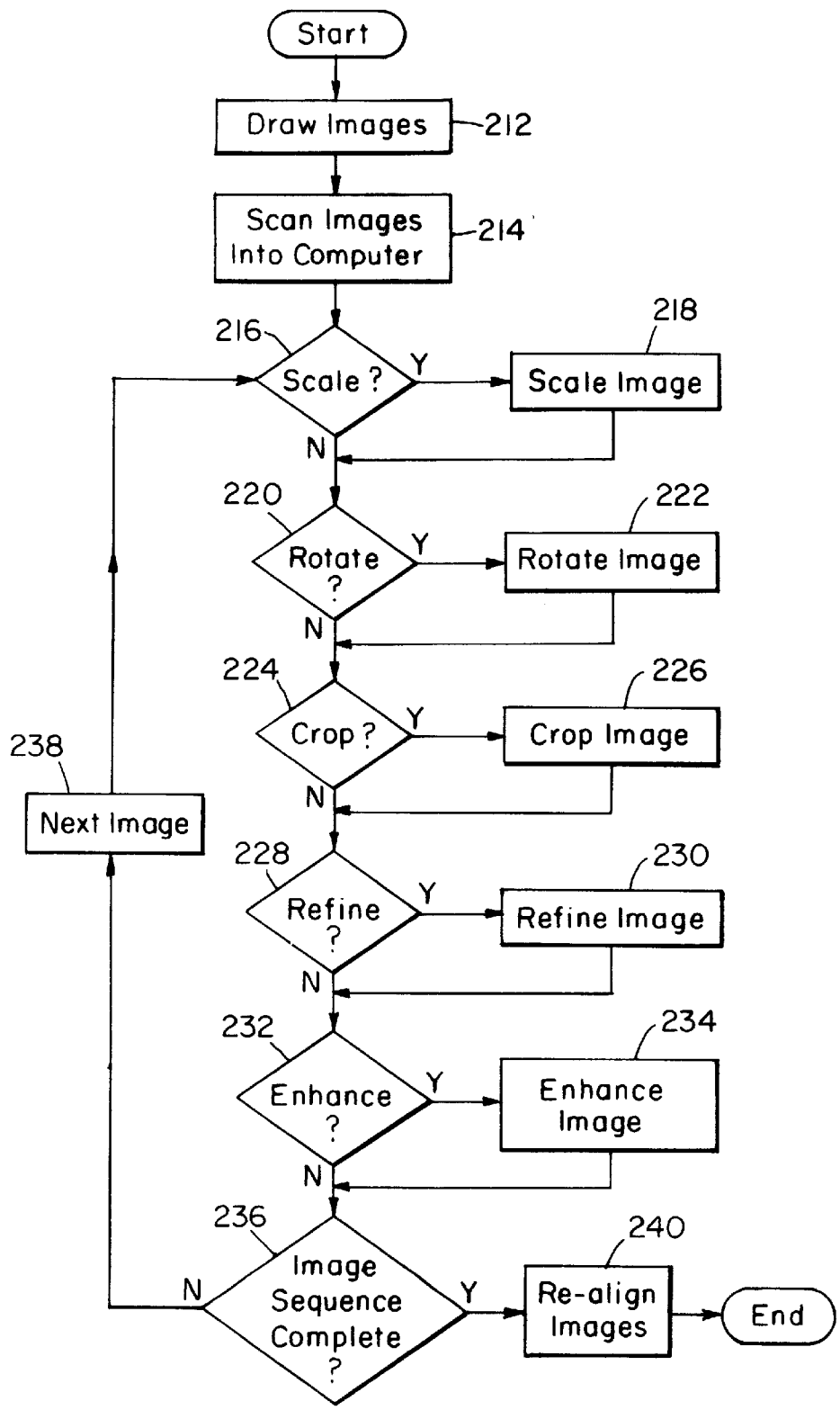
FIGS. 2A–2E contain flowcharts of the logical flow of the system of the present invention for preparation, processing of and interaction with video images.

FIGS. 2A–2E contain flowcharts which illustrate the logical flow of the computer system(s) used for the preparation and operation of the system of the present invention. FIG. 2A shows the procedure for scanning images into the computer system 200 and preparing them for display on the computer screen 204.

Steps 212 and 214, images for a particular skill or maneuver are scanned into the computer system 200. Individual drawings are created and scanned to complete the sequence of the instructive "master" or "ideal" hockey player performing the skill or maneuver as well as to encompass all possible movements that the player/student-controlled ("adopted") player may perform.

After all the instructive images in a given sequence have been scanned, the images can be prepared for display on the computer screen. This can be accomplished with a number of commercially available computer packages, including Photoshop, Photofinish, NeoPaint, Paint, Graphics Designer, and Correlpaint. In blocks 216, 218, 220, and 222, the images can be scaled or rotated, as necessary. If any images contain unwanted elements, they can be cropped by blocks 224 and 226. In blocks 228 and 230, the images can be refined to remove unwanted lines or blotches or to add lines that have faded during scanning. In blocks 232 and 234, the images can be enhanced by adding elements such as background or motion lines.

Each image is prepared in turn in the loop under control of blocks 236 and 238. After each image in the sequence has been prepared, it can be aligned with others on the computer screen in block 240. The preparation stage ensures that the images can be displayed as a smooth animation sequence when the program is run by users. All or any portion of a controllable figure can be displayed from any perspective.

In an alternative embodiment of the invention, images recorded by video tape can be used instead of the hardcopy drawings described above. In this case, video recordings are made of a particular skill or maneuver. Each frame of the video tape is digitized so that it can be stored in computer files using a standard such as JPEG (Joint Photographic Expert Group), MPEG (Motion Picture Experts Group), FLI, FLC, etc. The sequence of images if refined in connection with FIG. 2A. The result is a series of images in computer-readable form similar to those obtained from the hardcopy drawings described above. Images need not be exclusively drawn images or video images; mixed images may be used. Images can be obtained by videotaping an actual player performing a maneuver or by videotaping performance of the maneuver by preprogrammed robots such as the robots described in co-pending U.S. patent application Ser. No. 08/375,617, filed Jan. 20, 1995, entitled "Mechanized Robots for use in Instruction, Training and Practice in the Sport of Ice and Roller Hockey," by Vincent J. Macri, which is incorporated herein by reference. Polarized reflective markers can be attached to the player or the robot to enhance the video image. Alternatively, active motion sensors can be used.

Figure 2B:
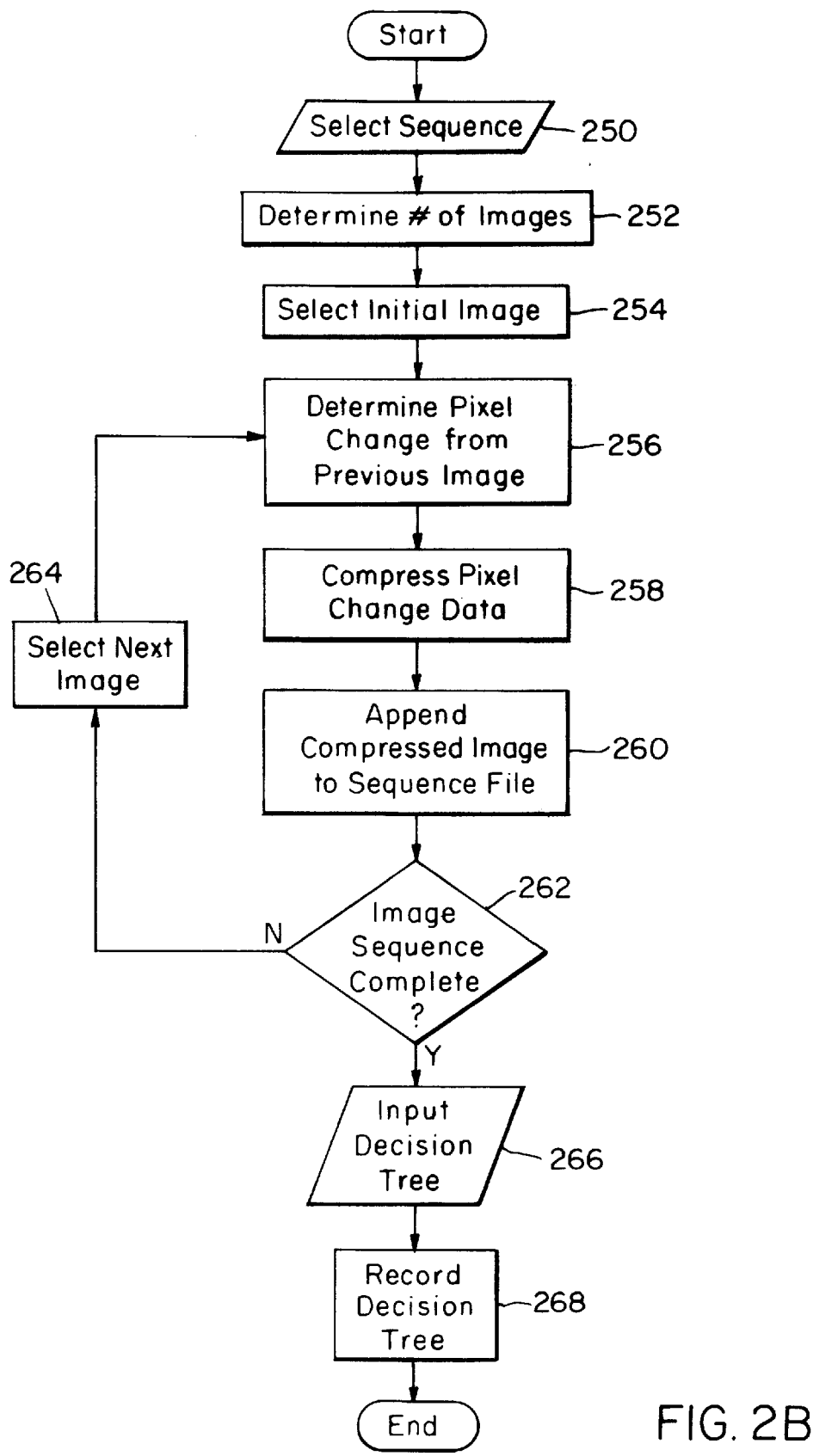

FIG. 2B contains a flowchart showing the process of compressing the computerized files containing each sequence of drawings to conserve storage space. The process involves comparing each drawing to the next one in the sequence and recording only those pixel elements which have changed from one drawing to the next. Other compression techniques also exist and may be used.

In blocks 250 and 252, a sequence of images is selected, and the number of images in the sequence is determined. Beginning in block 254, with the initial image that would appear on the screen, each drawing is compared to the previous drawing in the sequence. In the case of the first drawing in the sequence, the comparison is made to an empty screen. Each pixel element which has changed from one drawing to the next is identified in block 256 and the change data is compressed in block 258. The compressed data is then stored in a sequence file in block 260. This procedure is repeated for each drawing in the sequence in blocks 262 and 264.

Referring to blocks 266 and 268, the relationship between each of the drawings is input in the form of a decision tree and recorded in a computer file. In the case of the sequence of the drawings representing the instructive master or ideal image, the decision tree is defined as a linear relationship progressing directly from the first frame to the last. In the case of the player/student controlled image, each frame is connected to a series of other frames representing the different ways in which the student can move the animated figure. The relationship between each interconnected image must be defined and stored. To make the definition of the decision tree easier, each part of the body which moves (such as an arm or leg) can be defined as a separate series of images. Composition of several partial images into a whole can provide the completed image.

Figure 2C:
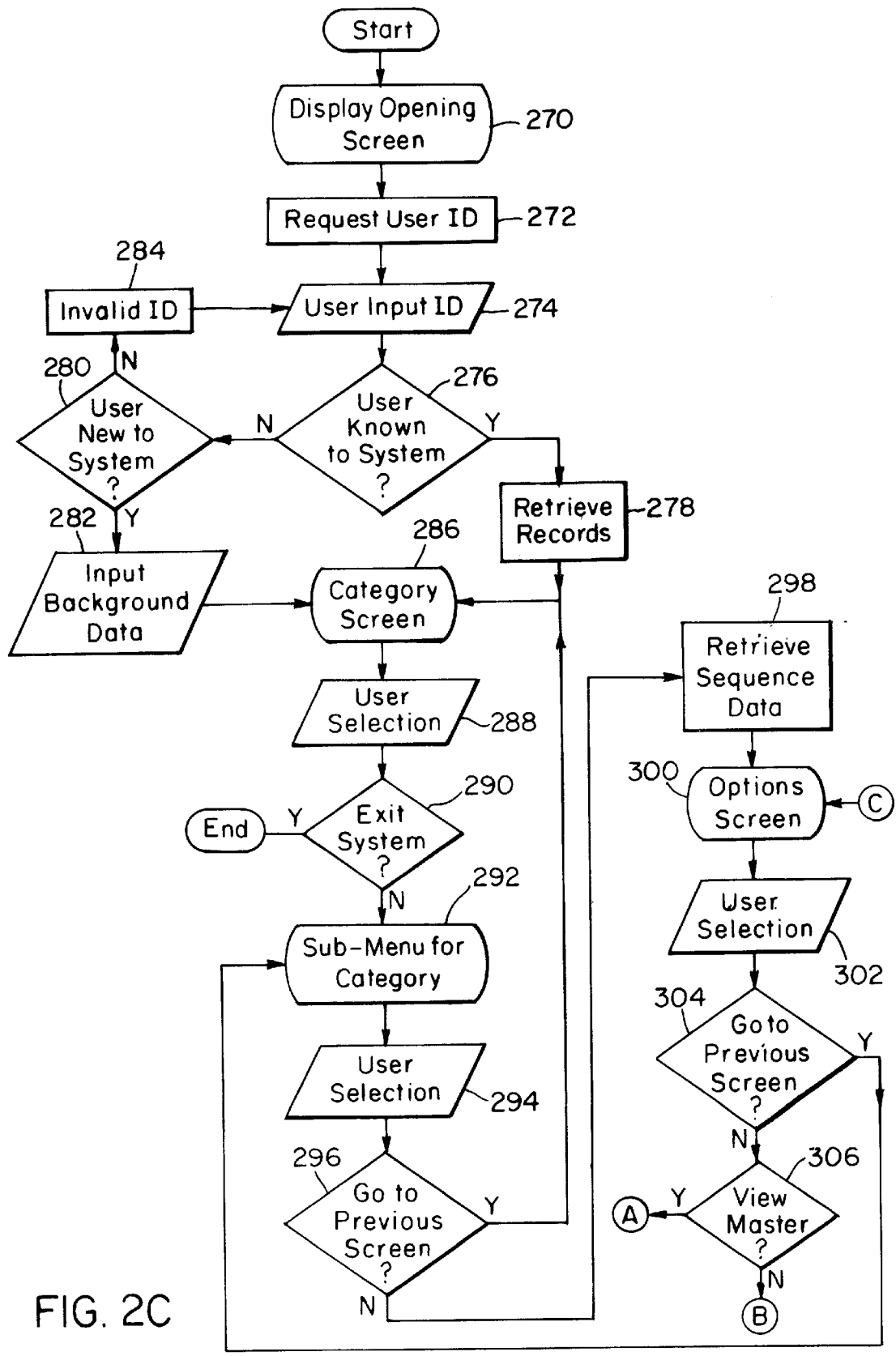
Figure 2D:
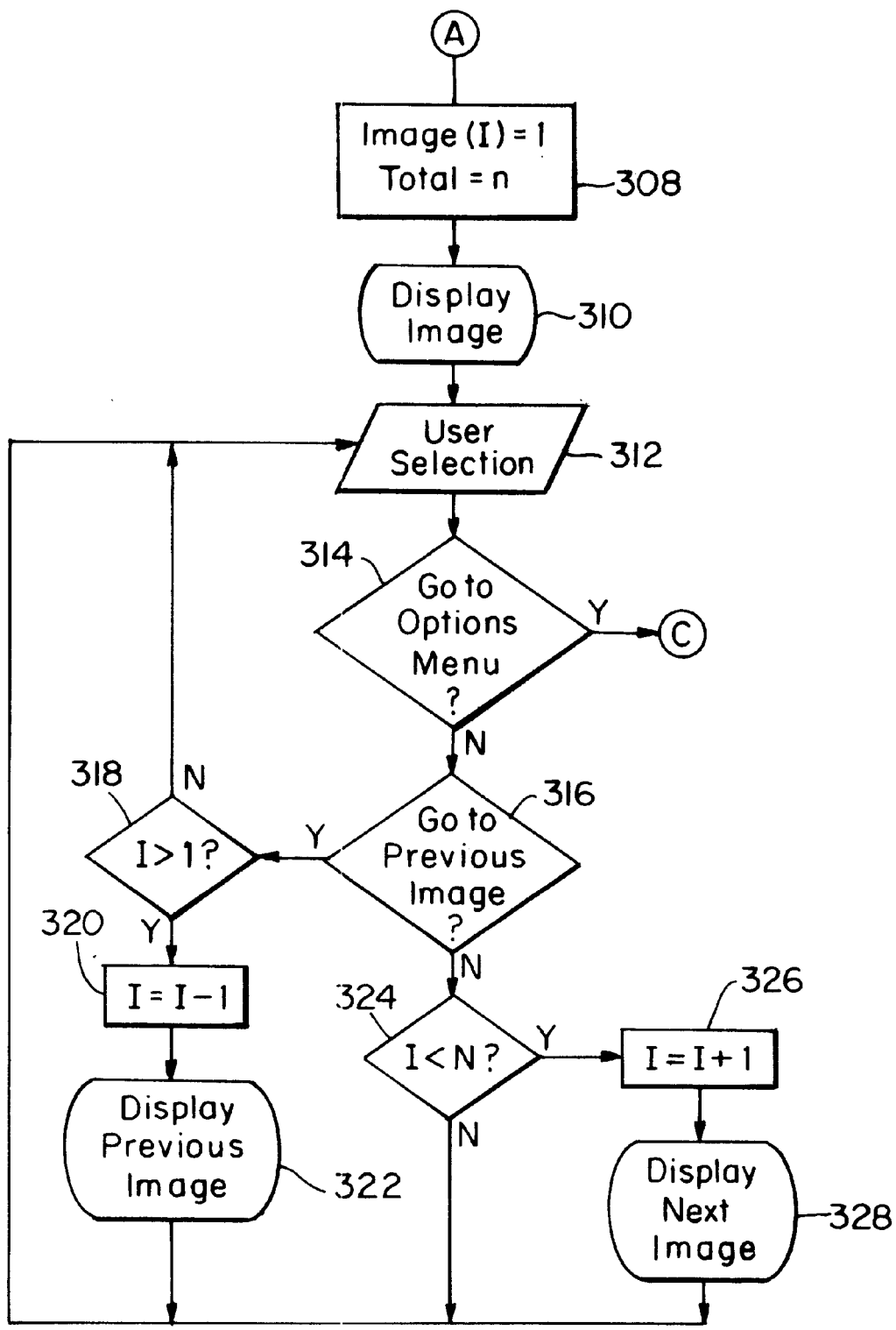
Figure 2E:
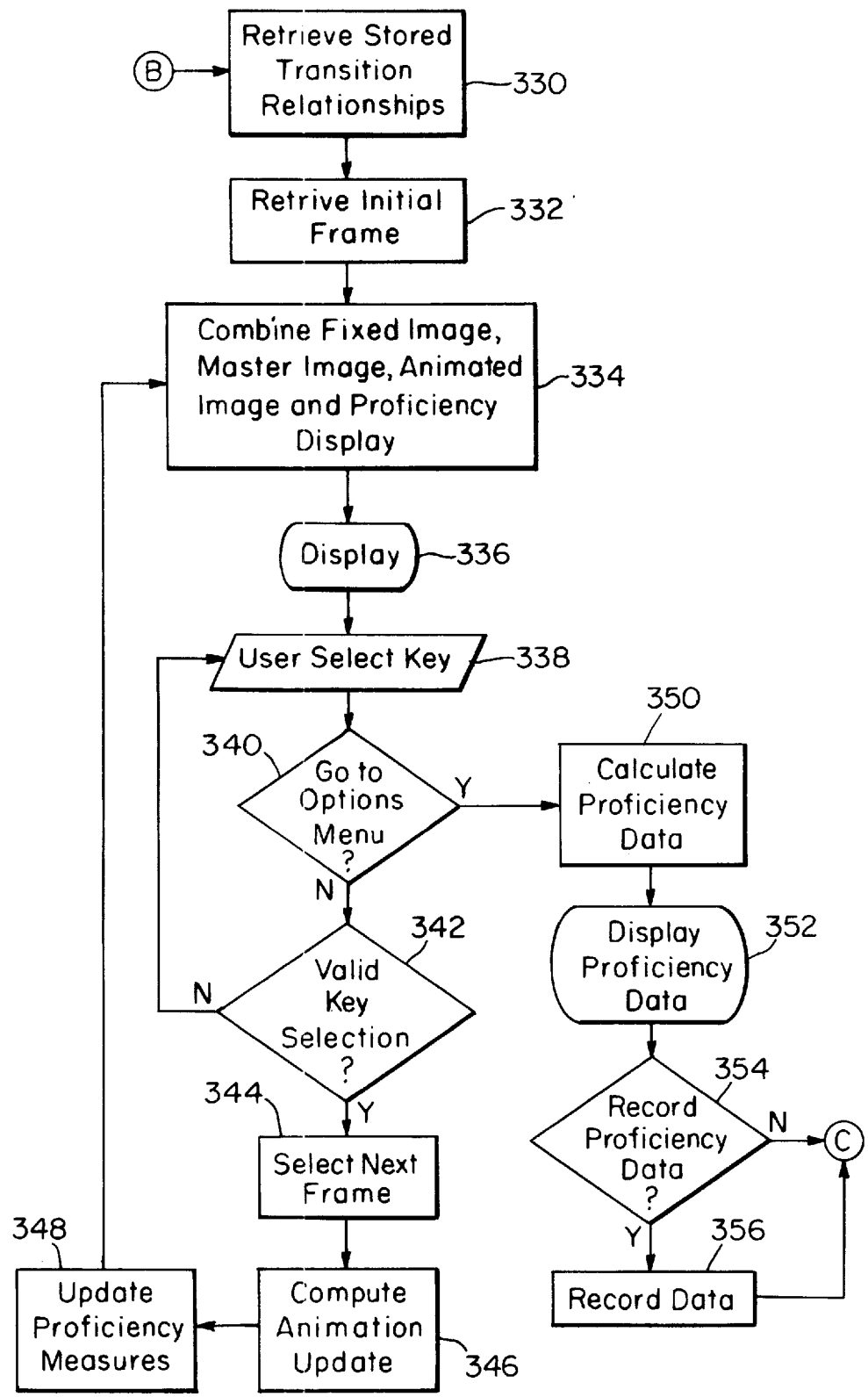
Figure 27:
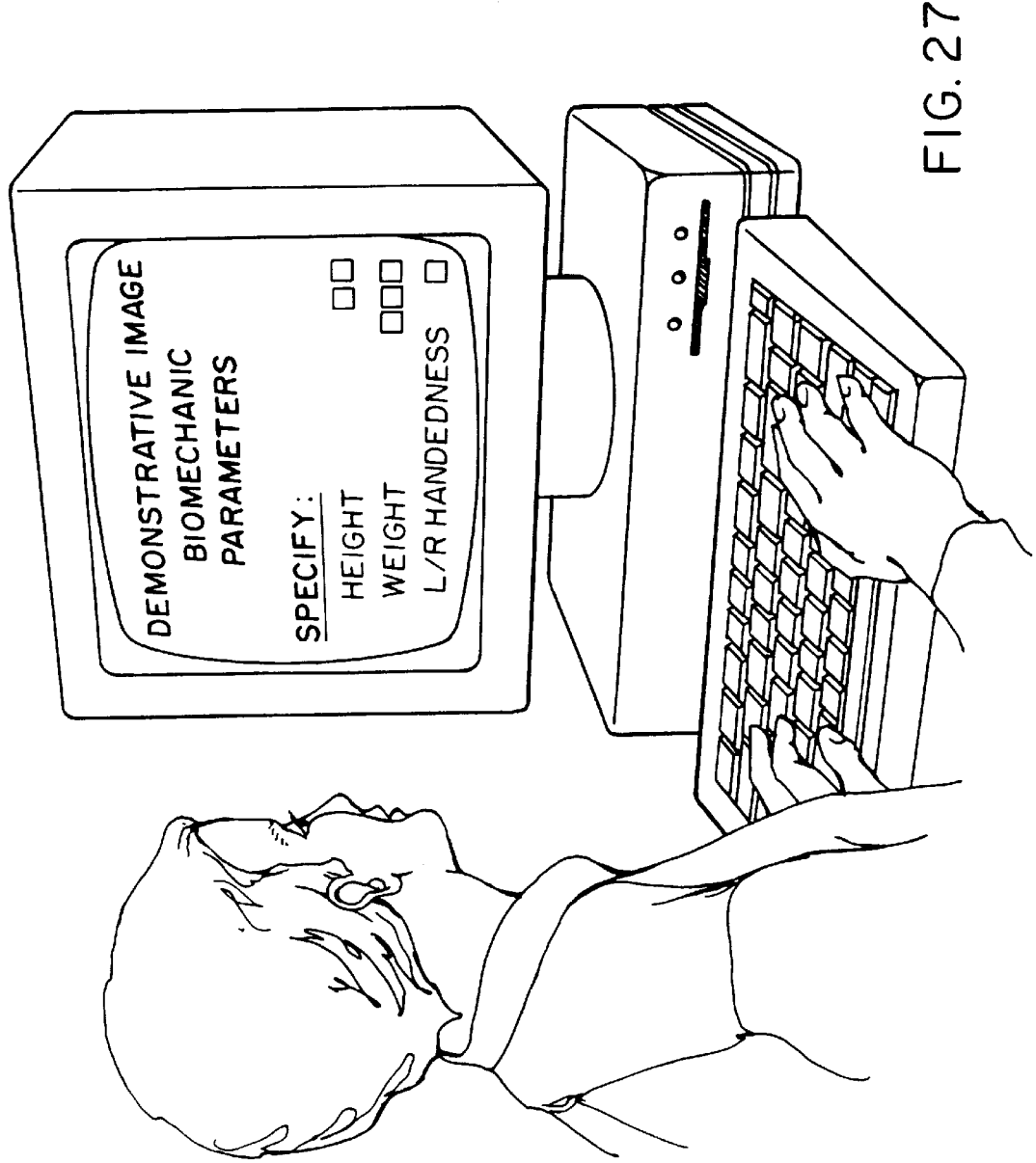
Figure 28:
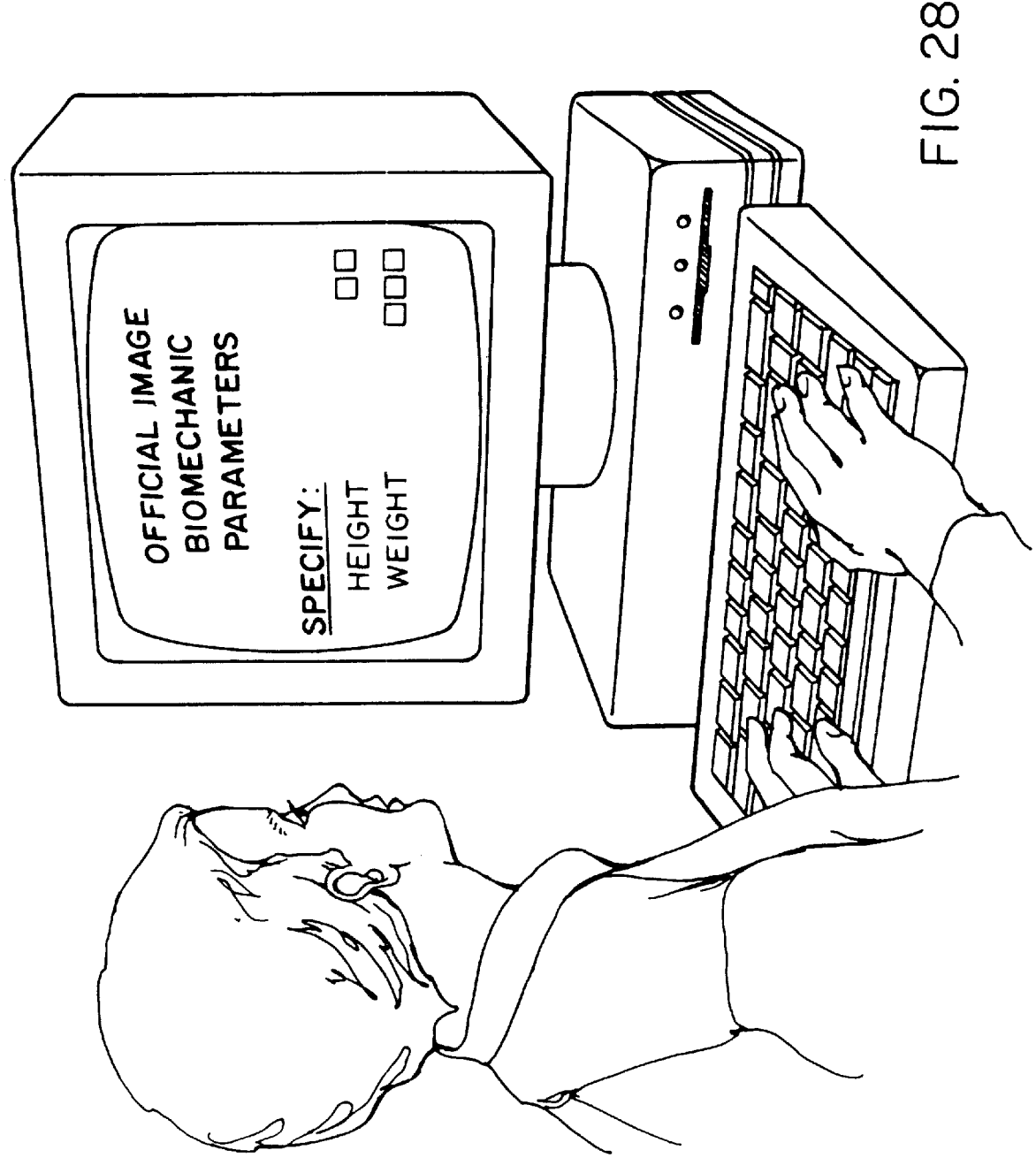

FIGS. 2C through 2E illustrate the logical flow of the system of the present invention that is run by the player/student or user. In block 270 of FIG. 2C, the system displays an opening screen on the computer display which contains a title, logo, and welcome message. In block 272, the computer requests a user identification code (ID) and, in block 274, the player/student enters an ID into the computer via a keyboard, mouse or other user input device. In block 276, the system determines if the user has entered the system before. If the player/student has previously entered the system, information regarding his/her personal characteristics (e.g. name, identification code, weight, height, age, right or left handedness, level of expertise, team name, and coach/instructor's Name (as shown in FIGS. 27 and 28)) as well as his/her performance record can be retrieved from the database in block 278. If the player/student is new to the system, information regarding his/her personal characteristics can be recorded by the system in blocks 280 and 282. If the player/student has entered an invalid ID, the system can return to the input stage via block 274 after informing the user in block 284.

Following the identification process, the player/student is presented with, in block 286, a menu of general categories which describe the skills used in the sport of hockey, e.g.

(1) skating
(2) checking
(3) stickhandling
(4) shooting
(5) offensive play

-continued (6) defensive play
(7) positional play
(8) situational play
(9) tactical play
(10) maneuvers.

In block 288, the player/student selects the number of the category he/she wishes to study and/or practice. If the player/student chooses to press <ESC> he/she will exit the system in block 290.

For each general category, the computer system stores a list or sub-menu of specific plays, maneuvers or skills which will develop the player/student's skills in the area selected. For example, under the category of skating, he/she may choose from the following options:

(1) dash—forward
(2) dash—backward
(3) start
(4) stop
(5) forward left crossover
(6) forward right crossover
(7) backward left crossover
(8) backward right crossover The sub-menu for the general category selected by the player/student will be displayed in block 292, and the player/student selects the maneuver or skill he/she wishes to study and/or practice in block 294. If the user chooses to press <ESC>, he/she will return via block 296 to the category menu in block 286.

Figure 23:
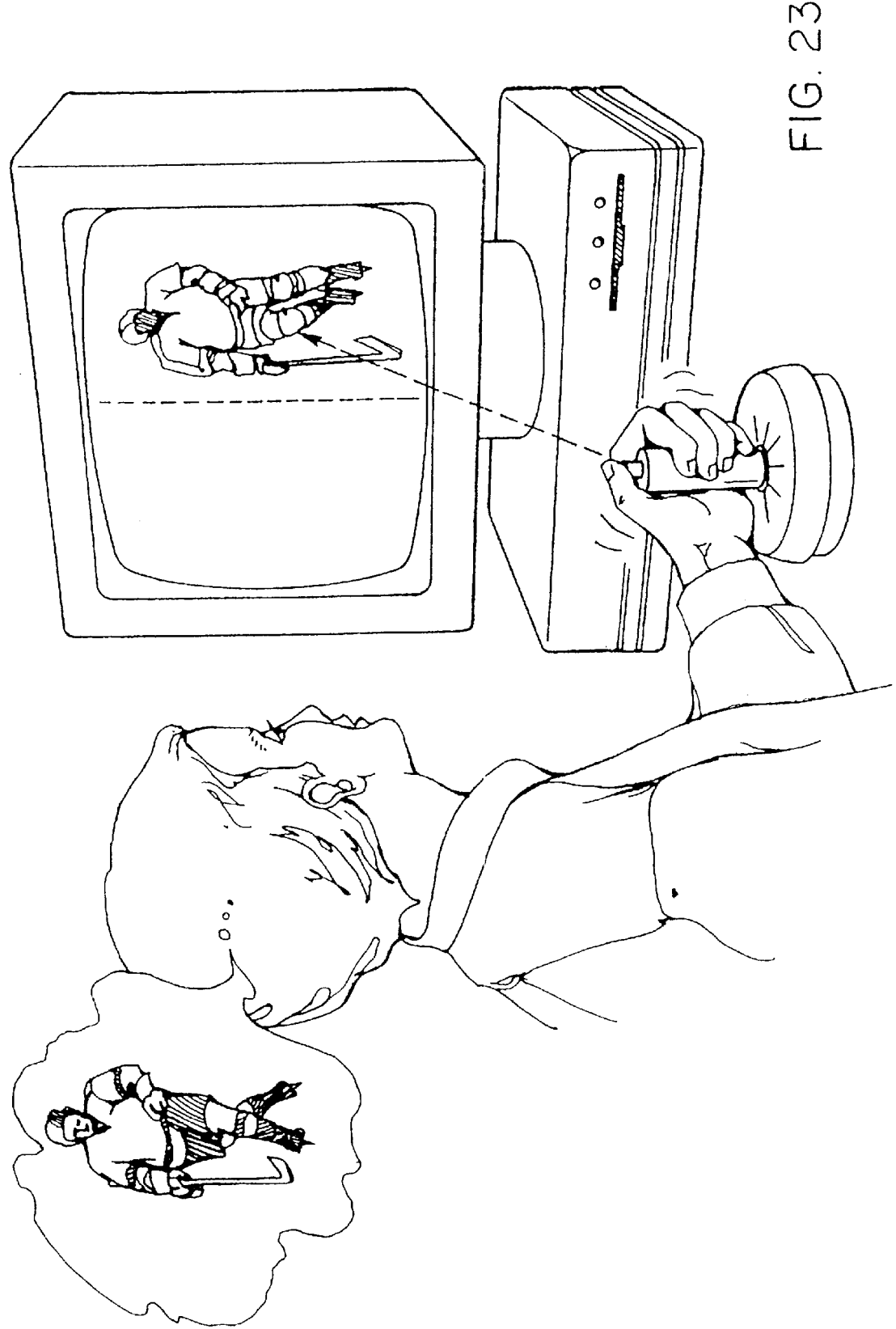
Figure 24:
Figure 26:
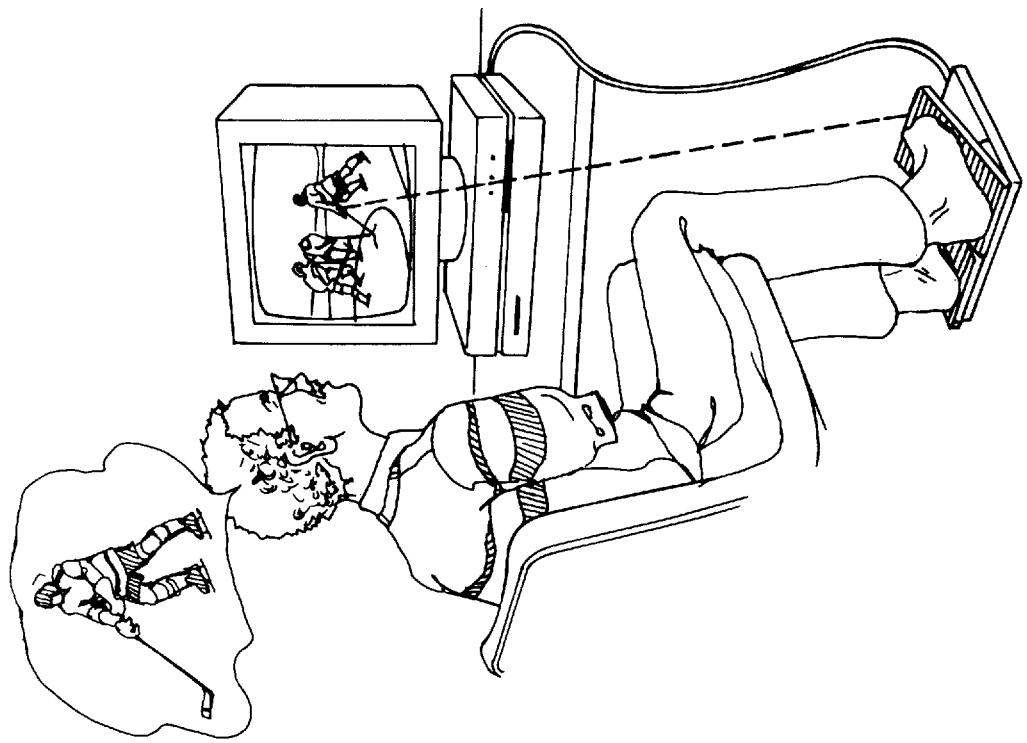
Figure 25:
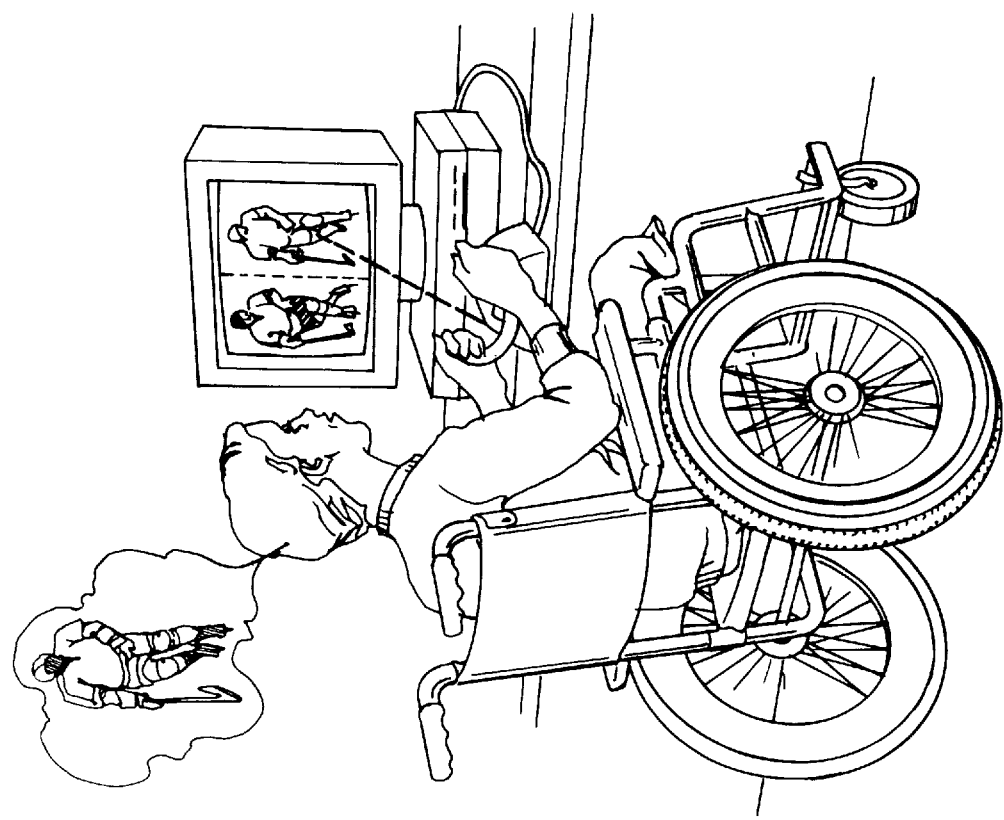

If the player/student opts to study a specific maneuver or skill, the system retrieves the appropriate image sequences from the image database in block 298. An options menu will be displayed in block 300. For each maneuver or skill selected, the player/student can either view the images of the ideal execution of the maneuver and/or interactively practice the maneuver or skill by manipulating via the user input device an adopted image of a hockey player which has been superimposed over or juxtaposed to the ideal image on the display (as shown in FIGS. 23 and 24). When practicing a skill, the player/student attempts to manipulate the adopted player image to approximate as closely as possible the execution of the skill by the ideal image. The player/student makes this selection from the options menu in block 302. If the player/student chooses in block 302 to press <ESC>, he/she will return to the skill menu block 292 via block 304. If the player/student chooses, in block 306, to view the master or ideal execution of the skill or maneuver, control of the system will pass to FIG. 2D. If the player/student chooses in block 306 to practice the selected skill or maneuver, control passes from block 306 to FIG. 2E.

Referring to FIG. 2D, if the player/student has chosen to view the master or ideal image, in blocks 308 and 310 if the player/student begins with the first image in the sequence. If the player/student chooses in block 312 to press ‚ESC., the system will return via block 314 to the options menu in block 300 (see FIG. 2C).

If the player/student chooses in block 316 to view the previous frame in the sequence, the system checks in block 318 to insure that a previous image exits, i.e., that the player/student is not currently viewing the first image in the sequence. If a previous frame exists, the system selects and displays the appropriate image in blocks 320 and 322.

If the player/student chooses in block 316 to view the next frame in the sequence, the system checks in block 324 to insure that a subsequent image exists, i.e., that the player/student is not currently viewing the last image in the sequence. If a subsequent frame exists, the system selects and displays the appropriate image in blocks 326 and 328.

Referring back to FIG. 2C, as mentioned above, if the player/student chooses in block 306 to practice the selected skill or maneuver, control passes to FIG. 2E. Referring to FIG. 2E, in block 330, the decision tree which describes the relationships between the drawings in the player/student controlled image sequence is retrieved. In block 332, the first image which will be displayed on the computer screen is determined and retrieved. In blocks 334 and 336, the first image in the master sequence, the first image in the player/student controlled sequence, the fixed image (or background), and the proficiency display graphics are combined and displayed.

In block 338, the player/student may exit to the options menu via block 340 or select a computer key (or other input device, e.g. mouse, joystick) which will move the controlled image. If the player/student selects an invalid key, the system will give the player/student the option of selecting another key in block 342.

If the player/student selects a key to manipulate the controlled image, the next frame in the sequence will be selected in block 344. The controlled image will be updated in block 346 and proficiency measurements will be calculated in block 348. The system will then return to block 334 where the images will be combined and displayed.

While practicing the skill or maneuver, the player/student receives visual feedback by studying on the computer screen (monitor) how closely the adopted image approximates the ideal image. In addition, proficiency measurements are calculated and displayed on the computer screen together with the master and controlled images. The proficiency measurements can be continuously updated as the player/student proceeds through the practice session.

If the player/student chooses in block 340 to return to the options menu, the system can calculate a numeric score or scores in block 350 which will represent how close the player/student came to approximating the ideal image. If applicable, the system can compare current results to those retrieved from the player/student's records. This will enable him/her to monitor his/her progress in perfecting the particular skill being studied. This information will be displayed on the computer screen in block 352.

If the player/student chooses in block 354 to count the practice session as a "warm-up", the current score will not be recorded in the player/student's record. Otherwise, the player/student's current performance will be recorded in block 356 by the computer for future reference. Control of the system then returns to FIG. 2C.

In a further embodiment of the invention, the player/student has the option of controlling the adopted image of one or more hockey players against an opposing team in the context of a game (this embodiment of the invention can be used for practice sessions or drills). The opposing team may consist of one to five ideal players (plus one goaltender) that are controlled by the computer system.

Figure 13:
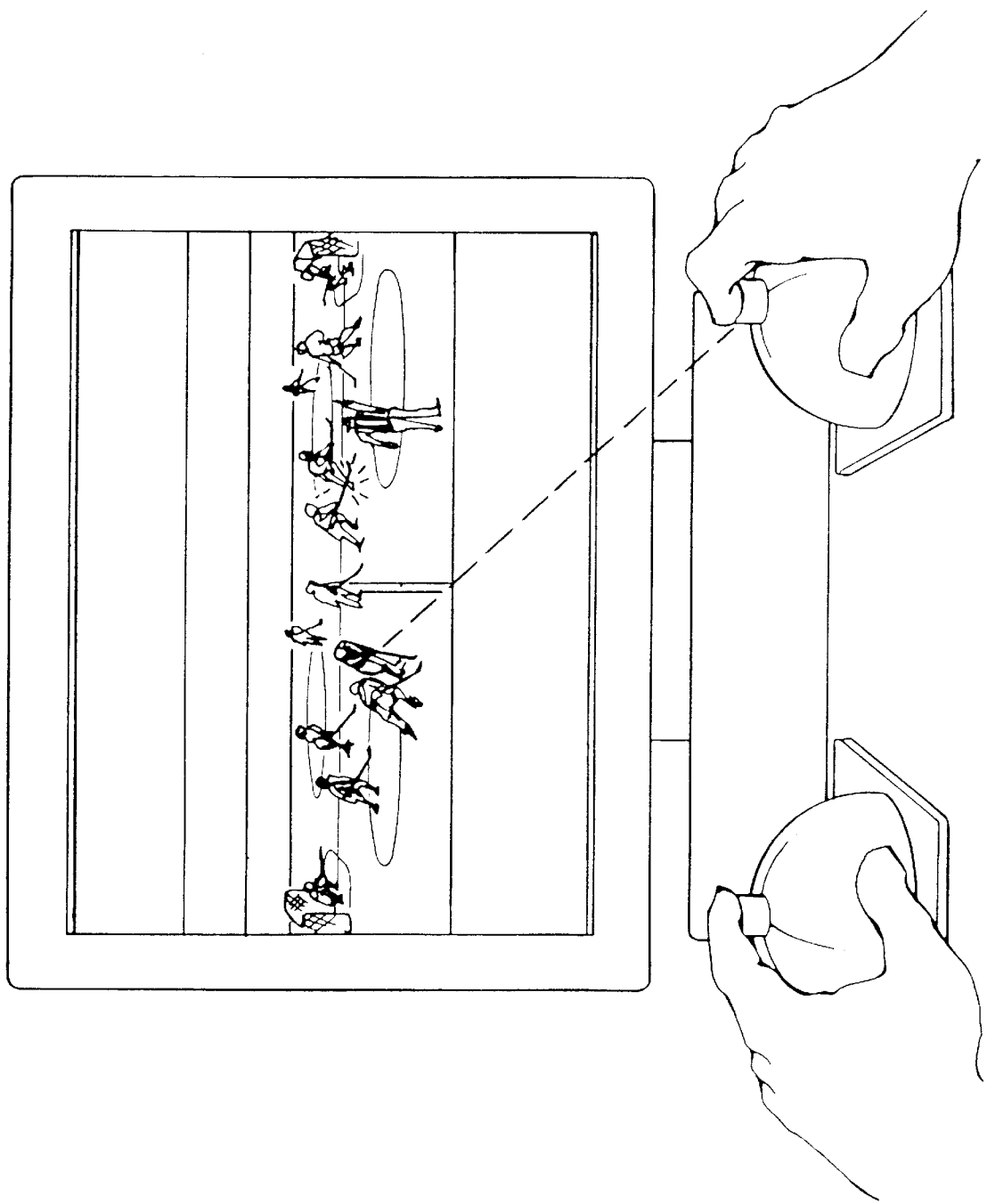
Figure 15:
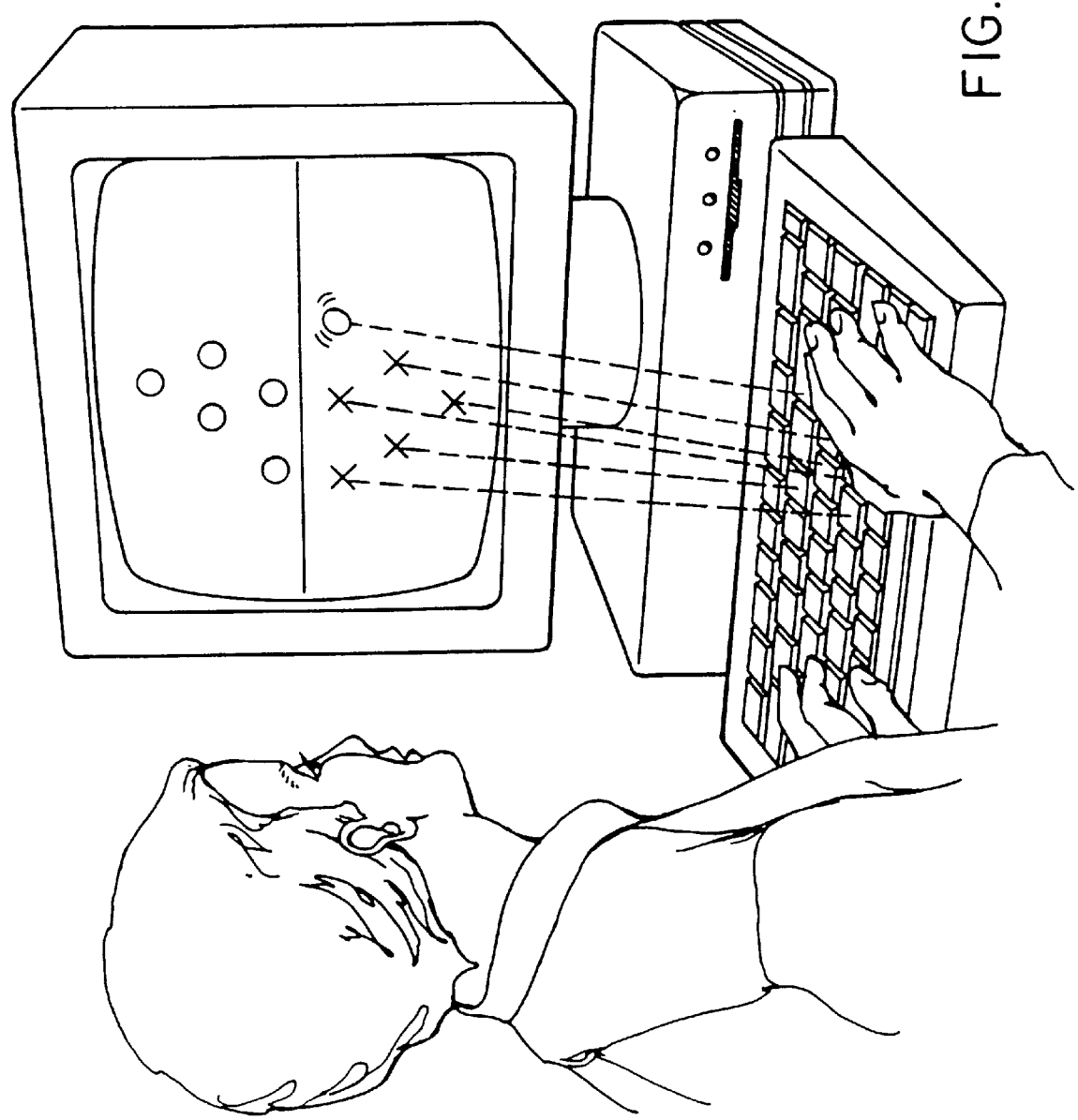
Figure 18:
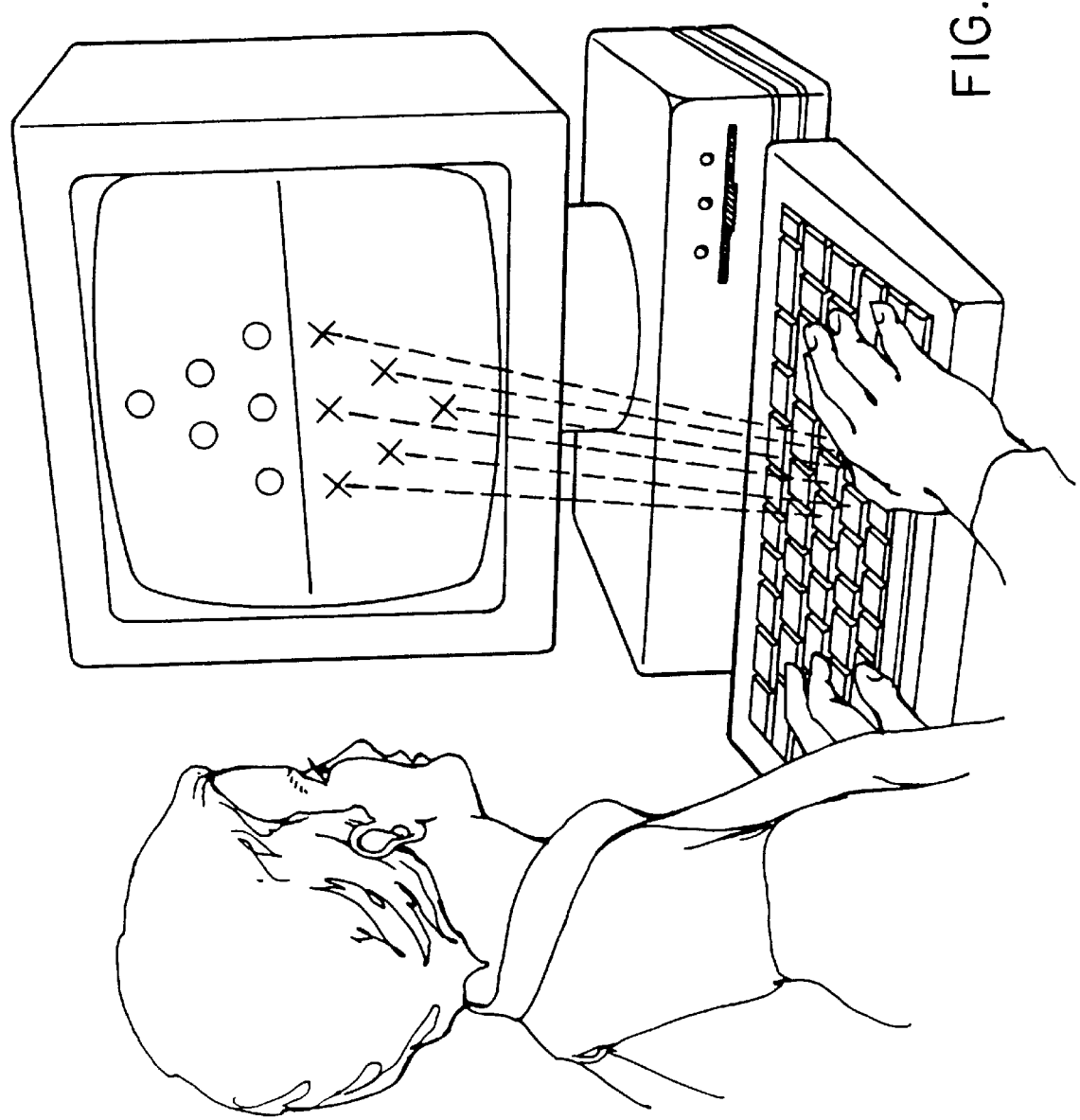

The player/student can select the number of players (one to six including goaltender) on the opposing team from a menu screen (as shown in FIGS. 15 and 18). In addition, the player/student has the option of choosing whether the opposing team is in an offensive or defensive posture (as shown in FIG. 13).

Figure 14:
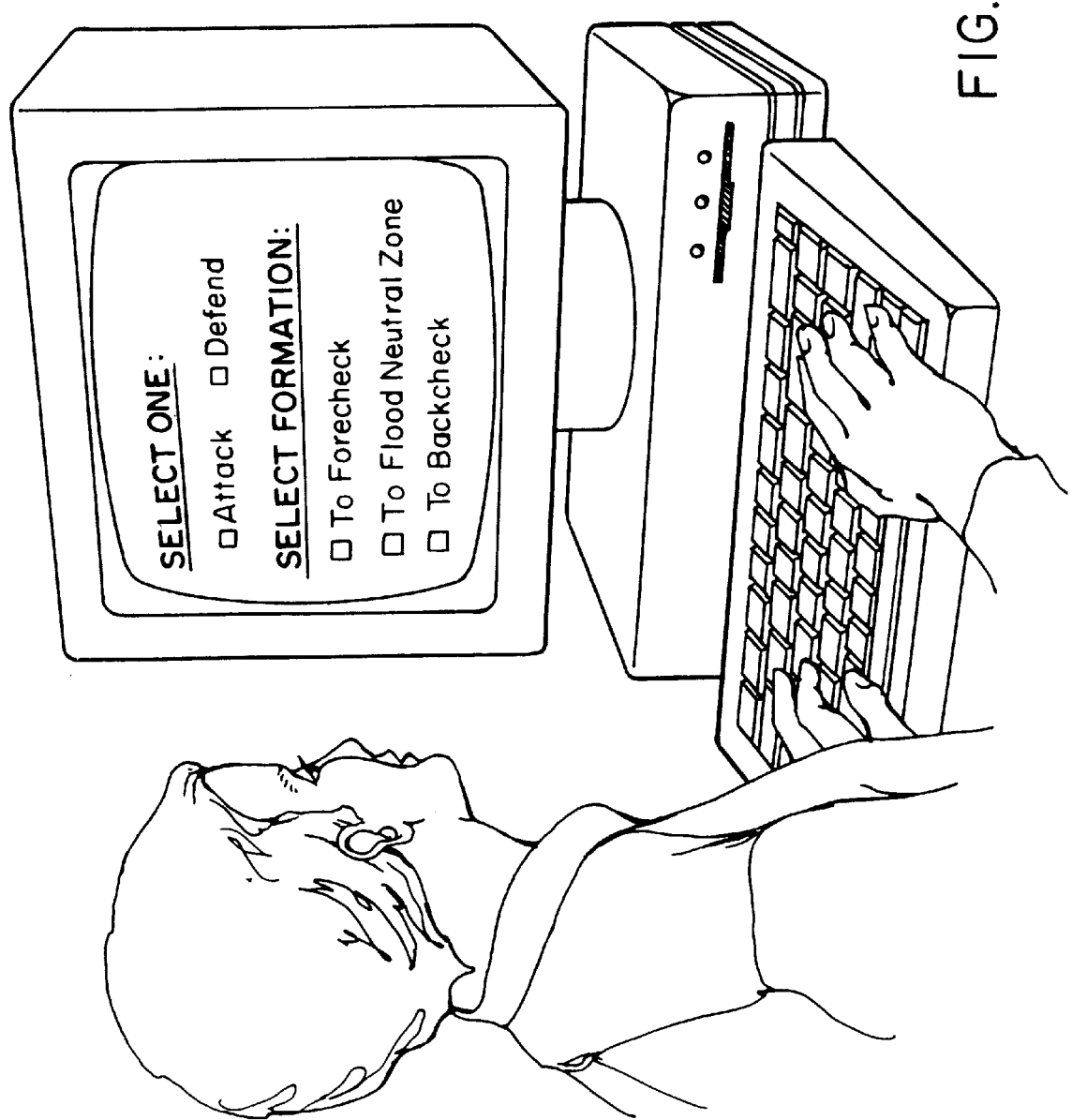

The player/student can then choose from a list of attacking or defending formations for the opposing team. The list of formations can vary with the number of players on the opposing team, it being obvious that a full team of six (5 skaters and one goalie) will offer the maximum number of formations (as shown in FIG. 14).

The game can be played with the player/student causing the movement of the adopted image(s) to "play" against the ideal team which is pre-controlled by the computer software. The rules of the game will be those generally used in competitive hockey, i.e. by most American, Canadian, and international teams. Games can last from 10 to 45 minutes (more or less) depending on the delivery system being used, e.g. tutorial/interactive, coaching, arcade, home, etc.

Additional embodiments of the invention enable the player/student to play against an opposing team when his/her adopted image is part of an adopted team. Each team may consist of ideal (computer controlled) images or adopted images controlled by other player/students on additional terminals connected to the system or networked together. Each team may consist of one to five players (plus goalies), with fewer players for roller hockey; and more or less for other sports or activities.

FIGS. 3 through 8 are schematic pictorial illustrations of use of the various embodiments and configurations of the present invention.

Figure 3:
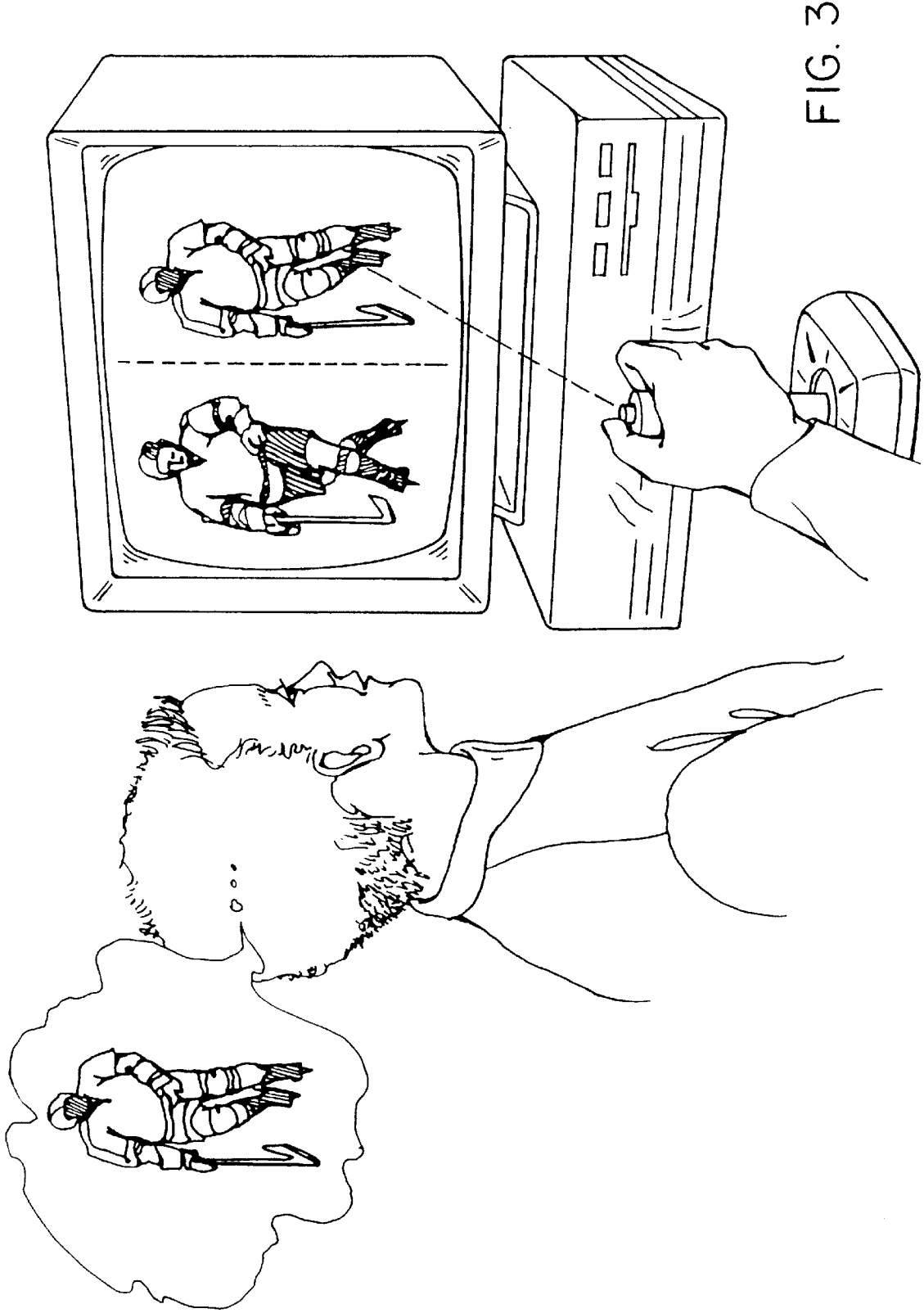
FIG. 3 is a pictorial diagram of a user interacting with one embodiment of the invention.

FIG. 3 shows a single user using the invention. The user supplies inputs via a hand-held joystick to manipulate an adopted figure on the right side of the screen to approximate movement of an image of an instructive, preprogrammed figure on the left side of the screen. The user views the preprogrammed image, recognizes what is being demonstrated, visualizes the performance of the maneuver, makes cognitive choices and decisions (including considering options) then manipulates the controllable, adopted image on the right side of the screen to achieve the instructed desired result.

Figure 4:
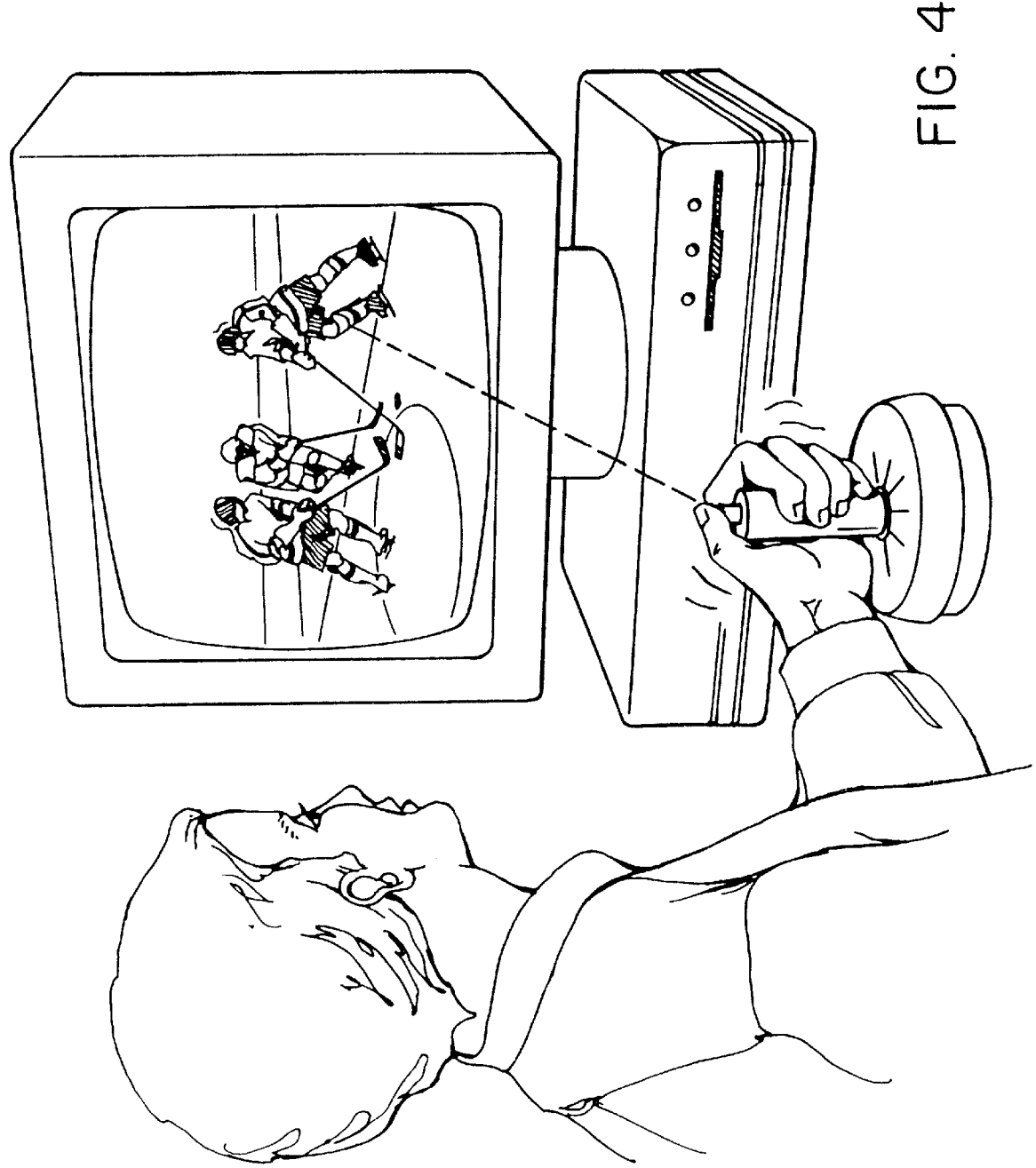
FIG. 4 is a pictorial diagram of a user interacting with an alternative embodiment of the invention.

FIG. 4 shows another single user interfacing with the computer system of the invention. In this embodiment, the user, in a competitive setting, manipulates the controllable image (shown connected to the joystick controller by a dashed line) to effect a result or accomplish an objective playing in opposition to two preprogrammed images. It will be understood that the number of preprogrammed and controllable images can be different than those depicted in FIG. 4.

FIGS. 5A and 5B show two users using the invention simultaneously on two different computers which are networked together. In this configuration, two instructive images on the left side of the screen are approximated by two adopted, controllable images on the right side of the screen. The first user (FIG. 5A) manipulates one of the adopted figures to emulate a repositioning movement of one of the instructive figures, and the second user (FIG. 5B) manipulates the other adopted figure to emulate the repositioning of the other instructive figure.

Figure 6:
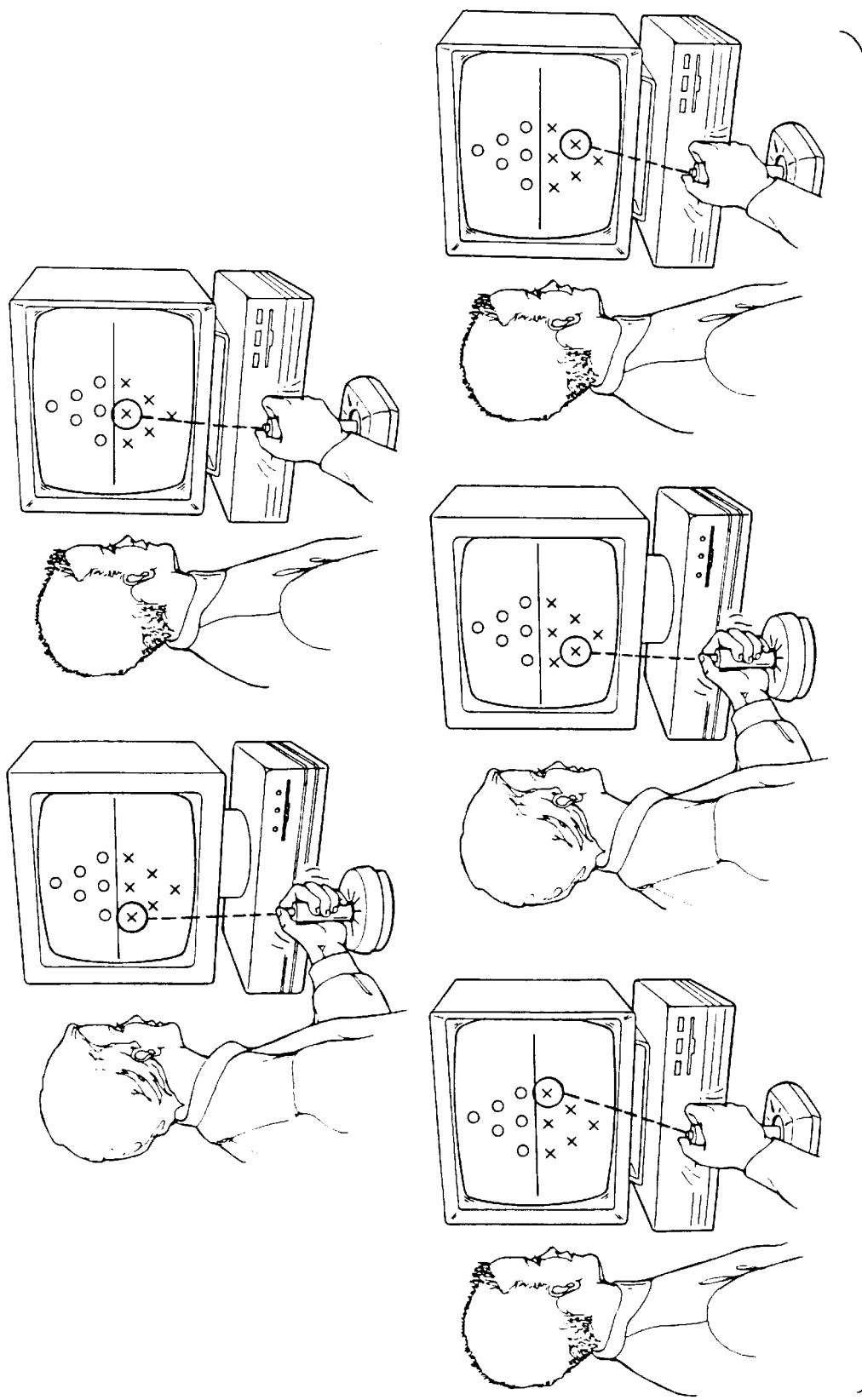
FIG. 6 is a pictorial diagram of multiple users interacting with another alternative embodiment of the invention.

FIG. 6 shows multiple users simultaneously interfacing with the method and apparatus of the invention on multiple networked computers. In this configuration, multiple users manipulate controllable images in a team setting against a preprogrammed team, with each user controlling one of the five controllable figures. Alternatively, the system can be used such that the opposing team is also comprised of controllable images.

Figure 7:
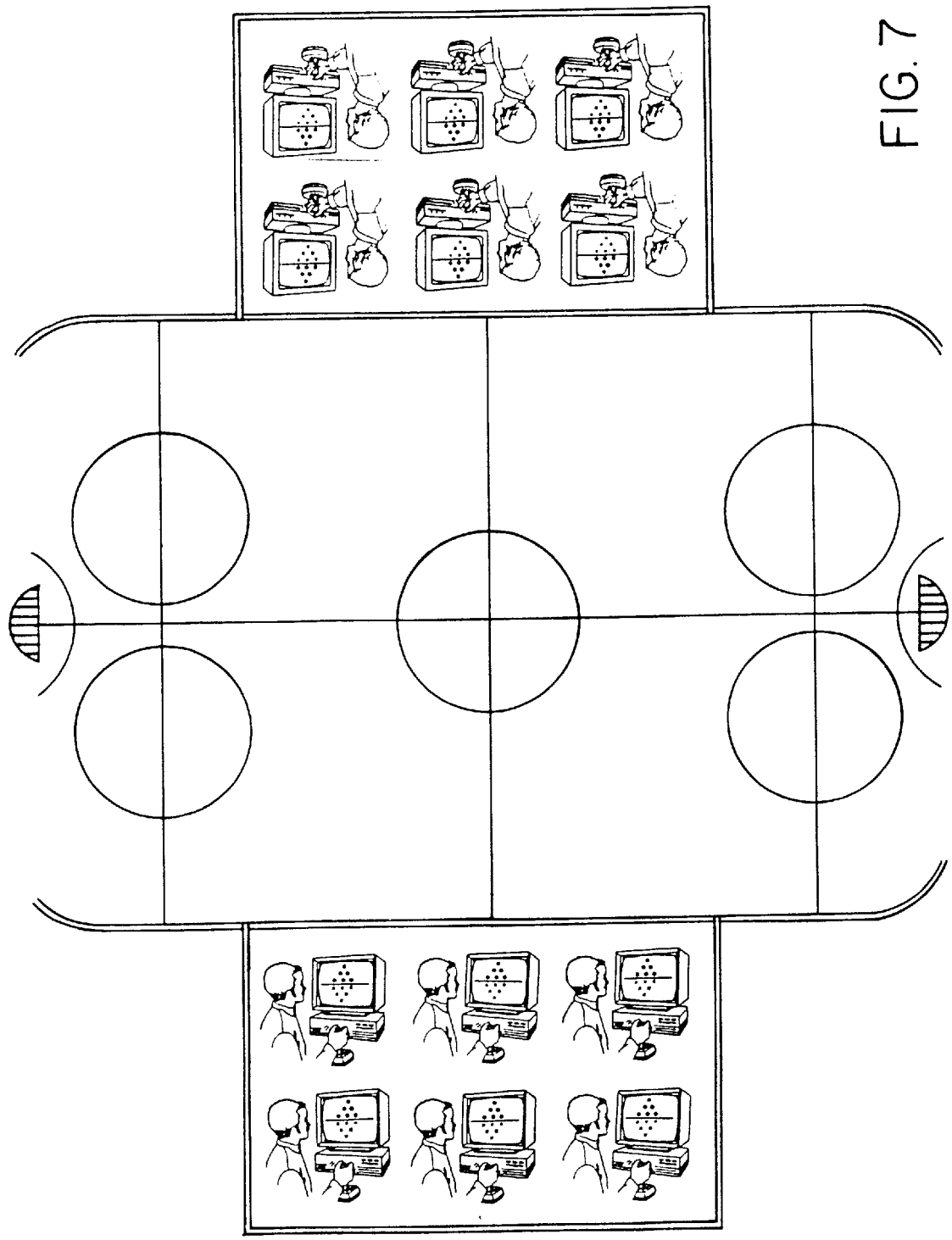
FIG. 7 is a pictorial diagram of multiple users interacting with another alternative embodiment of the invention.

FIG. 7 is a pictorial view showing multiple users interfacing with the invention. Again, the individual computers are networked such that all of the users can interface with the invention simultaneously. In this embodiment, the system is installed in a skating rink setting such that it is conducive to practice and training. The skating rink can be of the type described in co-pending U.S. patent application Ser. No. 08/375,606, filed Jan. 20, 1995, entitled "Interactive Ice and Roller Hockey Training Coaching and Playing Rinks," by Vincent J. Macri, which is incorporated herein by reference.

Figure 8:
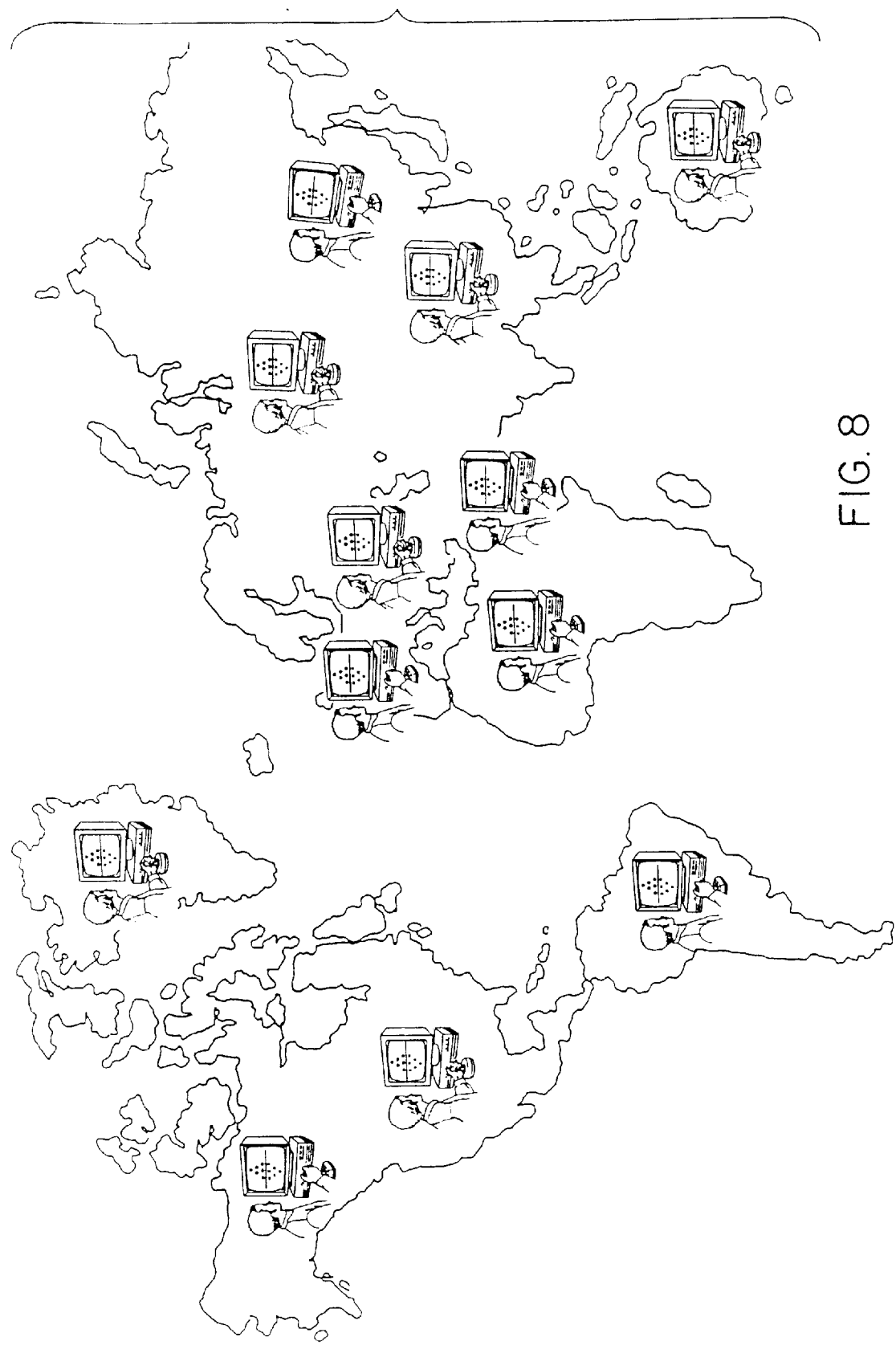
FIG. 8 is a schematic pictorial diagram of another alternative embodiment of the invention used in conjunction with the worldwide Internet.

FIG. 8 is a schematic pictorial depiction of the invention being used by multiple users simultaneously with the systems being connected over the worldwide Internet. This configuration allows users remotely located from each other to simultaneously interface with the invention and with one another.

Figure 33A:
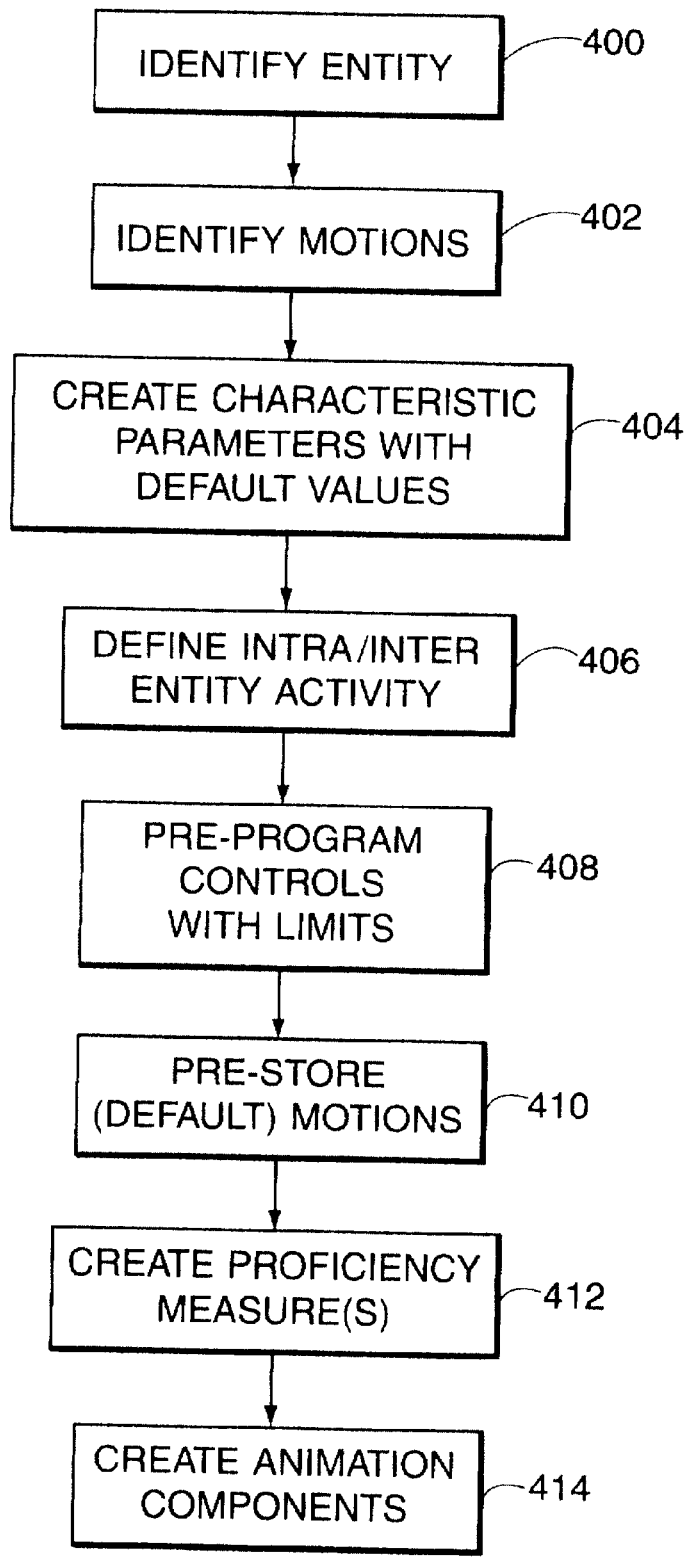

FIGS. 33A–33E contain flowcharts which illustrate the logical flow of the computer system(s) used for the preparation and operation of the method of the present invention. FIG. 33A shows the procedure used for preparing the method to create a new entity to perform the simulated physical movements of the activity.

Step 400 requires the method to identify the entity being created. This may be any previously living thing, presently living thing, object, system or some fanciful entity. For the entity in question, the next step 402 is to identify the motions used to perform the simulated physical movements of the entity. These may be wholly new motions for the entity or refinements to previously created entity movements.

Step 404 creates characteristic parameters of the entity identified in step 400 and motions identified in step 402. These parameters are also given default (initial) values which the user may select to change at a later time. Parameters of the entity may include such things (where applicable) as size, weight, handedness, etc. Parameters of the motion(s) may include such things (where applicable) as number of fingers, finger size (related to entity size) and specific ability for motion (number of joints).

Step 406 defines the combinations of motions which combine to perform the simulated, physical motions of the activity. Some (intra) motions relate to self relative motions of the entity (close the fingers into a fist) while other (inter) motions relate to external motions of the entity (strike something with a fist).

Step 408 defines pre-programmed motions along with their limits such as the finger joint can move from 0 to 90 degrees (but not from −90 to 90 degrees). The user cannot later change these, though some limits may be specified as changeable parameters (Step 404).

Step 410 defines pre-stored motions such as (all) fingers close together at such and such a rate of closure. It is expected that the user will define pre-stored motions as the user reaches a specific-simulated motion in his/her progression through the activity. Further exercise of the specific motion will allow the user to refine the pre-stored motion to the user's own idiosyncratical style.

Step 412 defines the means by which a proficiency measure for each motion may be made, e.g. the rate and degree to which closure of the fingers is achieved. In addition, overall proficiency measures are defined as summations of individual motion proficiency measures.

The last step 414 of creating an entity defines the methodology of combining the parameters, limits and motions to construct the components by which the processing system can display image representing the resultant simulated physical motion. These components will be used to display all or part of the controllable image, performing the motion and observed from an arbitrary point of view.

Figure 33B:
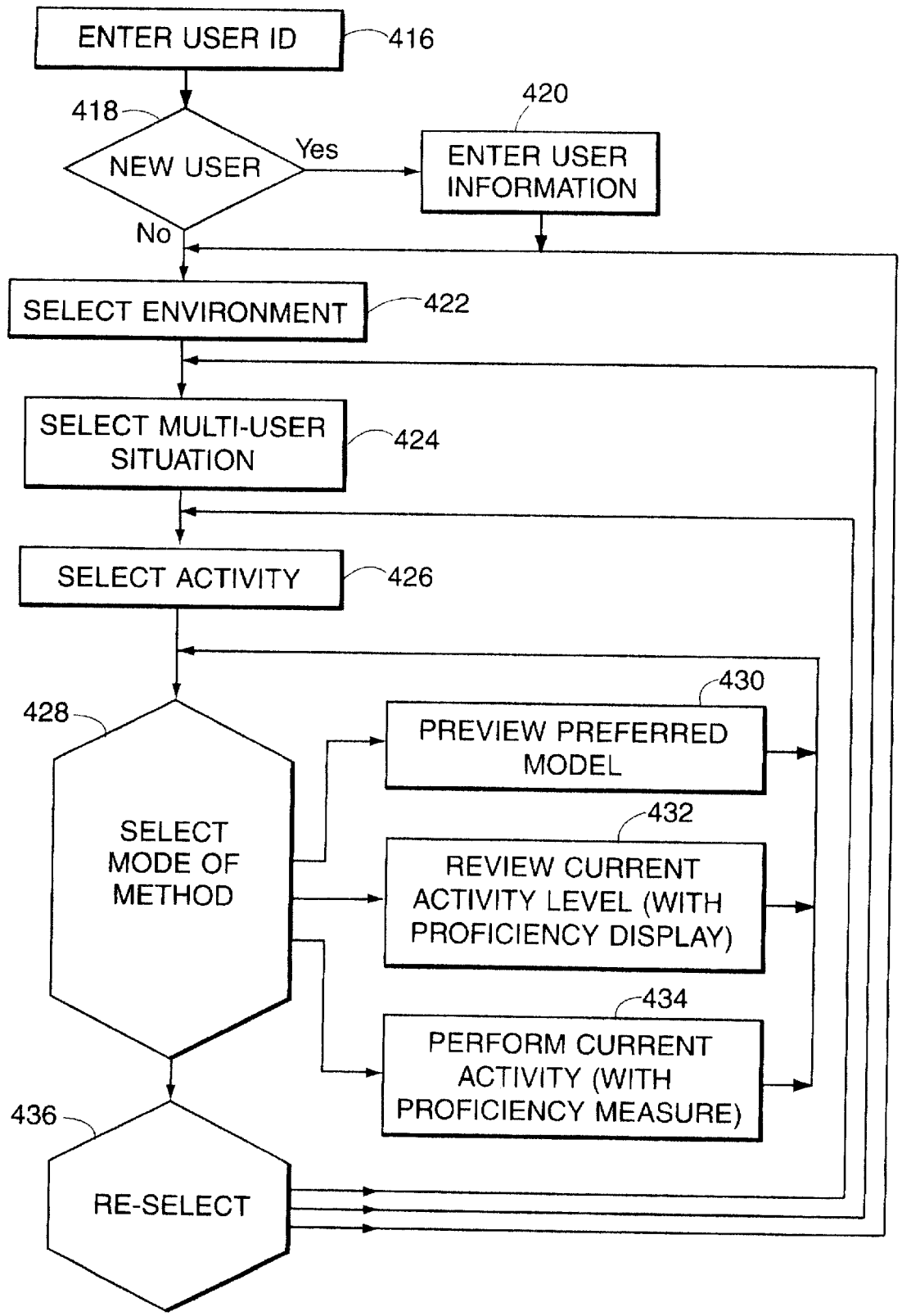

FIG. 33B shows the procedure used for operating the method of the present invention. Step 416 allows a user to enter into the processing system by identifying himself/herself. This identification is later used to identify the specific user's parameters and pre-stored motions, distinguishing the user from other users of the processing system method. If the user is new to the system, step 418, their user specific information is specified in step 420. In step 422 the user selects the environment (world) he/she will participate (what kind of entity bulldozer, microbe, living thing he/she wishes to be). In step 424, the user selects the form of instruction coach/teacher/self directed, independent, cooperative with other user, intranet/internet accessed, etc.) he/she wishes.

In Step 426, the user selects the specific interactive simulated physical movement which is to become the object of the instructional session. For the activity, the user selects, in step 428, how the user wishes to participate in the activity. Step 430 allows the user to preview the (pre-programmed) model of the preferred performance of the activity. Step 432 allows the user to review the current level of achievement (pre-stored and pre-programmed) the user has reached in the performance of the activity. Also provided to the user is a proficiency measure related to the idiosyncratic pre-stored simulated physical movements the user has previously demonstrated in the activity. Step 434 allows the user to perform the simulated physical movements of the activity so as to define or refined the idiosyncratic pre-stored simulated physical movements of the activity.

Step 436 allows the user to go back and change any of the earlier selections made by the user, e.g. go from coached to self directed study, or change the specified activity, etc. Also provided in step 436 would be the ability of the user to pause (a stop) to eat or take care of other individual needs.

Figure 33C:
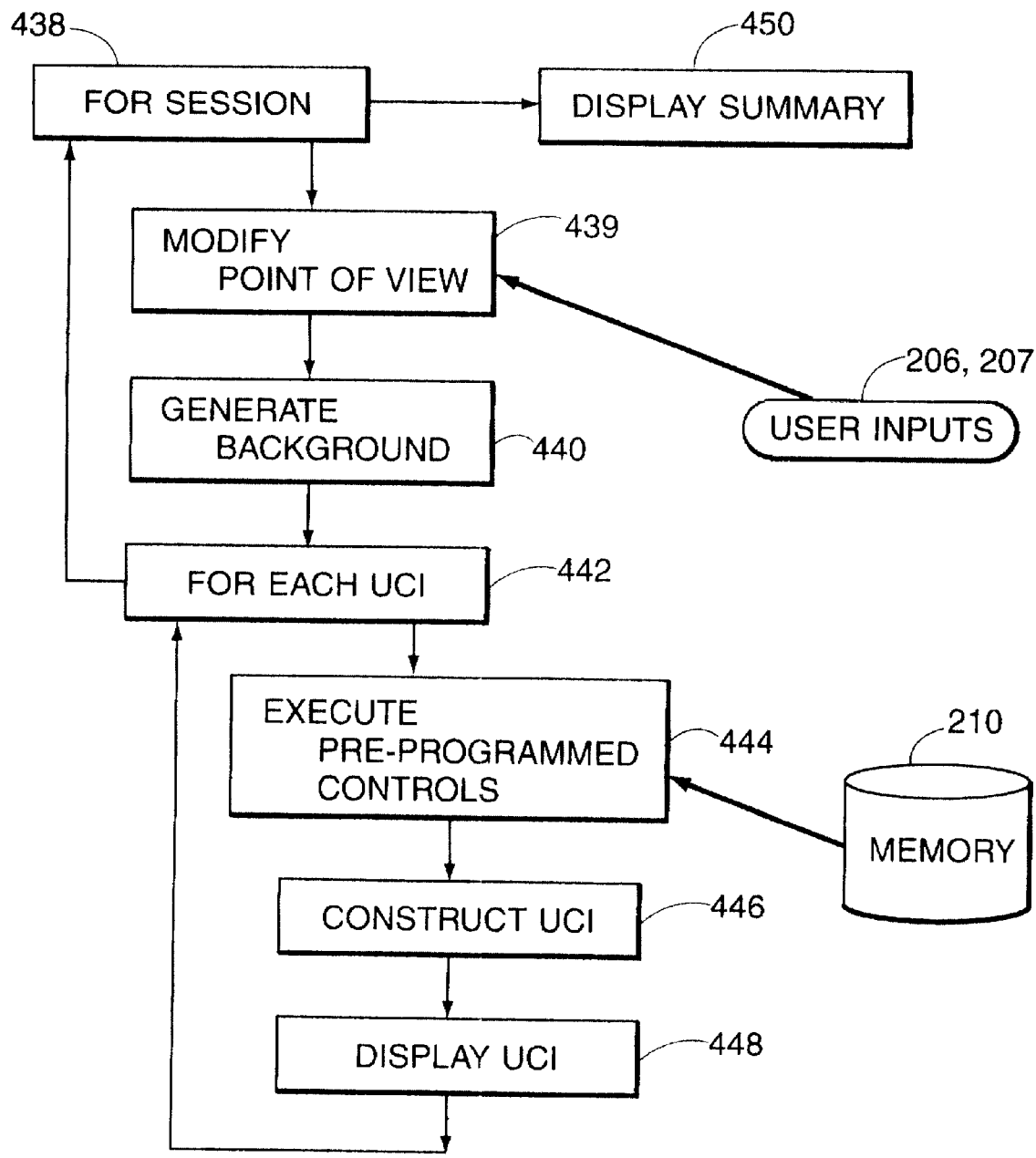

FIG. 33C shows the procedure (sub-routine) of FIG. 33B Step 430—the user selects to preview the (pre-programmed) model of the preferred performance of the simulated physical movements of the activity. For the duration of the preview session, step 438, the method performs the following steps (until completion or termination is indicated by the user). Some (optional) user inputs may be used to change the display point of view (position and/or orientation with respect to display axes) in step 439. This corresponds to moving the camera through which the user views the display.

In Step 440, a background image is retrieved/constructed to reflect the environment, multi-user situation and activity choices of the user. For each uci involved in the activity (as previously selected), step 442, the method performs the following steps. Step 444 executes the pre-program of motions of the activity. Step 446 constructs a uci reflecting the pre-programmed motions by executing the defined methodology of preparation step 414. The resultant uci is displayed in step 448 (with the background from step 440 and other step 448 uci's). Where the total number of uci's have been included in the display, the preview continues with step 438. When the preview is complete (or complete to the user's satisfaction) step 438 terminates and any results (length of session, activity result measure (impact of striking fist), number of resultant motions, etc.) a summarized to the user in step 450. Method flow then reverts (returns) to FIG. 33B step 430.

Figure 33D:
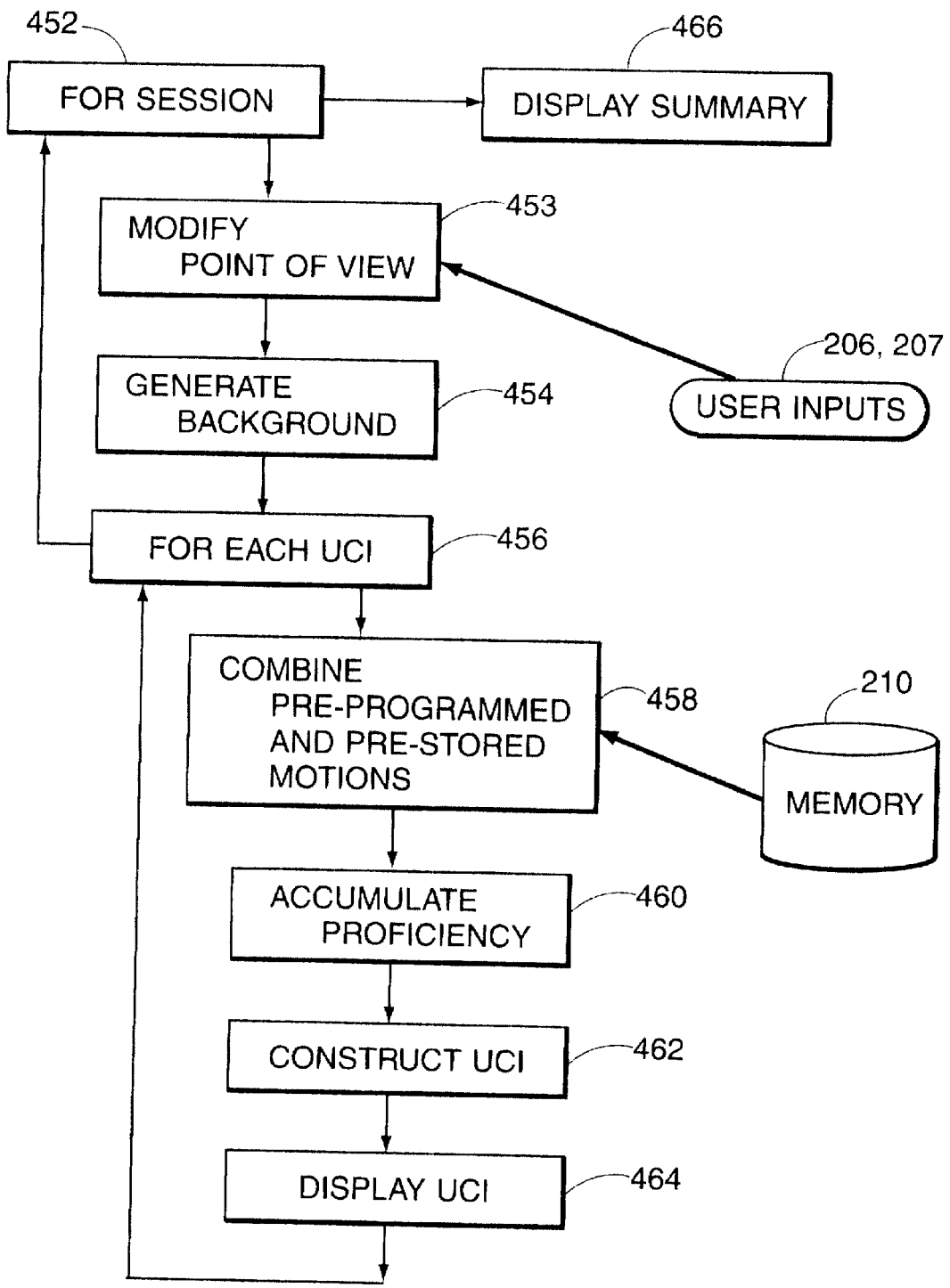

FIG. 33D shows the procedure (sub-routine) of FIG. 33B step 432—the user selects to review his/her current level of achievement (pre-stored and pre-programmed) the user has reached in the performance of the activity. For the duration of the review session, step 452, the method performs the following steps (until completion or termination is indicated by the user). Some (optional) user inputs may be used to change the display point of view (position and/or orientation with respect to display axes) in step 455. This corresponds to moving the camera through which the user views the display. In step 454, a background image is retrieved/constructed to reflect the environment, multi-user situation and activity choices of the user. For each uci involved in the activity (as previously selected), step 456, the method performs the following steps. Step 458 executes the pre-programmed motions as modified by the user's idiosyncratic pre-stored motions of the activity. In step 460, the processing system accumulates a proficiency measure as defined in FIG. 33A step 412. Step 462 constructs a uci reflecting the pre-programmed controls as combined with the pre-stored motions in step 458. The resultant uci is displayed in step 464 (with the background from step 454 and other step 464 uci's). When the total number of uci's has been included in the display, the review continues with step 452. When the review is complete (or complete to the user's satisfaction), step 452 terminates and any results (length of session, proficiency measures, etc.) are summarized to the user in step 466. Method flow then reverts (returns) to FIG. 33B step 432.

Figure 33E:
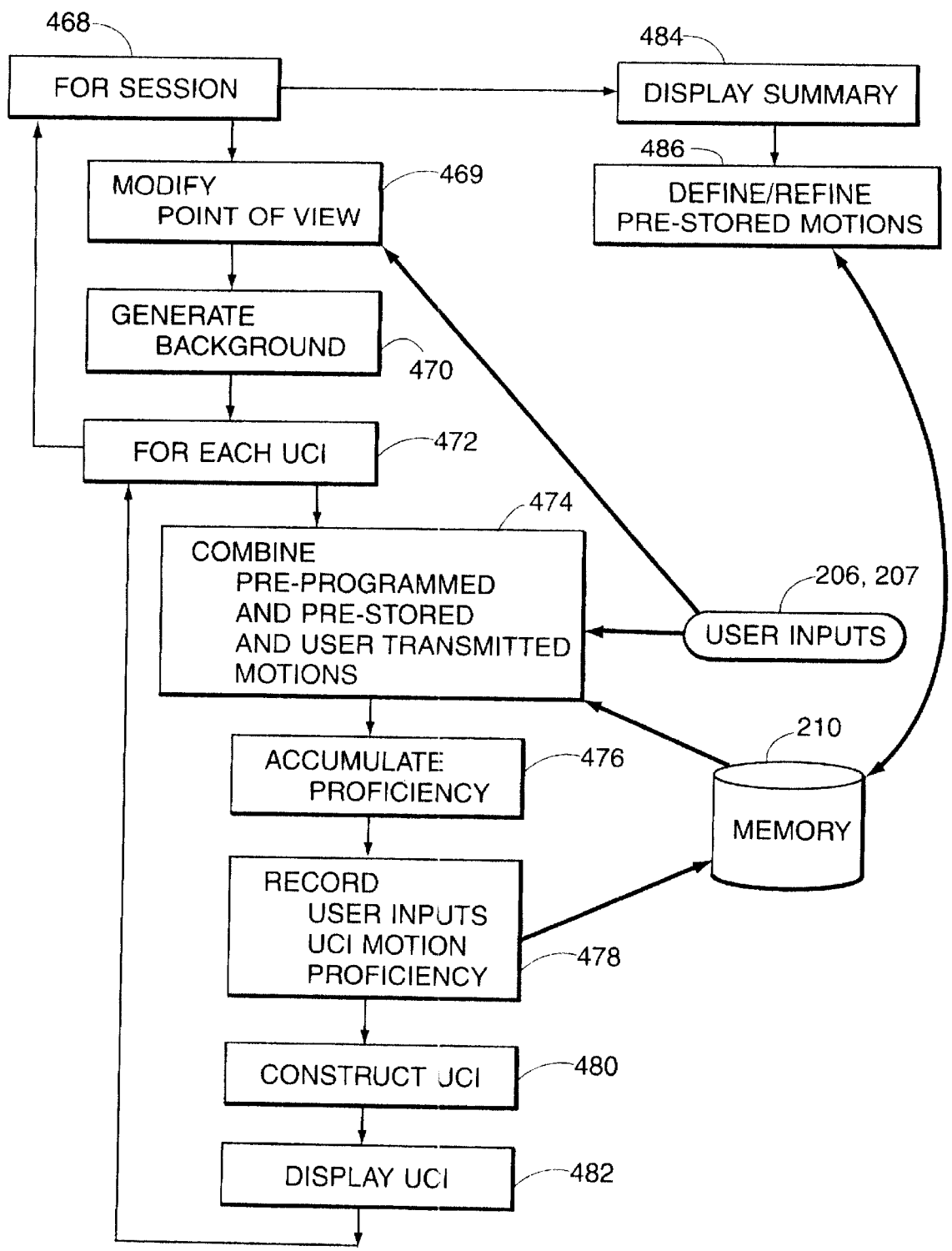
Figure 33F:
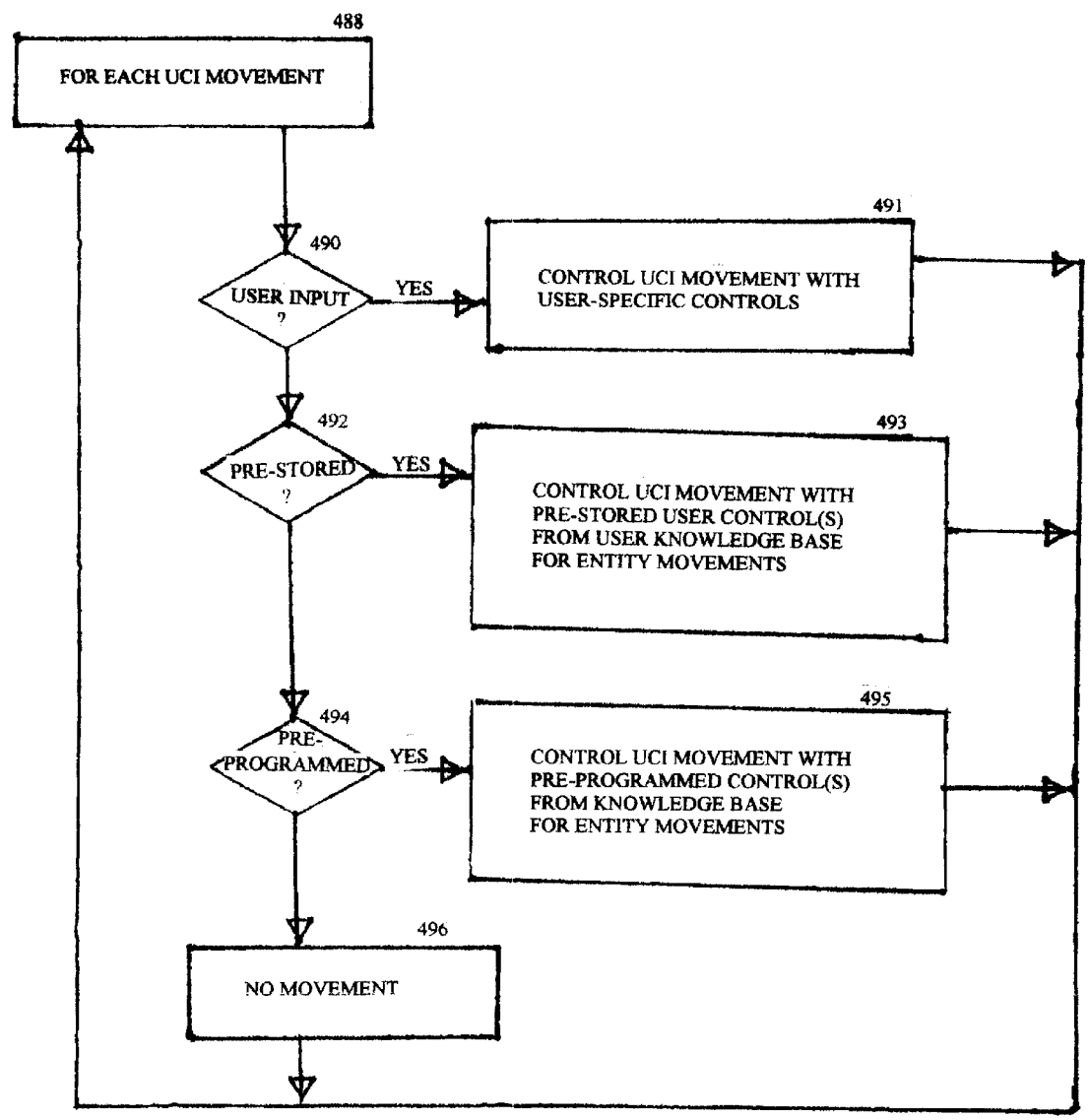
Figure 34:
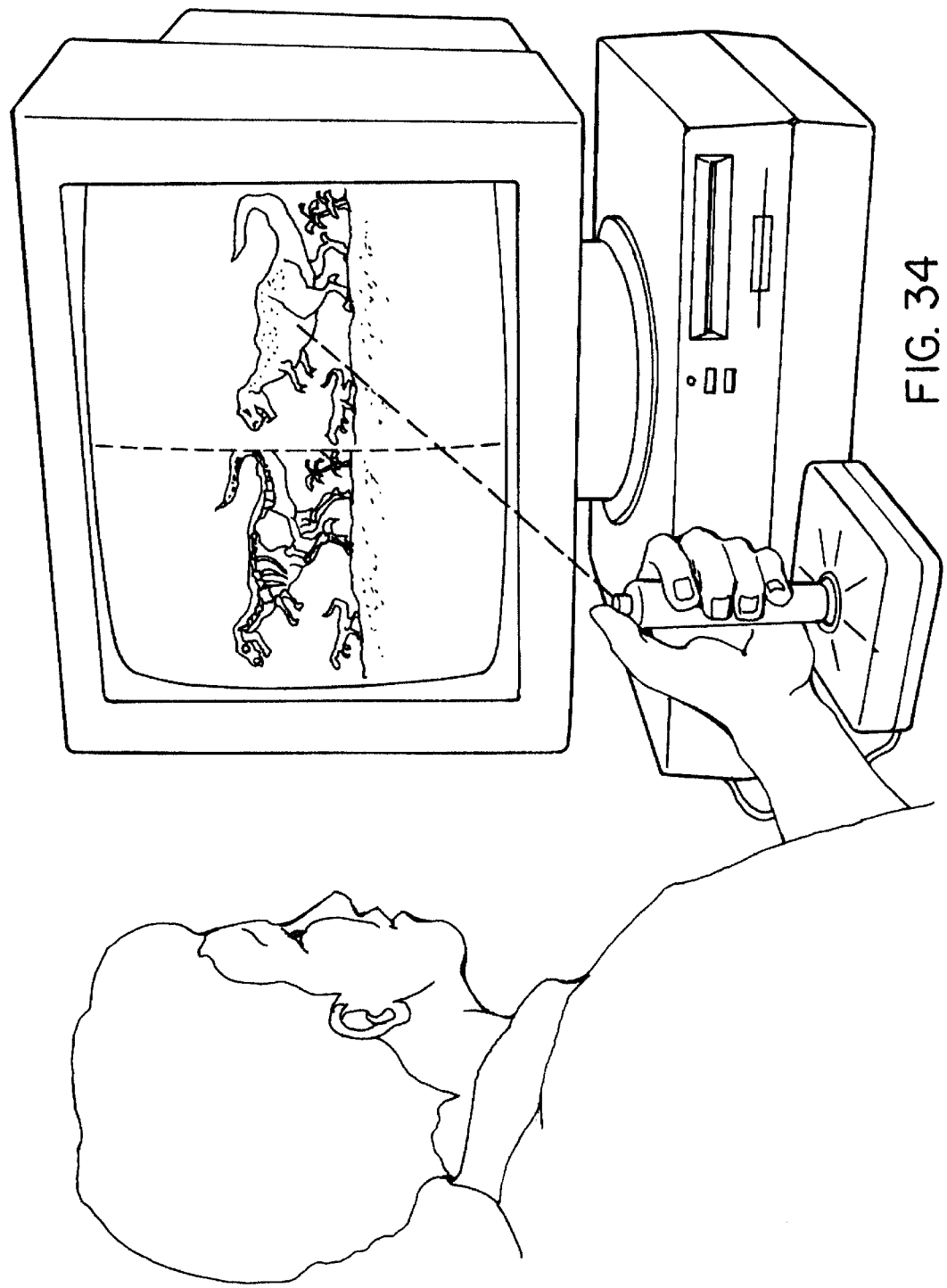
Figure 35:
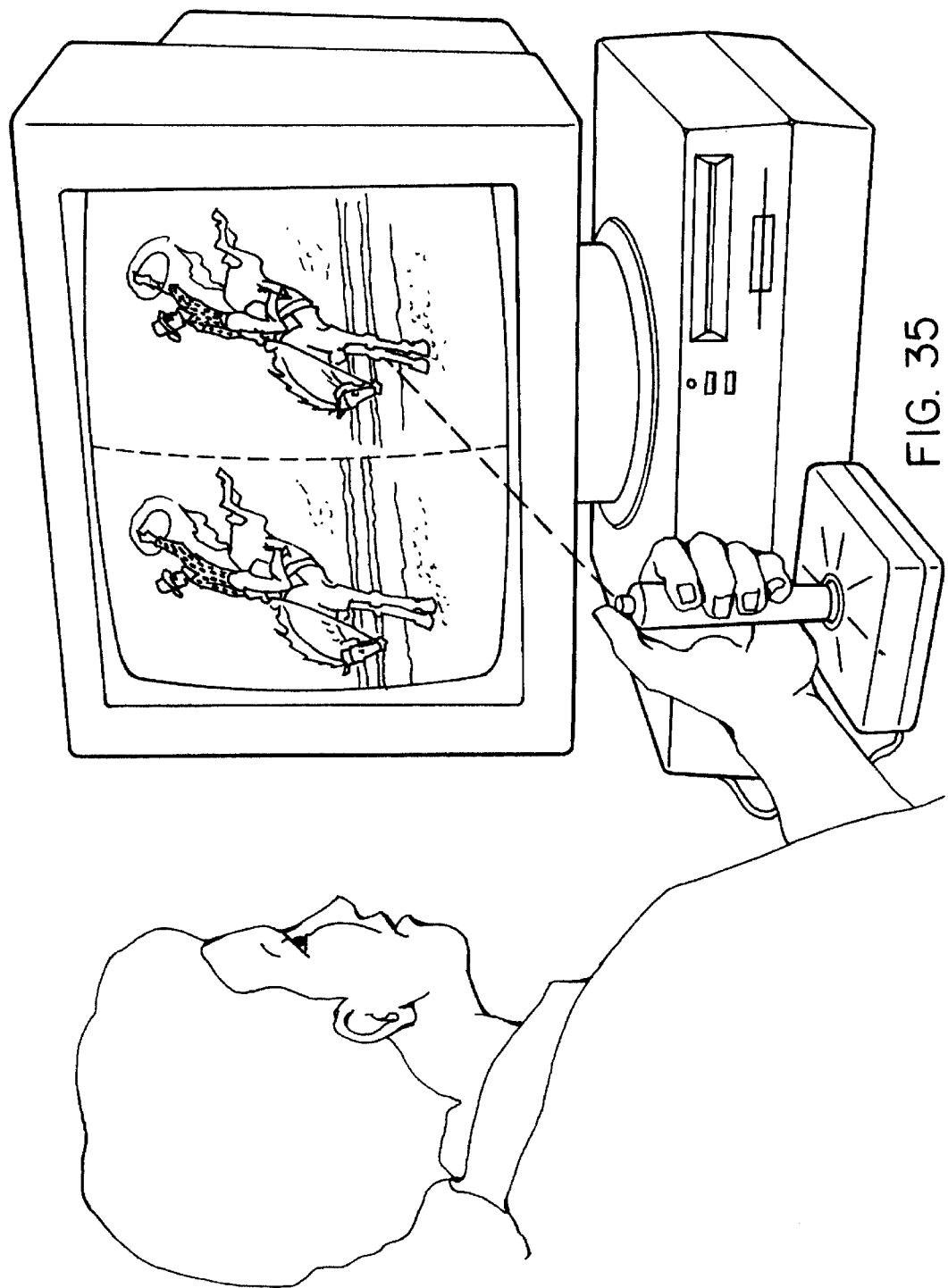
Figure 36:
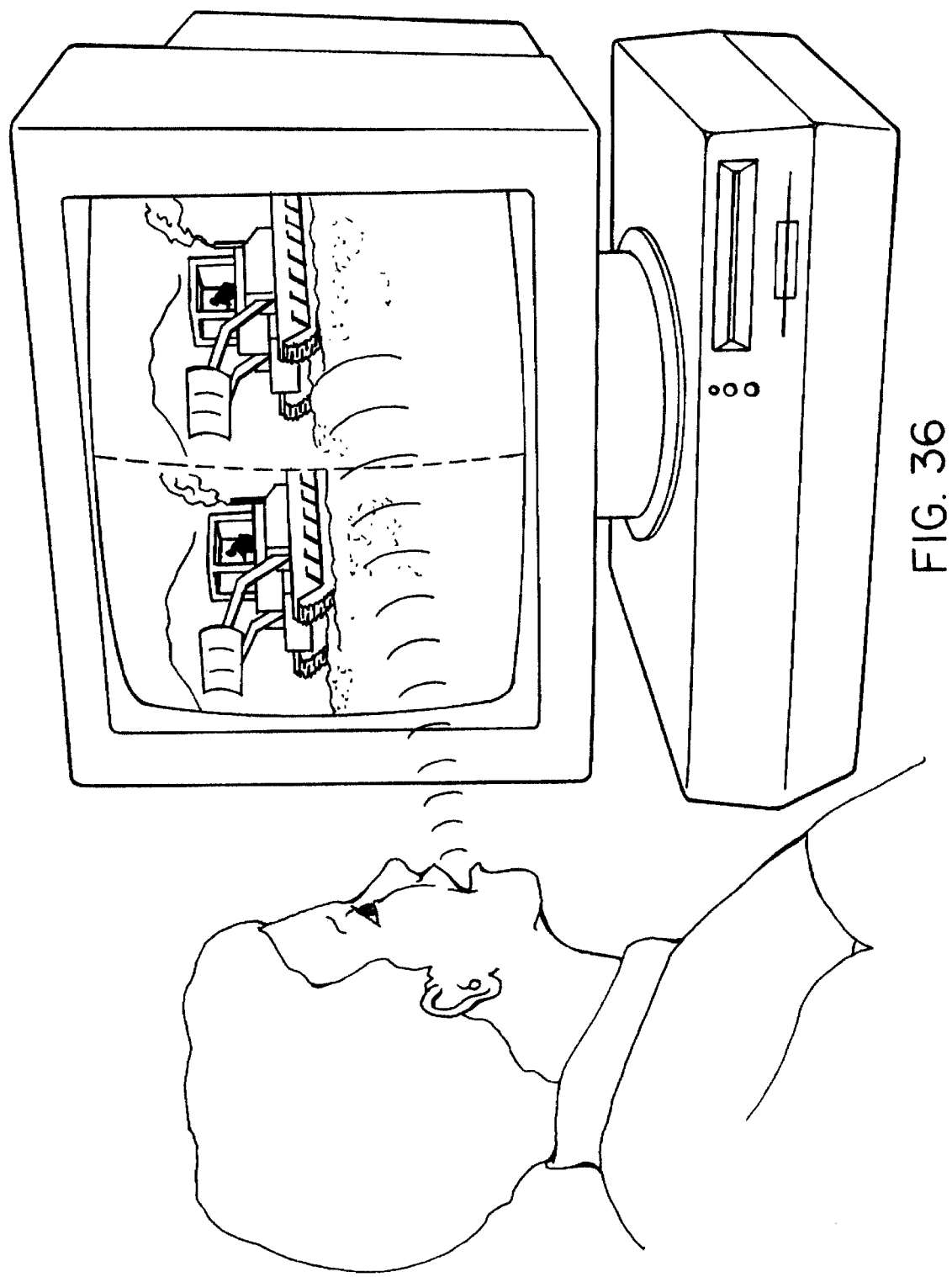
Figure 37:
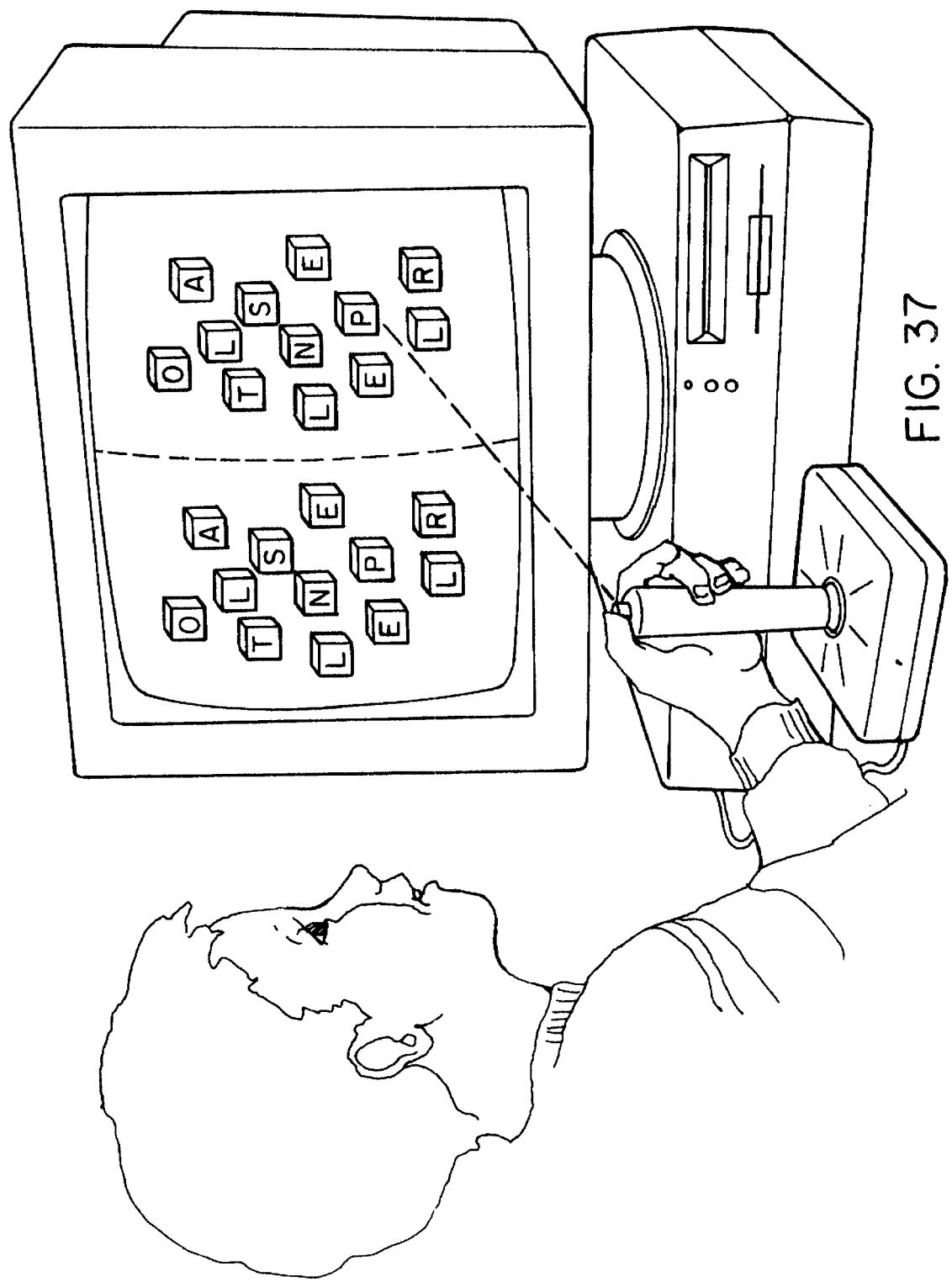

FIG. 33E shows the procedure (sub-routine) of FIG. 33B step 434—the user selects to perform (user inputs and pre-stored motions and pre-programmed controls) to define or refine his/her simulated physical movements. For the duration of the perform session, step 468, the method performs the following steps (until completion or termination is indicated by the user). Some (optional) user inputs may be used to change the display point of view (position and/or orientation with respect to display axes) in step 469. This corresponds to moving the camera through which the user views the display. In step 470, a background image is retrieved/constructed to reflect the environment, multi-user situation and activity choices of the user. For each uci involved in the activity (as previously selected), step 472, the method performs the following steps. Step 474 executes the pre-programmed motions as modified by the user idiosyncratic pre-stored motions as modified/augmented by the user transmitted input controls. In step 476, the processing system accumulates a proficiency measure as defined in FIG. 33A step 412. Step 478 records the user transmitted input controls, uci motion(s) and proficiency measure to the memory means of the processor system. Step 480 constructs a uci reflecting the pre-programmed controls and the pre-stored motions as combined with the current user transmitted input controls in step 474. The resultant uci is displayed in step 482 (with the background from step 470 and other step 482 uci's). Where the total number of uci's has been included in the display, the perform session continues with step 468. When the perform session is complete (or complete to the user's satisfaction), step 468 terminates and any results (length of session, proficiency measure, proficiency measure improvement, etc.) are summarized to the user in step 484. In step 486, the resultant uci motions can be used to replace a pre-stored default motion (FIG. 33A step 410) the first time a user performs the specific movement or refines the user's idiosyncratic pre-stored motion (history) or define (replace) the user's idiosyncratic pre-stored motion (establish a new baseline of performance). Method flow then reverts (returns) to FIG. 33B step 434.

While this invention has been particularly shown and described with references to preferred embodiments thereof, it will be understood by those skilled in the art that various changes in form and details may be made therein without departing from the spirit and scope of the invention as defined by the appended claims.

The foregoing describes the use of the system of the present invention for cognitive instruction, simulation, pre-training and practice and entertainment in the sport of ice hockey. However, as will be recognized by those of ordinary skill in the art, the system of the present invention may be utilized for other sports or athletic training, including, but not limited to, street hockey, roller hockey, field hockey, figure skating, soccer, football, baseball, etc., or instruction in other non-sport activities. For example, for sports the system of the present invention may be utilized in an instructional program for soccer by storing images of ideal soccer plays and allowing the player/student to control an image of a soccer player in the manner described previously for ice hockey. For non-sport activities, such as bricklaying, diamond cutting etc., calling for the coupling of cognitive and motor skills, the present invention is well-suited.

The present invention is also well-suited for other sports, educational, industrial, commercial, game and other activities for example, but not limited to, simulating the movement of dinosaurs, bulldozers (and/or drivers), bronco riders (and/or horses) and wooden blocks imprinted with letters of the alphabet. In any user application that includes the user's interaction with at least one demonstrative image (i.e. an instructive, ideal and/or "master" image) performing preferred real or stimulated and/or virtual physical activity movements and/or (alternatively) at least one adopted image (i.e. a user controllable image performing simulated, physical, initiating and/or responsive movements), the present invention will be useful. It being obvious to one skilled in the art that a user controllable image may also be used to perform said demonstrative activities. It being further obvious that at least two user controllable images may be controlled so as to perform said demonstrative movements. It being still further obvious that at least two user controllable images may be used to engage in activities representing a dynamic process of interacting and/or otherwise responding to each other. It also being obvious that when the demonstrative image is comprised of a live person and/or robot said person and/or robot may also perform responsive movements interactively with user controllable images.

When demonstrative images, or user controllable images, or both are used to display preferred, simulated physical movements, whether such movements be those of past living things such as dinosaurs, presently living things such as humans, horses, microbes, etc., objects such as wooden blocks and/or systems such as bulldozers or simulated cross sections of bulldozer engines displaying moving parts and when such preferred movements are the subjects of movements to which user controllable images are caused, by the transmission of inputs of users, to make interactive, idiosyncratic, simulated, physical movements, the present invention will be useful. FIGS. 34–37 are pictorial diagrams of users interacting with different embodiments of the invention.

In part, the features and applications of the demonstrative image(s) contribute to the novelty and use of the present invention. In further part, the use and embodiments of the present invention are related to the technical capabilities of the user controllable image (hereafter "uci").

The uci is a simulated, full or partial image comprised of one or any combination of; (1) previously or presently living things, (2) objects, (3) systems. The uci is constructed by processor system programming and designed to make idiosyncratic, interactive, simulated, physical movements, i.e. to initiate or respond by accepting user inputs transmitted to a computer and/or other processing system and/or by pre-programmed, pre-stored, maintained information or all such as explained herein. The uci's idiosyncratic, interactive, simulated physical movements, (initiating and/ or responding) are displayed on a computer screen or other device.

Demonstrative images and uci's when used as demonstrative images make physical movements that are the subject and/or object of the display. It being obvious to one skilled in the art that pauses, i.e. non-movements are, at times, used to initiate and/or respond.

In one embodiment of the present invention the uci is constructed to be used in a challenge based method and system. The challenge to the user is presented by at least one demonstrative image and/or uci (accompanied by audio, video and/or alphanumeric cues and the like) and the user is called upon to cause his/her uci to respond to said challenge by transmitting inputs to the uci. Accordingly, the uci is constructed so as to be caused to make inter-active, idiosyncratic, simulated, physical movements responsive to the demonstrative image (or another uci) based on inputs from the user. In another embodiment the uci may be caused by the user to initiate such movements.

Uci movement is controlled by the user and processing system programming constructing the uci so that the uci has technical capabilities and features enabling the user to cause the uci to perform said displayed movements, having a number of technical effects, for example:

(1) Any part or all of the uci may be caused to move by user transmitted inputs, without the user making a related movement of his/her own anatomical parts. So, a voice command by a user might result in a uci kicking a football, a uci microbe encircling another microbe, a uci turning or causing an engine drive shaft to turn, and/or a uci moving an alphabetized block into place. It being obvious that legless users may cause uci's to kick footballs and armless users may cause uci's to turn drive shafts by hand.

(2) The position and attitude of the uci (i.e. orientation of the uci with respect to a given axis) are caused by the integration of the user's prior sequence of input controls, transmitted by the user to the uci (within pre-programmed guidelines and/or parameters). The user, therefore, may control the uci's leaning, bending, facing, turning, flipping etc., and all changes and transitions of same.

(3) The movement of the uci may be alternately a) (independently and idiosyncratically) controlled by the user, b) controlled by pre-stored and/or maintained prior user input controls, c) autonomously controlled, i.e. controlled by pre-programming and d) any combination in whole or in part of a)–c). As one example, when the user stops transmitting controls the uci will continue to move, or stop gradually or stop completely, depending on the responses called for and prior controls having been input by the user.

(4) The speed at which the uci moves may be selected by the user or a trainer, coach or the like, or by pre-programming, or by pre-storing, maintaining or by all such means. So that, as examples, the speed of uci movement need not be a reproduction of the speed of working the input controls by the user and user selected uci speed (or pre-programmed uci autonomous speed) can range from frame by frame (stop speed) to super real time speed as would contribute positively to the user's pre-training practice, learning, etc.

(5) A first uci may be controlled by a first user to perform demonstrative movements that interface with a second user's control of a second uci used to perform responsive movements. For an example, in real time context the first uci being controlled by a trainer, coach, etc. would engage in demonstrating to a trainee controlling a second responding uci, it being obvious that the roles and performances of trainers, trainees and their respective uci's may continually switch and change and such changes and switching of roles and performances may proceed at any transitional speeds.

Accordingly, demonstrative and responsive movements may be continually executed by uci's as user's change and switch over from using uci's for demonstrative movements to using uci's for responsive movements. For illustration one can consider pedestrians in a revolving door changing and switching from entering to exiting on a continual, transitional, uninterrupted basis. It being obvious to one skilled in the art that uci's may be caused to move, by at least one user, so as to perform only demonstrative movements, only responsive movements or both movements in any order or sequence and to do so continually and uninterruptedly or from time to time.

(6) The image of the uci and/or the demonstrative image may be derived from real and/or realistic parameters, including, but not limited to real present or past living things, and/or objects and systems, for example anatomical and/or biomechanical data, actual examples, blueprints, drawings, animations, computations, measurements, graphics, live performance and any other suitable materials and/or source. Alternatively, the images of uci's and/or demonstrative images may be derived from fanciful images.

(7) The uci (and demonstrative images) are customizable by the user for features, dimensions, color, mass and any other desired characteristic, for example, but not limited to height, width, right or left handedness and/or footedness. Simulated dexterity, agility, coordination, timing and the like of the uci may be enhanced or retarded by user-specific customization of said images when coupled with the users' input controls and/or pre-programmed movement parameters. For example, a uci rider whose on-screen proportional image is 6 feet 10 inches tall, weighing 350 pounds and riding a small burro or a uci rider 5 feet 2 inches tall, weighing 108 pounds and riding a thoroughbred race horse would illustrate that selecting customized physical proportions of images has an effect on simulated dexterity, agility, etc. Similarly, a uci could have a three-fingered hand or only one hand.

(8) The uci acquires an effective memory, which is to say a form of artificial intelligence. For example, because the process of learning, simulated practicing, simulated doing and/or pre-training, etc. of skills and higher order techniques, maneuvers and strategies involves an accumulation of learned behavior the user, from his/her first moment of use of the present invention, inputs an increasing accumulation of user-specific controls to the uci. This base of inputted idiosyncratic controls becomes the effective memory of the uci. For example, in some cases the uci may be a simulated athlete and additional inputs continue to idiosyncratically construct the simulated player. Just as continued physical practice leads to an increasingly proficient real athlete, the uci continues to "grow" (so to speak) in the manner and fashion and with the techniques and nuances of the controlling user. Accordingly, users have creative latitude to craft dissimilar, idiosyncratic, simulated movements to the very same demonstrative and/or other activity and in doing so, specialize the responsive movements of their controlled uci's to the users' own particular patterns of speed, timing, force, trajectory, location, position, orientation etc.

(9) The speed at which inputs are transmitted to the uci may be selected by the user or a trainer, coach or the like or by pre-programming.

Figure 21:
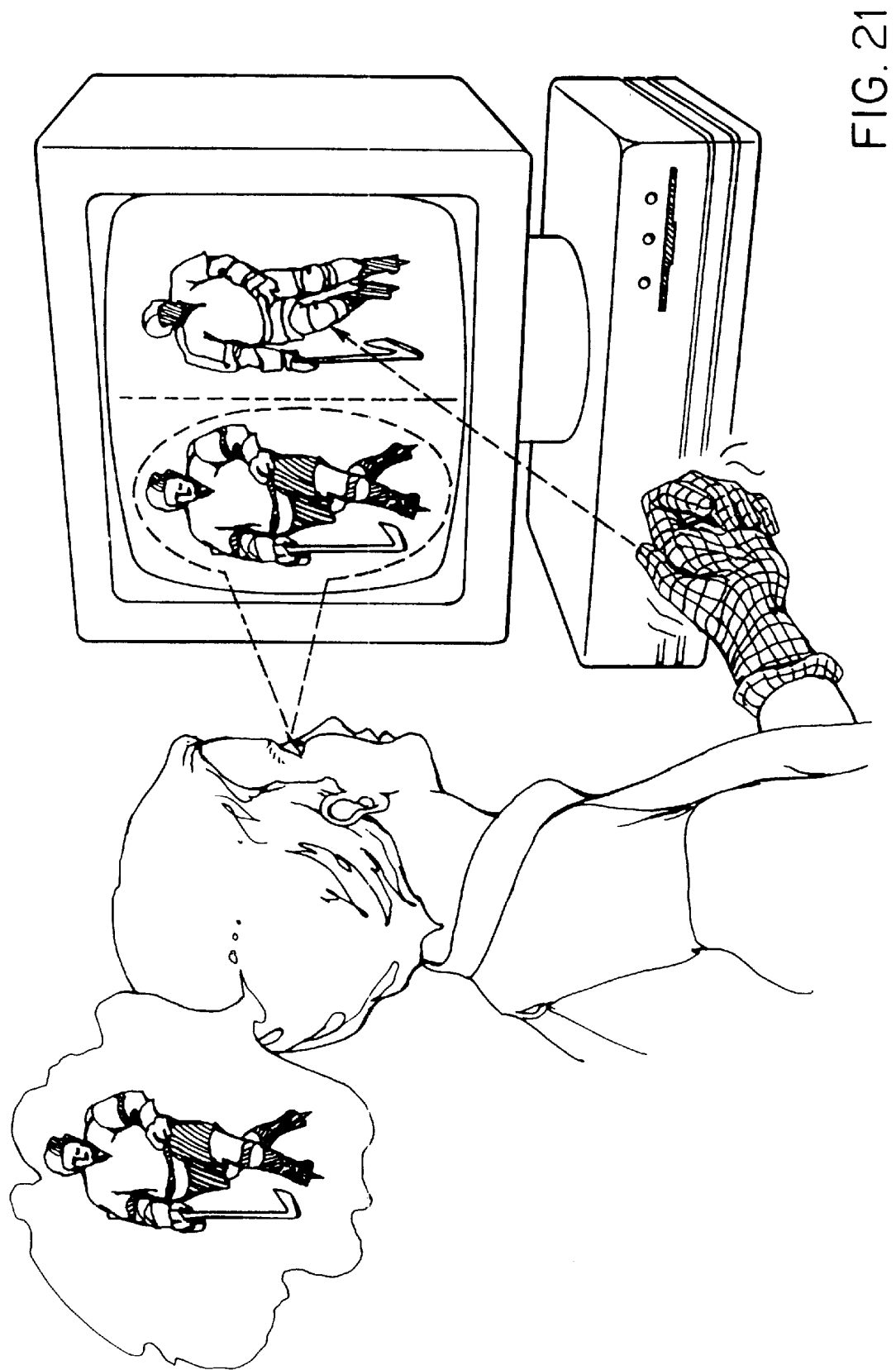
Figure 22:

It will also be apparent to those skilled in the art that the scope of the present invention need not be limited to the technology described above. For example, the method used by the player/student to manipulate the "controlled" image may be changed to include a joystick, 3D controller for PC games such as SpaceOrb 360, virtual reality glove (as shown in FIG. 21), helmet and skates, foot pedals or other technology and the "adopted" (uci) and "instructive" (demonstrative) images may appear on a virtual reality headset (as shown in FIG. 22) or other virtual reality device(s). The method of obtaining, storing, and displaying the "controlled" and "instructive" images may also be changed to include video, multi-media, or animation methods. All or any portion of a controllable figure can be displayed from any perspective.

What is claimed is:

1. A method of developing processing system software media to provide at least one user with a display of at least one user controllable image for use in interactive, personal, idiosyncratic, simulated, physical movements, said method comprising the steps of:

generating, storing, and maintaining, in a memory means of said processing system, at least one processor displayable user controllable image controlled by said at least one user to perform a sequence of said movements;

providing means, to said processing system, to display said at least one user controllable image;

providing means, to said processing system, to receive inputs from said at least one user to control said at least one user controllable image;

constructing said at least one user controllable image to make said movements, controlled by said input means from said at least one user, without requiring said at least one user to make corresponding physical movements;

recording and maintaining, in said memory means, a record of said user controllable image movements such that said record is modified to represent said idiosyncratic movements as controlled by said input means; and providing means, to said processing system, to send outputs of said user controllable image movements from said memory means to said display means.

2. The method of claim 1, wherein said user controllable image movements are recorded and maintained such that said movements may be selected by said user to be repeated by said user controllable image, without further input controls from the user.

3. The method of claim 1, wherein said maintained record in said memory is modified by subsequent user controllable image movements as controlled by said at least one user.

4. The method of claim 1, wherein said maintained record in said memory is synchronously added to by additional user controllable image movements as controlled by said at least one user.

5. The method of claim 1, wherein said maintained record in said memory is retained as antecedent user controllable image movements that are sequentially added to by subsequent user controllable image movements as controlled by said at least one user.

6. The method of claim 1, further comprising accepting or rejecting said inputs.

7. The method of claim 1, further comprising accepting, input from at least one user, to select the characteristic parameters of said user controllable image.

8. The method of claim 1, further comprising accepting, input from at least one user, to select the displayed speed of movement of said user controllable image.

9. The method of claim 1, wherein said movements of said user controllable image are restricted by pre-programmed simulated movements limits such that said user controllable image performs interactive simulated, physical movements within the boundaries of said pre-programmed movement limits.

10. The method of claim 1, further comprising providing means of measurement, to said processing system, wherein said user controlled movements of said user controllable image are measured with respect to a pre-programmed model of preferred movements of said user controllable image.

11. The method of claim 1, wherein said at least one user controls said user controllable image so that said measurements indicate achievement by said at least one user in controlling said user controllable image.

12. The method of claim 1, wherein said step of providing input means to control said user controllable image movements does not require said at least one user to move the same or any related part of the user's body.

13. The method of claim 1, wherein said step of providing input means for said user controllable image further comprises the steps of providing input means, to said processing system, to allow said at least one user to specify the position of said user controllable image with respect to any axis and providing input means, to said processing system, to allow said at least one user to specify the orientation of said user controllable image with respect to any axis.

14. The method of claim 1, wherein said step of constructing the movement of the user controllable image is derived from at least one of said user transmitted inputs, controls, pre-stored idiosyncratic movements and pre-programmed controls.

15. The method of claim 1, wherein said step of providing input means to control said at least one user controllable image to perform demonstrative simulated physical movements.

16. The method of claim 1, further comprising providing at least one additional user controllable image to interact with said demonstrative movements.

17. The method of claim 1, wherein said step of providing input means to control at least one user controllable image further comprising providing input means to control an additional user controllable image; and providing input means to each user controllable image to respond to one another.

18. The method of claim 1, wherein said step of providing means to display said user controllable image comprises the step of using recorded video images.

19. The method of claim 1, wherein said step of providing means to display said user controllable image comprises the step of using live video images.

20. A method of developing processing system software media to provide at least one user with a display of at least one demonstrative image and at least one user controllable image for use in interactive, personal, idiosyncratic, simulated, physical movements, said method comprising the steps of:

generating and storing, in a memory means of said processing system, at least one processor displayed sequence of demonstrative images, wherein said at least one processor displayed sequence of demonstrative images comprises a series of demonstrative performance of an activity representing physical movements;

further generating, storing, and maintaining, in said memory means of said processing system, at least one processor displayable user controllable image controlled by said at least one user to perform a sequence of said movements;

providing means, to said processing system, to display said processor displayable images;

providing means, to said processing system, to receive inputs from said at least one user to control said at least one user controllable image;

constructing said at least one user controllable image to make said movements, controlled by said input means from said at least one user, without requiring said at least one user to make corresponding physical movements;

recording and maintaining, in said memory means, a record of said user controllable image movements such that said record is modified to represent said idiosyncratic movements as controlled by said input means; and displaying said movements of said user controllable image on said display means in sequence with said displayed image of said sequence of demonstrative images.

21. A method of developing processing system software media to provide at least one user with at least one user controllable device for use in interactive, personal, idiosyncratic, simulated, physical movements, said method comprising the steps of:

generating, storing, and maintaining, in a memory means of said processing system, at least one user controllable model responsive to input from said at least one user so as to cause said device to perform said movements;

providing means, to said processing system, to receive inputs from said at least one user to control said at least one user controllable device;

constructing said at least one user controllable model such that said user controllable device is controlled to perform said movements without requiring said at least one user to perform corresponding physical movements;

recording and maintaining, in said memory means, a record of said user controllable device movements such that said record is modified to represent said idiosyncratic movements as controlled by said input means; and providing means, to said processing system, to send outputs from said record to said user controllable device such that said outputs represent said user controllable device movements.

\* \* \* \* \*